(12) United States Patent
Kuszmaul et al.

(10) Patent No.: US 6,609,189 B1
(45) Date of Patent: Aug. 19, 2003

(54) CYCLE SEGMENTED PREFIX CIRCUITS

(75) Inventors: Bradley C. Kuszmaul, Woodbridge, CT (US); Dana Sue Henry-Kuszmaul, Woodbridge, CT (US)

(73) Assignee: Yale University, New Haven, CT (US)

( * ) Notice: Subject to any disclaimer, the term of this patent is extended or adjusted under 35 U.S.C. 154(b) by 0 days.

(21) Appl. No.: 09/267,827

(22) Filed: Mar. 12, 1999

Related U.S. Application Data

(60) Provisional application No. 60/077,669, filed on Mar. 12, 1998, and provisional application No. 60/108,318, filed on Nov. 13, 1998.

(51) Int. Cl.$^7$ .......................... G06F 9/302; G06F 9/308; G06F 13/40; G06F 7/52
(52) U.S. Cl. ............................. 712/23; 712/3; 712/12; 712/221; 708/421; 708/632
(58) Field of Search ................... 712/1, 2, 3, 7, 712/8, 9, 16, 23, 221, 12; 702/300, 201, 10, 36, 23, 19, 18, 17, 25, 27, 26, 38, 212, 129, 29, 35, 34; 708/682, 505, 506, 421, 503, 517, 504, 521, 632, 534; 341/67, 76, 93; 375/359; 710/12, 21, 33, 38, 51, 72, 111, 130, 243, 125, 126

(56) References Cited

U.S. PATENT DOCUMENTS

| | | | | |
|---|---|---|---|---|
| 3,716,851 A | * | 2/1973 | Neumann | 341/167 |
| 4,594,655 A | * | 6/1986 | Hao et al. | 712/218 |
| 5,333,135 A | * | 7/1994 | Wendorf | 370/394 |
| 5,390,298 A | * | 2/1995 | Kuszmaul et al. | 712/22 |
| 5,544,325 A | * | 8/1996 | Denny et al. | 709/236 |
| 5,560,025 A | * | 9/1996 | Gupta et al. | 712/23 |
| 5,590,283 A | * | 12/1996 | Hills et al. | 712/29 |
| 5,708,841 A | * | 1/1998 | Popescu et al. | 712/23 |
| 5,822,778 A | * | 10/1998 | Dutton et al. | 711/208 |
| 5,999,961 A | * | 12/1999 | Manohar et al. | 708/505 |
| 6,151,295 A | * | 11/2000 | Ma et al. | 370/203 |

OTHER PUBLICATIONS

F. Thomson Leighton, Introduction to parallel algorithms and architectures : arrays, trees, hypercubes, M. K. Publishers, CA, Sep. 1991,p32–44.*
Khalid Sayood, Introduction to Data compression, Morgan Kaufmann Publishers, Jan. 1996,p27–31.*
Webster's Ninth New Coolegiate Dictionary, Jan. 1989, p927.*
Cormen et al., Introduction to Algorithms, The MIT Press, London, England, Sep. 2001, p662–697.*

* cited by examiner

Primary Examiner—Daniel H. Pan
(74) Attorney, Agent, or Firm—Pennie & Edmonds LLP

(57) ABSTRACT

The poor scalability of existing superscalar processors has been of great concern to the computer engineering community. In particular, the critical-path delays of many components in existing implementations grow quadratically with the issue width and the window size. This patent presents a novel way to reimplement these components and reduce their critical-path delay growth. It then describes an entire processor microarchitecture, called the Ultrascalar processor, that has better critical-path delay growth than existing superscalars. Most of our scalable designs are based on a single circuit, a cyclic segmented parallel prefix (cspp). We observe that processor components typically operate on a wrap-around sequence of instructions, computing some associative property of that sequence. For example, to assign an ALU to the oldest requesting instruction, each instruction in the instruction sequence must be told whether any preceding instructions are requesting an ALU. Similarly, to read an argument register, an instruction must somehow communicate with the most recent preceding instruction that wrote that register. A cspp circuit can implement such functions by computing for each instruction within a wrap-around instruction sequence the accumulative result of applying some associative operator to all the preceding instructions. A cspp circuit has a critical path gate delay logarithmic in the length of the instruction sequence. Depending on its associative operation and its layout, a cspp circuit can have a critical path wire delay sublinear in the length of the instruction sequence.

18 Claims, 65 Drawing Sheets

| Register | Tag |
|---|---|
| 0 | 30 |
| 1 | 35 |
| 2 | 40 |
| 3 | 25 |
| 4 | 26 |
| 5 | 41 |

Before

| Register | Tag |
|---|---|
| 0 | 42 |
| 1 | 35 |
| 2 | 40 |
| 3 | 25 |
| 4 | 26 |
| 5 | 41 |

After Instruction 0

| Register | Tag |
|---|---|
| 0 | 42 |
| 1 | 35 |
| 2 | 40 |
| 3 | 43 |
| 4 | 26 |
| 5 | 41 |

After Instruction 1

| Register | Tag |
|---|---|
| 0 | 44 |
| 1 | 35 |
| 2 | 40 |
| 3 | 43 |
| 4 | 26 |
| 5 | 41 |

After Instruction 2

FIG. 11

| Input | 0 | 1 | 3 | 0 | 1 | 3 | 0 | 1 |
|---|---|---|---|---|---|---|---|---|
| Level 0 | 1 | 2 | 3 | 1 | 2 | 3 | 1 | 2 |
|  | 4 | 2 | 3 | 4 | 2 | 3 | 4 | 2 |
|  | 4 | 4 | 3 | 4 | 4 | 3 | 4 | 4 |
|  | 0 | 0 | 0 | 0 | 0 | 0 | 0 | 0 |
|  | 4 | 4 | 4 | 4 | 4 | 4 | 4 | 4 |
| Level 1 | 2 | | 0 | | 3 | | 2 | |
|  | 4 | | 0 | | 3 | | 4 | |
|  | 4 | | 0 | | 4 | | 4 | |
|  | [2] | | 0 | | 3 | | 2 | |
|  | 4 | | 0 | | 4 | | 4 | |
| Level 2 | 0 | | | | 2 | | | |
|  | 4 | | | | 2 | | | |
|  | 4 | | | | 4 | | | |
|  | 0 | | | | 2 | | | |
|  | 4 | | | | 4 | | | |
| Level 3 | 2 | | | | | | | |
|  | 4 | | | | | | | |
|  | 4 | | | | | | | |
|  | 2 | | | | | | | |
|  | 4 | | | | | | | |

FIG. 26

FIG. 56VLSI layout.

CYCLE SEGMENTED PREFIX CIRCUITS

CROSS REFERENCE TO RELATED APPLICATIONS

This application claims the benefit of Provisional Application Serial No. 60/077,669, filed Mar. 12, 1998, and Provisional Application Serial No. 60/108,318, filed Nov. 13, 1998, both of which are incorporated herein by reference in their entireties.

1. BACKGROUND OF THE INVENTION

This invention draws from two different areas: parallel-prefix circuits and superscalar-processor circuits. Parallel-prefix circuits have, in the past, been most often used for parallel computation in machine such as the Connection Machine CM-5 supercomputer. (See, for example, [25, 18, 16, 7, 2].) Throughout this patent, numbers enclosed in square brackets refer to the references cited in Section 4.4 below, each of which is incorporated by reference herein.

Superscalar processor circuits are used to implement processors that exploit instruction-level parallelism (ILP) using out-of order execution. Instruction-level parallelism is the parallelism that can be found in a serial instruction stream because certain of the serial chain of operations are actually independent. One strategy to exploit ILP is to execute the instructions in a different order from that specified by the original serial execution, hence "Out-of-order execution". A mechanism for out-of-order execution was first described in [44].

The rest of this section first describes parallel-prefix circuits and then describes today's superscalar-processor circuits.

Notation

We use the following notation:

O: The "big-Oh" notation is used to indicate how fast a function grows, ignoring constant factors. Intuitively, we write "g(x) is O(f(x))" if g(x) grows no faster than f(x), for large x ignoring a constant multiplicative factor.

$\Omega$: The "big-Omega" notation is used similarly. Intuitively, we write "g(x) is $\Omega(f(x))$" if g(x) grows no slower than f(x), for large x ignoring a constant multiplicative factor.

$\Theta$: The "big-Theta" notation is the intersection of big-Oh and big-Omega. g(x) is $\Theta(f(x))$ exactly when g(x) is O(f(x)) and g(x) is $\Omega(f(x))$. Intuitively, this means that g(x) grows at the same speed as f(x) for large x ignoring a constant multiplicative factor. See [5] for a complete and exact treatment of the O, $\Omega$, and $\Theta$ notation.

lg I is the logarithm, base 2, of I.

log I is the logarithm of I in the natural base e.

Thus, lg I=$\log_2$ I. Note that choice of the base of a logarithm makes only a difference of a constant factor. E.g., lg I$\approx$0.693 log I, which means that lg I is $\Theta(\log I)$ and I is $\Theta(\lg I)$. In this document we generally use the log base two and we use binary trees. There may be engineering reasons to use a trees of higher degree because the base of the log changes which gives a constant-fold change in the performance. Our designs work for any base and any degree of the tree, including trees of mixed degree.

Ceiling: We write $\lceil x \rceil$ (pronounced "the ceiling of x") to be the smallest integer greater than or equal to x.

append lists: If a and b are two lists, then {a,b} is the concatenation of the two lists.

The set of integers x such that $a \leq x \leq b$ is denoted by [a . . . , b].

Base numerals: When we write $0010_2$ the string "0010" should be interpreted as a base two number. Thus $1010_2 = 12_8 = 10_{10} = 10$.

1.1 Parallel Prefix

This section contains a tutorial on parallel-prefix circuits. First we define the prefix problem, then show how to implement it to run fast. Parallel-prefix circuit design is a technique that can often convert linear-time circuits into logarithmic-time circuits. (See, for example, [5] for a discussion of log-depth parallel-prefix circuits. Segmented parallel prefix circuits are the subject of an exercise of [5], and were implemented in the CM-5 supercomputer [25, 18, 16, 7].)

The prefix problem is as follows. One is given an associative operator $\otimes$ with an identity value, I. Given some inputs $x_0, x_1, \ldots, x_{n-1}$ we need to compute $y_0, y_1, \ldots, y_n$ as: $y_i = x_0 \otimes x_1 \otimes \ldots \otimes x_{i-1}$, where $y_0$ is defined to be the identity value for the $\otimes$. (For example, if $\otimes$ is addition (and the identity for addition is 0), then $y_i = \Sigma_{j=0}^{i-1} x_j$.)

Sometimes one wants special initial and final values. One can formulate the prefix problem as having an initial value z that is passed to the circuit. In this case we have $y_i = z \otimes x_0 \otimes x_1 \ldots \otimes x_{i-1}$. This can be viewed as the earlier case simply by renumbering the subscripts so that we have $$x'_i = \begin{cases} z & \text{if } i = 0, \text{ and} \\ x_{i-1} & \text{otherwise.} \end{cases}$$

and then performing a parallel prefix on the x' values. Similarly, one would like to get a final output value w from the circuit which is defined to be $w = z \otimes x_0 \otimes x_1 \ldots \otimes x_n$.

Again, this can be implemented by the earlier case by manipulating subscripts. We simply extend the subscript range to n+1 and compute w as $y_{n+1}$.

The natural and easy thing to do is to compute the $y_i$'s serially. First one computes each $y_{i-1}$ and uses that to compute $y_i$ as $$y_i = \begin{cases} \text{the identity value} & \text{if } i = 0, \text{ and} \\ y_{i-1} \otimes x_{i-1} & \text{otherwise.} \end{cases}$$

FIG. 1 shows a circuit 10 that computes the prefix operation in linear time. Circuit 10 comprises a plurality of function generators 15, each having two inputs and one output. Each output is connected as one of the inputs to the next function generator and the other input is an x value. It is easy to see that prefix can be computed in time linear in n. It is surprising to many people that the prefix problem can be solved in time logarithmic in n by using a circuit structure known as parallel prefix. The next three sections review the parallel prefix circuit.

1.1.1 Log-Time Parallel Prefix

Before reviewing the construction of parallel-prefix circuits in general, we present an example. FIG. 2 shows a parallel-prefix circuit 20 that takes eight inputs, $x_0, x_1, \ldots, x_7$, and computes their prefix sums $$y_i = \sum_{j=0}^{i-1} x_j.$$

Circuit 20 comprises fourteen two-input adders 25 connected in a tree-like structure by signal wires 27 as shown. The inputs $x_i$ are provided at the bottom of the circuit, and the outputs $y_i$ come out the bottom, with output $y_i$ coming out just to the left of where input $x_i$ goes in. The identity (zero) goes in at the top and the sum of all the values ($y_8$) comes out at the top. The critical-path length of this circuit is logarithmic in the number of inputs. This circuit can be laid out in VLSI using an H-tree layout [23] with a resulting area of about $A=O(n^2b^2)$ where b is the number of bits in the result $y_n$. The resulting wire delay is about $O(\sqrt{A})$. We can further optimize the parallel-prefix sum circuit of FIG. 2. If we use a redundant representation (such as the carry-save adder as used in Wallace-tree multipliers), with a single final sum at the end, we can perform the entire parallel-prefix sum in only $O(\log n)$ gate delays as opposed to $O(\log^2 n)$. Furthermore, often the width of the data values is smaller at the inputs than at the outputs (for example, when the inputs x, to a sum are only one bit each, but the output is log n bits, a case which will come up later in this patent), then we can carefully size the ALUs so that they take just the right number of bits as inputs and produce the right number of bits as outputs, which will save area and power. One important special case is when the $x_i$'s are one-bit each. The problem of summing one-bit inputs is often referred to as the enumeration problem.

In general, a parallel prefix circuit comprises a tree as shown in FIG. 3. The tree 30 comprises a plurality of treefix modules 35 at its vertices connected by signal wires 37 as shown. The $x_i$ values are input at the leaves of the tree (at the bottom of the figure). The results $y_i$ are also output at the leaves, adjacent to the corresponding $x_i$'s. The identity value I is input at the root of the tree (at the top of the figure) and the result $y_8$ of combining all the $y_i$ values is output at the root of the tree. The signal wires may be several bits wide in order to encode the necessary information. The values along each signal wire have been labeled. We use the notation $P_{i,j}$ to indicate that a particular wire carries the value $x_i \otimes x_{i+1} \otimes \ldots \otimes x_j$. Thus $$p_{i,j} = \bigotimes_{k=i}^{j} x_k.$$

(If $j<i$ then $p_{ij}$ is the identity value.) The circuit computes $y_j = p_{0j-1}$ for $0 \leq j \leq 7$. (See [5] for a discussion of how to adapt the circuit of FIG. 3 to compute the special cases of w and z mentioned above.)

connects to the circuit above, one to the lower-left and one to the lower-right. There are some integers j, k, and m, with $j<k<m$, such that the data coming from above will be $P_{0,j-1}$, the data coming from the lower-left will be $p_{j,k-1}$ and the data coming from the lower-right will be $P_{k,m-1}$. The treefix module then produces $p_{j,m-1}$ which is output to above, $p_{0,j-1}$ which is output to lower-left and $p_{0,k-1}$ which is output to lower-right. The reader can check that these are in fact the values carried on the wires of FIG. 3. The circuit to compute these values is very easy to design since $$p_{j,m-1}=p_{j,k-1} \otimes p_{k,m-1},$$

$$p_{0,j-1}=p_{0,j-1},$$

and $$p_{0,k-1}=p_{0,j-1} \otimes p_{j,k-1},$$

Although the tree in FIG. 3 has a branching factor of two (that is, it is a binary tree), all the parallel-prefix circuits described in this patent can be implemented with an arbitrary branching factor. The choice of an appropriate branching factor depends on the parameters of a particular technology. For illustration, we will show all our circuits with a branching factor of two.

1.1.2 Segmented Parallel Prefix

A segmented parallel-prefix circuit is also known. The segmented-prefix circuit is similar to the prefix circuit. A segmented-prefix operation comprises a collection of separate prefix operations over adjacent non-overlapping segments of the input $x_0, x_1, \ldots, x_{n-1}$. The way this works is that in addition to providing inputs $x_p$ to the prefix circuit we provide additional 1-bit inputs $s_i$ called the segment bits. The segment bits indicate where a new segment is about to begin. The output is $$y_i = \bigotimes_{j=k_i}^{i-1} x_i,$$

where $k_i = \max\{0, \max\{k<i:s_k=1\}\}$.

Thus if we have

| $x$ | $=$ | $<x_0,$ | $x_1,$ | $x_2,$ | $x_3,$ | $x_4,$ | $x_5,$ | $x_6,$ | $x_7,$ | $x_8,$ | $x_9>$ |
|---|---|---|---|---|---|---|---|---|---|---|---|
|  | $=$ | $<1,$ | $2,$ | $3,$ | $4,$ | $5,$ | $6,$ | $7,$ | $8,$ | $9,$ | $10,>$ |
| $s$ | $=$ | $<s_0,$ | $s_1,$ | $s_2,$ | $s_3,$ | $s_4,$ | $s_5,$ | $s_6,$ | $s_7,$ | $s_8,$ | $s_9>$ |
|  | $=$ | $<0,$ | $0,$ | $1,$ | $0,$ | $0,$ | $0,$ | $1,$ | $0,$ | $1,$ | $0,>$ |
| then |  |  |  |  |  |  |  |  |  |  |  |
| $k$ | $=$ | $<k_0,$ | $k_1,$ | $k_2,$ | $k_3,$ | $k_4,$ | $k_5,$ | $k_6,$ | $k_7,$ | $k_8,$ | $k_9>$ |
|  | $=$ | $<0,$ | $0,$ | $0,$ | $2,$ | $2,$ | $2,$ | $2,$ | $6,$ | $6,$ | $8,>$ |
| and |  |  |  |  |  |  |  |  |  |  |  |
| $y$ | $=$ | $<y_0,$ | $y_1,$ | $y_2,$ | $y_3,$ | $y_4,$ | $y_5,$ | $y_6,$ | $y_7,$ | $y_8,$ | $y_9>$ |
|  | $=$ | $<0,$ | $1,$ | $1+2,$ | $3,$ | $3+4,$ | $3+4+5,$ | $3+4+5+6,$ | $7,$ | $7+8,$ | $9,>$ |
|  | $=$ | $<0,$ | $1,$ | $3,$ | $3,$ | $7,$ | $12,$ | $18,$ | $7,$ | $15,$ | $9,>$ |

A treefix module 35 of FIG. 3 is shown in more detail in FIG. 4. Each treefix module has two function generators 42, 43, three inputs 44, 45, 46, and three outputs, 47, 48, 49 arranged in pairs of an input and an output. One pair A linear-time segmented parallel-prefix circuit 50 is shown in FIG. 5. Circuit 50, comprises a plurality of two-input function generators 55. One input to each function generator is the output of a two-input multiplexer (MUX) 58, which output is selected by a segment bit. One input to each MUX is the identity function. The other input is the output of the preceding function generator. The other input to each function generator is an x value. This is similar to the circuit of FIG. 1 except that MUXes have been added to handle the segment bits.

The segmented parallel-prefix tree circuit has the same structure as the ordinary parallel-prefix tree, except that we modify the treefix module to compute an additional segmentation signal $s_{j,k-1}$, which is passed up the tree. The value $s_{j,k-1}$ indicates if any of the segments bits are equal to one. FIG. 6 shows a segmented parallel-prefix circuit 60 with eight leaf nodes (n=8). The circuit comprises a plurality of treefix modules 65 at the vertices connected by signal wires 67 as shown. The tree uses the slightly modified treefix module 65 shown in FIG. 7. Circuit 65 comprises two function generators 72, 73, two multiplexers 75, 76 and an OR gate 78. The circuit also comprises two inputs, 81, 82 and one output 83 for the segment bits and the same three inputs 84, 85, 86 and the three outputs 87, 88, 89 as in the treefix module of FIG. 4. An OR-gate 78 computes the segmentation signal that will be passed up. Multiplexer (MUX) 75 operates so that no value will be added from above to the value from the left subtree if there is a segment bit in the left subtree. MUX 76 operates so that no value will be added from the left subtree if there is a segment bit in the right subtree.

A segmented parallel-prefix circuit can be viewed as a prefix computation on values which are pairs: <P,S> where P is the value being operated on by the original operator, and S is a segmentation bit. We have the following operator:

$$\langle P_i, S_i \rangle \otimes seg \langle P_r, S_r \rangle = \begin{cases} \langle P_r, 1 \rangle & \text{if } S_r = 1, \\ \langle P_i \otimes P_r, S_i \rangle & \text{otherwise.} \end{cases}$$

We can show that this operator is associative. To do this we show that $$(\langle P_a, S_a \rangle \otimes \langle P_b, S_b \rangle) \otimes \langle P_c, S_c \rangle = \langle P_a, S_a \rangle \otimes (\langle P_b, S_b \rangle \otimes \langle P_c, S_c \rangle).$$

Proof: If $S_c = 1$ then $$(\langle P_a, S_a \rangle \otimes \langle P_b, S_b \rangle) \otimes \langle P_c, S_c \rangle = (\langle P_a, S_a \rangle \otimes \langle P_b, S_b \rangle) \otimes \langle P_c, 1 \rangle$$
$$= \langle P_c, 1 \rangle$$
$$= \langle P_c, S_c \rangle$$

and $$(\langle P_a, S_a \rangle \otimes \langle P_b, S_b \rangle \otimes \langle P_c, S_c \rangle) = \langle P_a, S_a \rangle \otimes (\langle P_b, S_b \rangle \otimes \langle P_c, 1 \rangle)$$
$$= \langle P_a, S_a \rangle \otimes \langle P_c, 1 \rangle$$
$$= \langle P_c, 1 \rangle$$
$$= \langle P_c, S_c \rangle$$

Otherwise $$(\langle P_a, S_a \rangle \otimes \langle P_b, S_b \rangle) \otimes \langle P_c, S_c \rangle = (\langle P_a, S_a \rangle \otimes \langle P_b, S_b \rangle) \otimes \langle P_c, 0 \rangle$$
$$= (\langle P_a, S_a \rangle \otimes \langle P_b, S_b \rangle)$$

and $$(\langle P_a, S_a \rangle \otimes \langle P_b, S_b \rangle \otimes \langle P_c, S_c \rangle) = (\langle P_a, S_a \rangle \otimes \langle P_b, S_b \rangle) \otimes \langle P_c, 1 \rangle$$
$$= (\langle P_a, S_a \rangle \otimes \langle P_b, P_b \rangle)$$
$$= \langle P_c, 1 \rangle$$
$$= \langle P_c, S_c \rangle$$

Thus, a segmented parallel-prefix is associative, and our tree switch circuit can be viewed as an ordinary parallel-prefix circuit with a certain associative operator. (See [5, Exercise 30-1].)

1.1.3 Variations on Prefix Circuits

Often, the prefix is modified slightly from the formulae given above. For example, an inclusive prefix has $$y_i = \bigotimes_{k=0}^{i} x_k$$

instead of $$y_i = \bigotimes_{k=0}^{i-1} x_k.$$

An inclusive segmented prefix has $$y_i = \bigotimes_{j=k_i+1}^{i} x_i,$$

instead of $$y_i = \bigotimes_{j=k_i}^{i-1} x_i.$$

Sometimes it is useful to have a backwards prefix operation. An exclusive backwards prefix operation is $$y_i = \bigotimes_{k=i+1}^{N-1} x_k.$$

Similarly, an inclusive version can be made with and without segmentation.

When implementing these circuits, one must be careful to get the "fencepost" conditions right. That is, the lower and upper bounds to the summation index must be thought through carefully to avoid designed-in errors in the circuits. Note: Sometimes prefix circuits are called "scan chains" (See, e.g., [9,27].)

1.2 Superscalar Processors

The second background area for this invention is superscalar processors. FIGS. 8–10 show a six-stage pipeline processor 100 illustrative of how today's superscalar processors are organized. The stages, are Fetch, Rename, Analyze, Schedule, Execute, and Broadcast. An example set of three instructions is shown as they propagate through each of the stages.

The Fetch stage comprises an arithmetic logic unit (ALU) 105, a program counter 110, a multiplexer 115, and a pipeline register 120. Program counter 110 keeps track of the next instruction to be executed. The program counter's value is used as a memory address to fetch several words from an instruction cache ("I-cache" (not shown).) In this example, four instructions are fetched from the I-cache. The new program counter is computed by adding a value to the old program count. The value added depends on prediction logic (labeled "PREDICT".) If the prediction logic predicts that there are no taken branches in the next four instructions, then the new program count is the old program count plus 4. If the prediction logic predicts that one of the instructions is a taken branch, then the predictor selects the branching instruction, and the "offset" field of the instruction is added to the old program count to get the new program count. The logic for handling absolute branches and mispredictions is not shown here. The four instructions are latched in pipeline register 120 between the Fetch and Rename stages.

The Rename stage comprises renaming logic 125 including a renaming table 130 and a pipeline register 135. The rename stage takes instructions and rewrites them to make it easier to execute them in parallel. In the example shown the instructions are

0: R0:=R1+R2
1: R3:=R0/R1
2: R0:=R1/R5

Note that Instruction 2 is logically independent of Instruction 1, and they may run in parallel. Instruction 2 writes to Register R0, however, and if that write happens before Instruction 1 reads from Register R0, then the wrong value will be used by Instruction 1. This problem is referred to as a "write-after-read" hazard. To allow parallel execution of Instructions 1 and 2 without suffering from the write-after-read hazard, the renaming stage rewrites the instruction to use a different set of registers, called tags. The program is transformed into

0: T42:=T35+T40
1: T43:=T42/T35
2: T44:=T35/T41

In this case we assumed that the most recent writer of Register R1 had been renamed to write to Tag T35, the most recent R2 to T40, and the most recent R5 to T41. Three new tags are allocated: T42, T43, and T44, and the registers are renamed appropriately. To facilitate this renaming a Renaming Table is used to provice a mapping from register names to tag names.

FIG. 11 shows the contents of the renaming table before and after renaming each of the three instructions mentioned above. Note that the table renames all the registers, not just the ones mentioned earlier. Thus, initially R0 is renamed to T30, and then after renaming Instruction 0, R0 is renamed to T42, and then after renaming Instruction 2, R0 is renamed to T44. Register R3 was initially renamed to T25 and was renamed to T43 after Instruction 1. The renaming for R2 was not affected by these three instructions, since none of the instructions mentioned R2 as a destination register.

The circuit for identifying free tags is not shown in FIG. 11. Such a circuit would, in this case, identify up to four unused tags. In our example we assume that the four unused tags are T42 through T45. Some systems allocate and deallocate the tags so that contiguous tags are always allocated, whereas some systems can allocate an arbitrary set of four tags.

The exact implementation of the Rename stage varies from processor to processor. Although we have shown the Rename stage renaming registers to successive tags (T42, T43, and T44), in general, there is no requirement that sequentially allocated tags have sequential numbers. Some superscalar processor implementations do have such a requirement. Others do not. Those that do not require circuitry to identify on every clock cycle up to four unused tags out of the list of unused tags. The renaming table also need not be directly addressed by the logical register number. The Digital Alpha 21264 compresses entries out of the renaming table when they are no longer needed. This means that the table requires an associative lookup, instead of a direct lookup [8].

After renaming, instructions are sent via pipeline register 135 to the Analyze Dependencies stage. This stage includes a reordering buffer 140 and a pipeline register 145. In this stage, instructions whose inputs are all available are identified as ready to run. Reordering buffer 140 keeps track of this dependency information. FIG. 9 illustrates some of the instructions stored in the reordering buffer but does not depict additional information that is ordinarily kept there.

Instructions are stored in the reordering buffer in sequential order. The "Old" and "New" pointers point at the oldest and the newest instruction in the sequence, respectively. Buffer entries to the left of "Old" and to the right of "New" are not currently in use. A signal is produced for each instruction in the buffer indicating whether it is ready to run, and if so, what execution resource it needs. in FIG. 9 an arrow 143 from buffer 140 to register 145 identifies those instructions that are ready to run, and the absence of an arrow identifies those instructions not ready to run. On the arrow, the labels "Mem", "Add", or "Div" indicatie whether that instruction needs to access memory, an ALU capable of adding, or an ALU capable of dividing. In our example, the instruction at buffer entry 38 is ready to add, the one at entry 41 is ready to access memory, the one at entry 42 is ready to add, and the one at entry 44 is ready to divide. This information is stored in pipeline register 145 between the Analyze Dependencies stage and the Schedule stage.

The Schedule stage comprises a scheduler 150 and a pipeline register 155. This stage assigns specific execution resources to the collection of instructions that are ready to run. In our example, the instructions at entries 38, 41, and 44 are assigned to particular functional units, and the instruction at entry 42 is not scheduled. Scheduler 150 obtains the actual operands from reordering buffer 140, and feeds them via pipeline register 155 to the appropriate functional units in the Execute stage.

The Execute stage comprises an ALU 160 for adding, an ALU 165 for dividing, an interface to memory (168), and a pipeline register 170. This stage executes each of the instructions provided by scheduler 150 so as to actually perform the arithmetic or memory operation. When the result is computed, it notifies the Broadcast stage 175.

The Broadcast stage takes computed results from the Execute stage and broadcasts them back to the Analyze Dependencies stage in FIG. 9. All instructions in the reordering buffer associatively listen to the broadcast. As a result of the broadcast, more instructions may become ready to execute because their dependencies have been satisfied.

Different processors reuse entries in their reordering buffer differently. Those that assign tags serially can use each assigned tag as a direct address into the reordering buffer at which to store the renamed instruction. This is the case in FIG. 9. These processors including the Alpha 21264 write values to a canonical register file by compressing the entries in the reorder buffer so that the instruction in Buffer Entry 0 is always the oldest [8]. When scaled up, the circuitry used in the 21264 for compressing the window requires large area and has long critical-path lengths, however.

When the reorder buffer fills up, some processors exhibit performance anomalies. Some processors empty the reorder buffer, instead of wrapping around, and commit all results to the register file before they start back at the beginning. Some processors wrap around, but start scheduling newer instructions instead of older ones, which can hurt performance. (See [33] for an example of a circuit that works that way.)

In some processors there is an additional decode stage after the fetch stage, but before the rename stage. This stage may interpret a complex instruction stream, translating it to a simpler instruction stream. The Intel Pentium Pro does this.

In most processors there is bypass logic to allow data to move directly from the Broadcast stage to the Execute stage, bypassing the Analyze Dependencies stage and the Schedule stage. We do not show that bypass logic here, but that logic also has long critical-path lengths and large area in today's designs.

1.2.1 Microprocessor Performance

The standard model for modeling the performance of a microprocessor [14] says that the time to run a program is $T=N \cdot CPI \cdot \tau$ where N is the number of instructions needed to run the program, CPI is the number of clock periods per instruction, and $\tau$ is the length of a clock period in seconds, i.e. the cycle time.

The value of $\tau$ is determined by the critical-path length through any pipeline stage, that is the longest propagation delay through any circuit measured in seconds. Propagation delay consists of delays through both gates and wires, or alternately of delays through transistors driving RC networks. We are not changing N or directly changing CPI, but rather we aim to reduce the clock cycle by redesigning the processor to use circuits with reduced critical-path length.

One way to avoid slowing down the clock is by breaking down the processor into more pipeline stages. Increasing the number of pipeline stages offers diminishing returns, however, as pipeline registers begin to take up a greater fraction of every clock cycle and as more clock cycles are needed to resolve data and control hazards. In contrast, shortening the critical path delay of the slowest pipeline stage translates directly into improved program speed as the clock period decreases and the other two parameters remain unchanged.

The critical-path delays of many of today's processor circuits do not scale well. For example, Palacharla, Jouppi, and Smith [32J find that many of the circuits in today's superscalars have asymptotic complexity $\Omega(I^2+W^2)$, where I is the issue width (i.e., the maximum number of instructions that are fetched in parallel from the cache) and W is the window size (i.e., the maximum number of instructions within the processor core) of the processor. While delays appear to be practically linear for today's processors, optimized for I equal to four, and W in the range of 40 to 56, the quadratic terms appear to become important for slightly larger values of I and W. (Note that for today's processors with large W the window is typically broken in half with a pipeline delay being paid elsewhere. An HP processor sets W=56 [10]. The DEC 21264 sets W=40 [8]. Those systems employ two windows, each half size, to reduce the critical-path length of the circuits. Communicating between the two halves typically requires an extra clock cycle.) Some of today's circuits have critical-path length that grows at least as fast as $\Omega(I^4)$ and have many components with area and power consumption that grows quadratically $\Theta(I^2)$. (See [30,32,1].) Increasing issue widths and increasing window sizes are threatening to explode the cycle time of the processor.

2. SUMMARY OF THE INVENTION

We have found that a very useful improvement to the parallel prefix circuit can be made by allowing the prefix operation to "wrap around" from the end back to the beginning. This extension is called Cyclic Segmented Parallel Prefix (CSPP.)

Further, such CSPP circuits are useful to improve the performance of many of the circuits in a superscalar processor. In some situations, it is especially advantageous to use CSPP because it avoids performance penalties in certain situations, for example, when the window fills up or wraps around. This part of the invention also contains a number of other novel circuits that can improve the performance of superscalar processors but that are not prefix circuits.

Further, it is possible to completely reorganize the processor to take advantage of CSPP to do all the scheduling and data movement. We call the resulting processor an Ultrascalar processor.

The circuits used in our invention all grow much more slowly than those of the superscalar processor, with gate delays of $O(\log I+\log W)$ and wire delays of $O(\sqrt{I}+\sqrt{W})$ for memory bandwidth comparable to today's processors. The asymptotic advantage of the Ultrascalar over today's circuits translates to perhaps an order-of-magnitude or more advantage when W is on the order of several hundreds or thousands, a design point advocated by [35].

The Ultrascalar processor, our completely reorganized architecture, breaks the scalability barrier by completely restructuring the microarchitecture of the processor. The Ultascalar turns the processor's datapath into a logarithmic depth network that efficiently passes data from producer instructions to consumer instructions within the reordering window. The network eliminates the need for separate renaming logic, wake-up logic, bypass logic, and multi-ported register files.

3. BRIEF DESCRIPTION OF THE DRAWINGS

These and other objects, features and advantages of our invention will be more readily apparent from the following Detailed Description of our invention in which FIG. 1 is a schematic representation of a linear-time prefix circuit of the prior art.

FIG. 11 is a schematic representation of the buffer of FIG. 9.

FIG. 26 is a schematic representation of computing the $9^{th}$ state in parallel.

4. DETAILED DESCRIPTION

4.1 Cyclic Segmented Parallel Prefix

Figure 1:
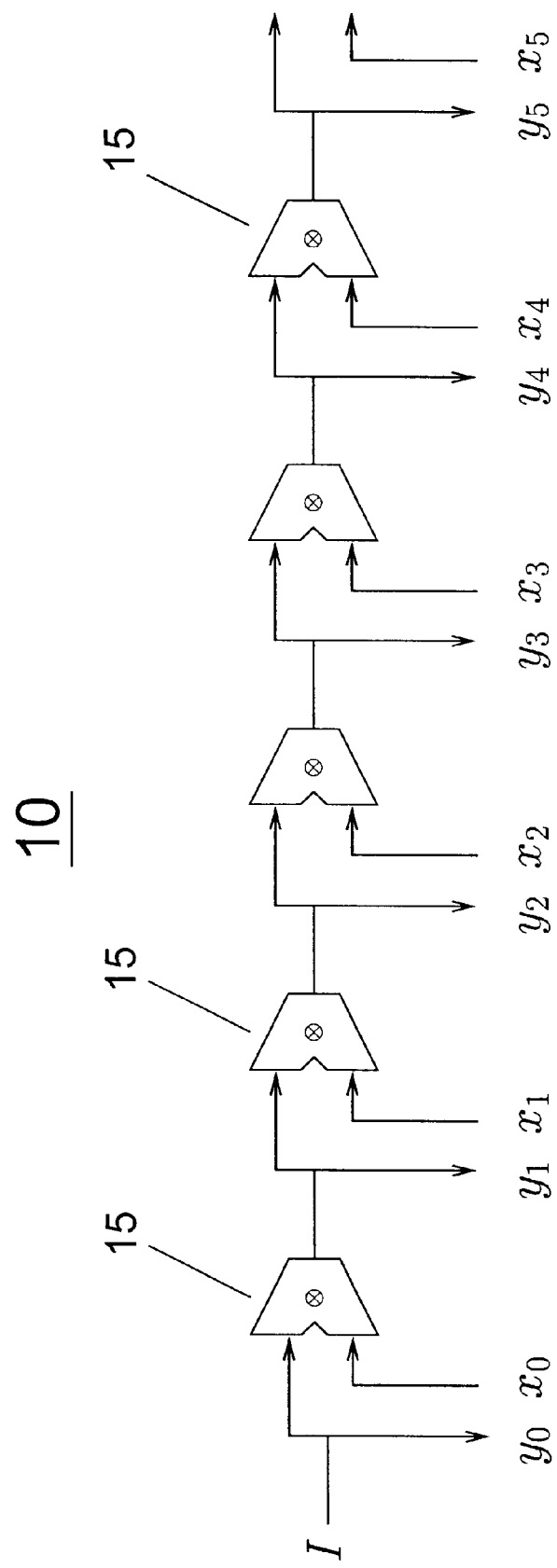

We can define a cyclic segmented prefix circuit by using modulo arithmetic for the indices of x and s. We let $$y_i = \bigotimes_{j=k_i}^{i-1} x_{(j \bmod n)},$$

where $k_i = \max\{k \text{ any integer}: k<i \text{ and } s_{(k \bmod n)}=1\}$, and i mod n=min$\{m \geq 0: (i-m)$ is a multiple of n.$\}$ This allows the values to "wrap around." Thus −4 mod 10=6. Note that $k_i$ may be negative.

Returning to our previous example, if the input to a cyclic parallel prefix is $$
\begin{aligned}
x &= \langle x_0, \ x_1, \ x_2, \ x_3, \ x_4, \ x_5, \ x_6, \ x_7, \ x_8, \ x_9 \rangle \\
&= \langle 1, \ \ 2, \ \ 3, \ \ 4, \ \ 5, \ \ 6, \ \ 7, \ \ 8, \ \ 9, \ 10, \rangle \\
s &= \langle s_0, \ s_1, \ s_2, \ s_3, \ s_4, \ s_5, \ s_6, \ s_7, \ s_8, \ s_9 \rangle \\
&= \langle 0, \ \ 0, \ \ 1, \ \ 0, \ \ 0, \ \ 0, \ \ 1, \ \ 0, \ \ 1, \ \ 0, \rangle
\end{aligned}
$$

then $$
\begin{aligned}
k &= \langle k_0, \ k_1, \ k_2, \ k_3, \ k_4, \ k_5, \ k_6, \ k_7, \ k_8, \ k_9 \rangle \\
&= \langle -2, \ -2, \ -2, \ 2, \ 2, \ 2, \ 2, \ 6, \ 6, \ 8, \rangle
\end{aligned}
$$

and $$\begin{aligned}
y &= \langle y_0, & y_1, & \quad y_2, & y_3, & y_4, & y_5, & y_6, & y_7, & y_8, & y_9 \rangle \\
&= \langle 9+10, & 9+10+1, & \ 9+10+1+2, & 3, & 3+4, & 3+4+5, & 3+4+5+6, & 7, & 7+8, & 9, \rangle \\
&= \langle 19, & 20, & \quad 22, & 3, & 7, & 12, & 18, & 7, & 15, & 9, \rangle
\end{aligned}$$

Figure 5:
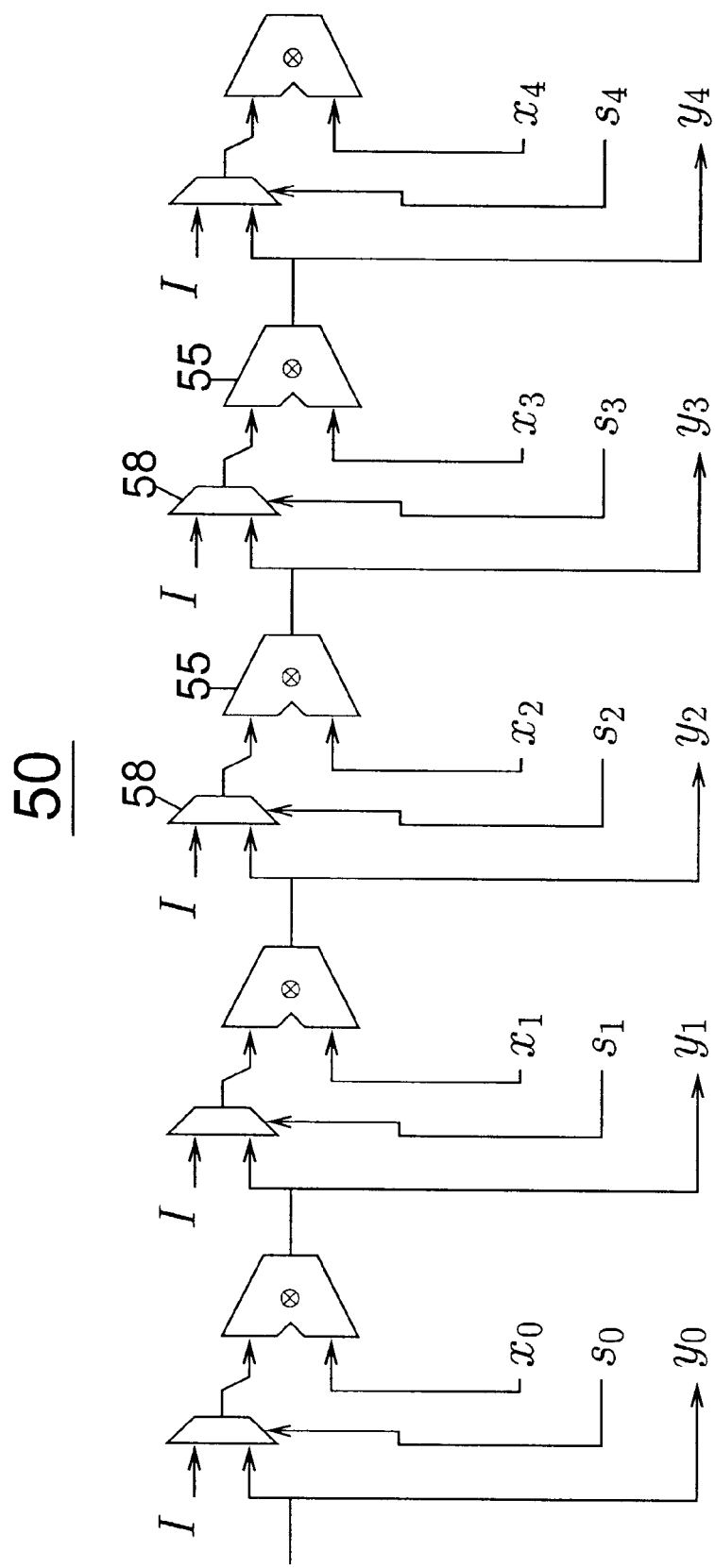
FIG. 5 is a schematic representation of a linear-time segmented prefix circuit of the prior art.
Figure 12:
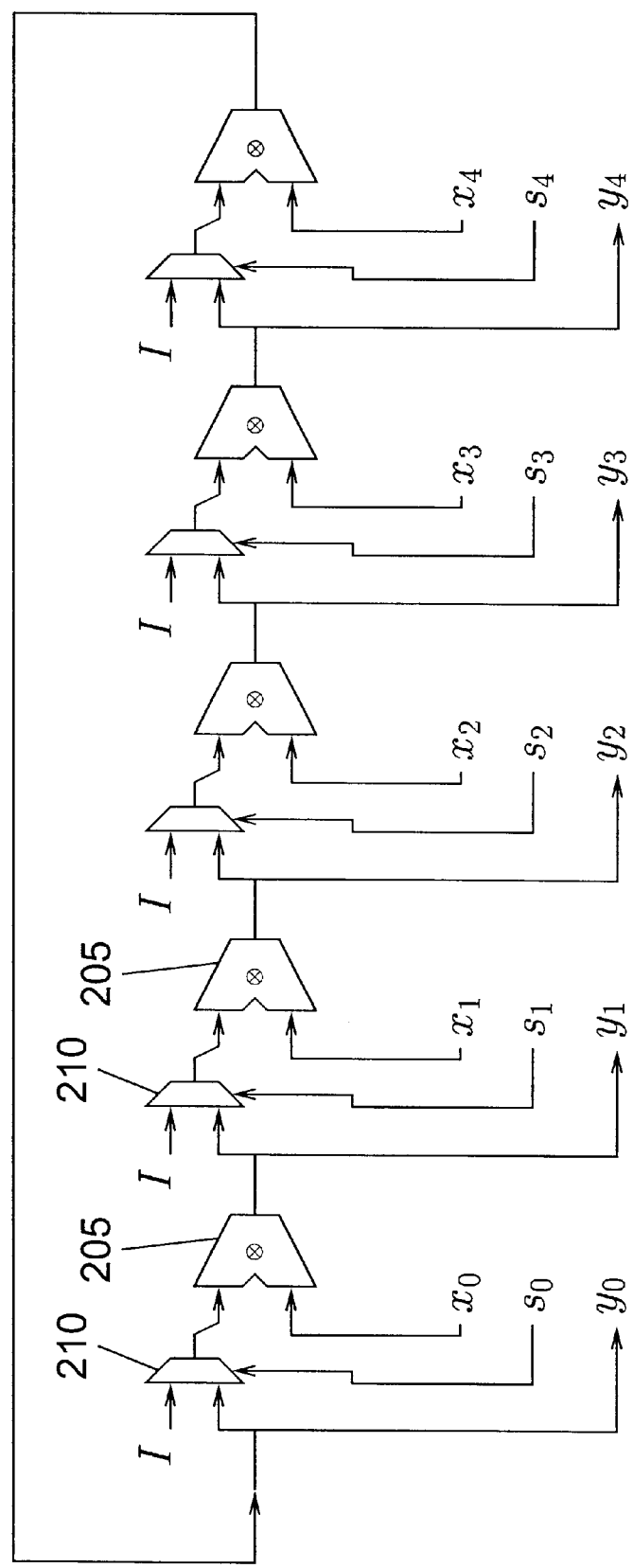
FIG. 12 is a schematic representation of an illustrative embodiment of a linear-time cyclic segmented prefix circuit of the present invention.

A linear-time cyclic segmented prefix circuit 200 is shown in FIG. 12. Circuit 200 comprises a plurality of two-input function generators 205. One input to each function generator is the output of a two-input multiplexer 210, which output is selected by a segment bit. One input to each multiplexer is the identity function. The other input is the output of the preceding function generator. The other input to each function generator is an value. Circuit 200 is similar to the linear-time prefix circuit 50 of FIG. 5 except that circuit 200 is wrapped around to be a ring.

Figure 6:
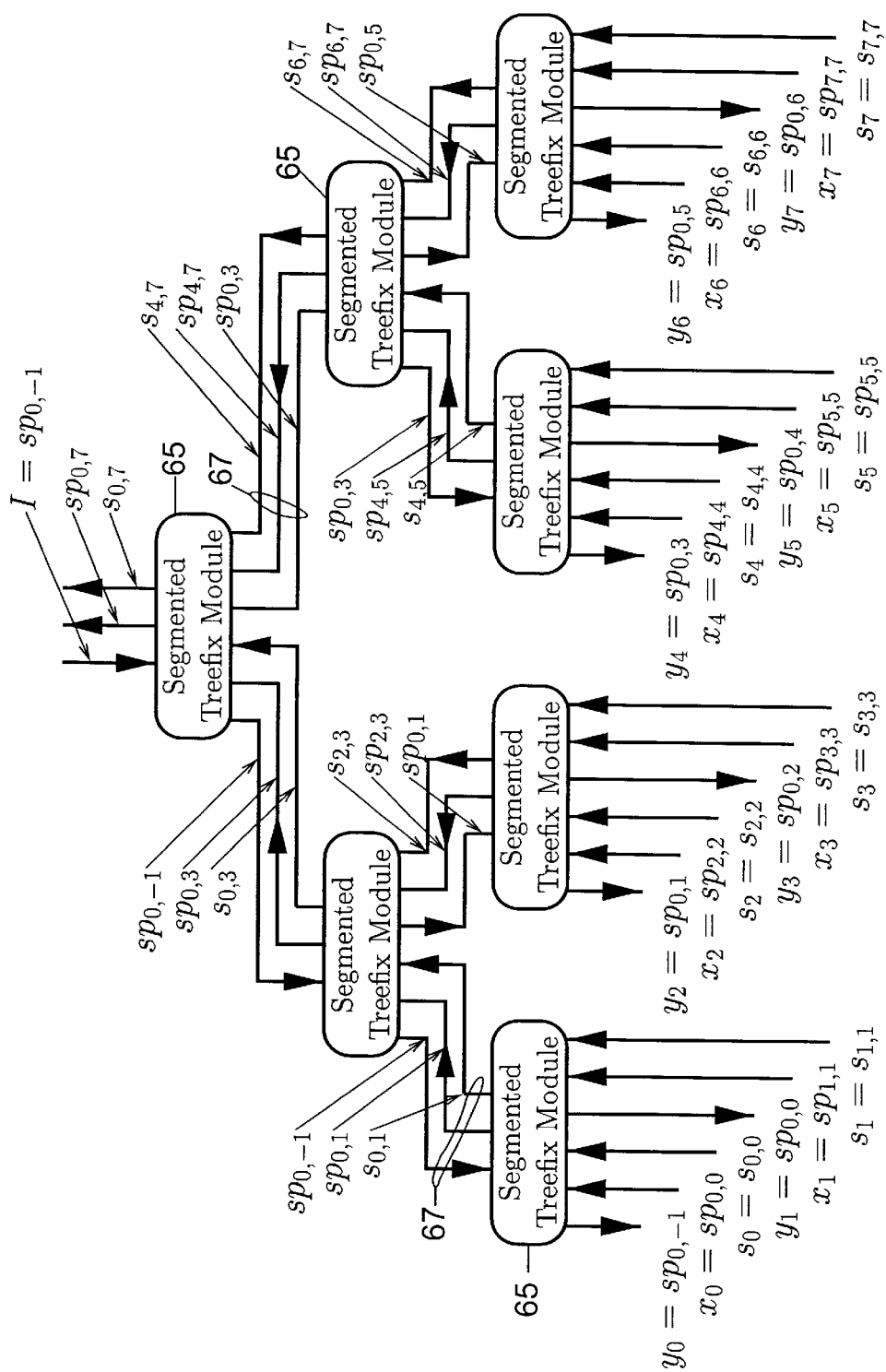
FIG. 6 is a schematic representation of a segmented parallel prefix circuit of the prior art.
Figure 7:
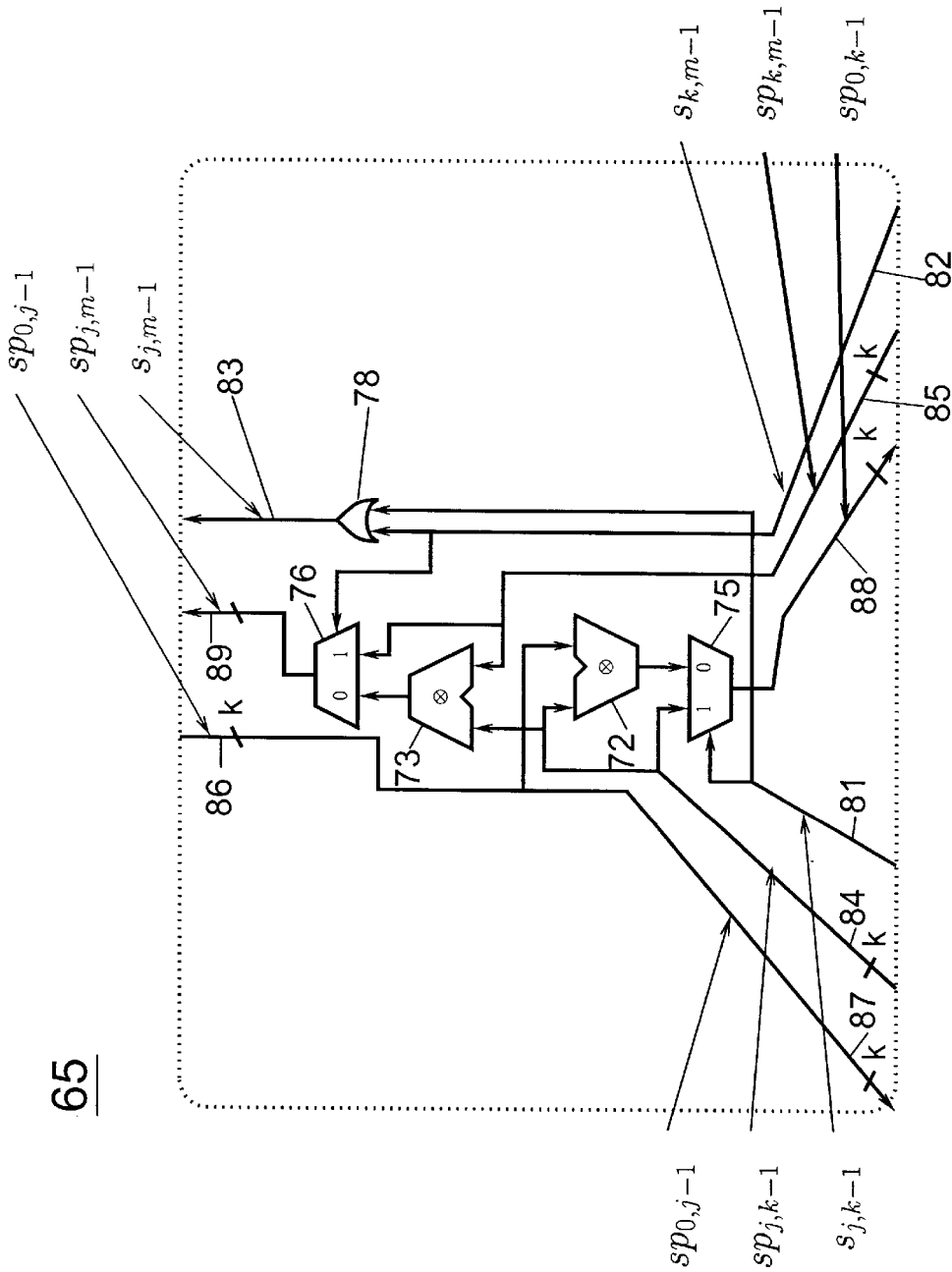
FIG. 7 is a schematic representation of a segmented treefix module of the prior art.
Figure 8:
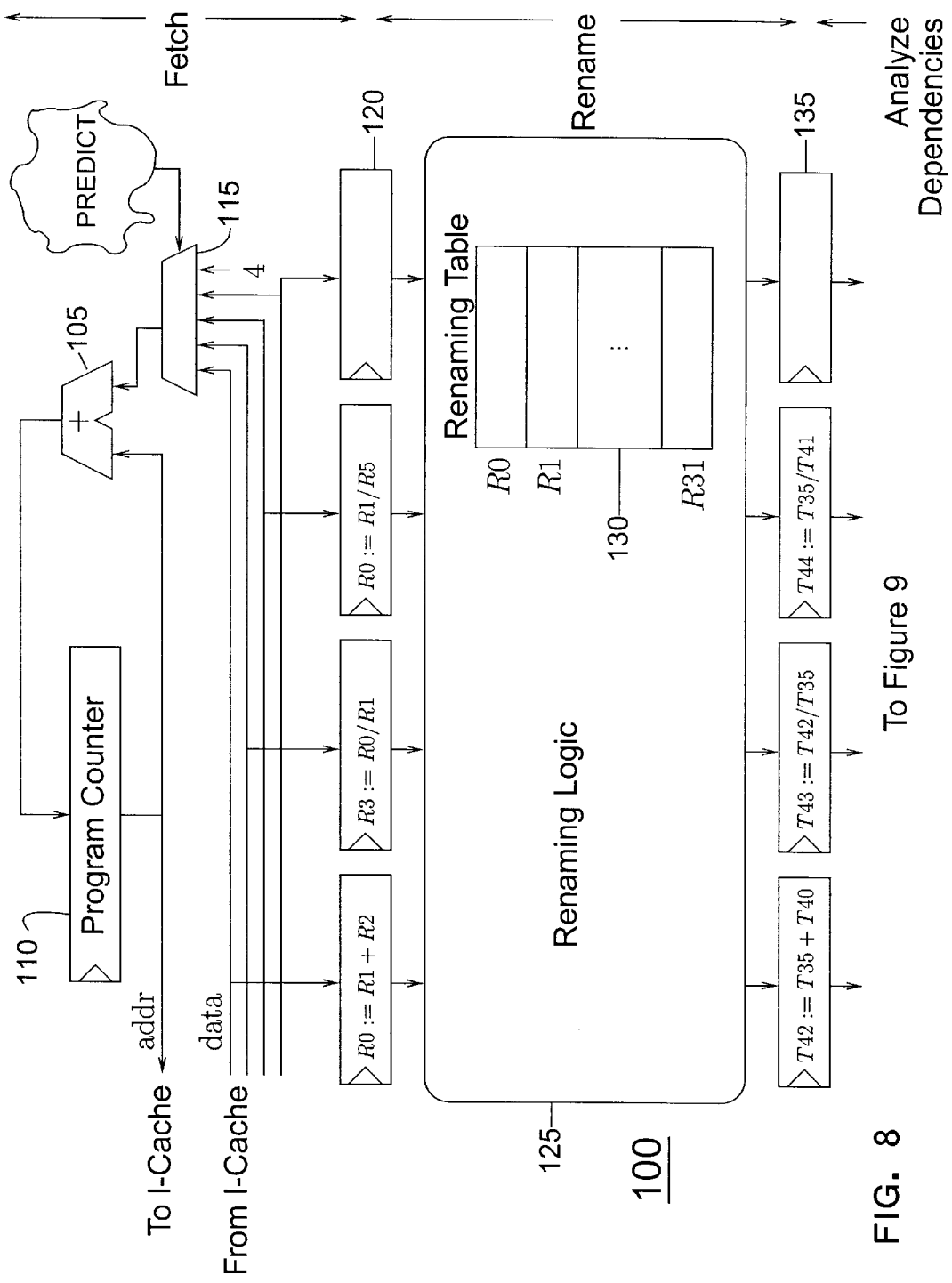
FIGS. 8, 9 and 10 are a schematic representation of a superscalar parallel processor of the prior art.
Figure 9:
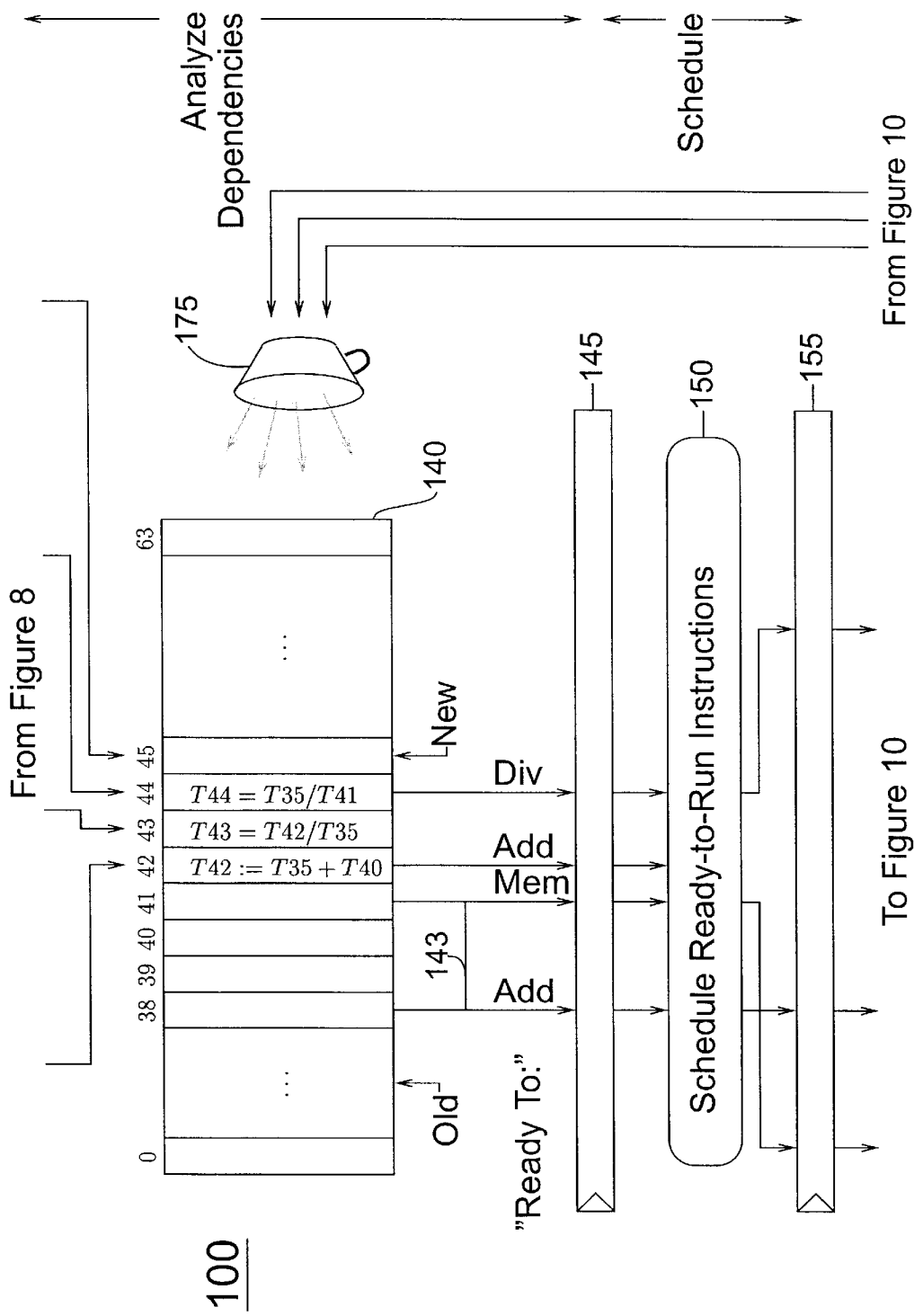
Figure 10:
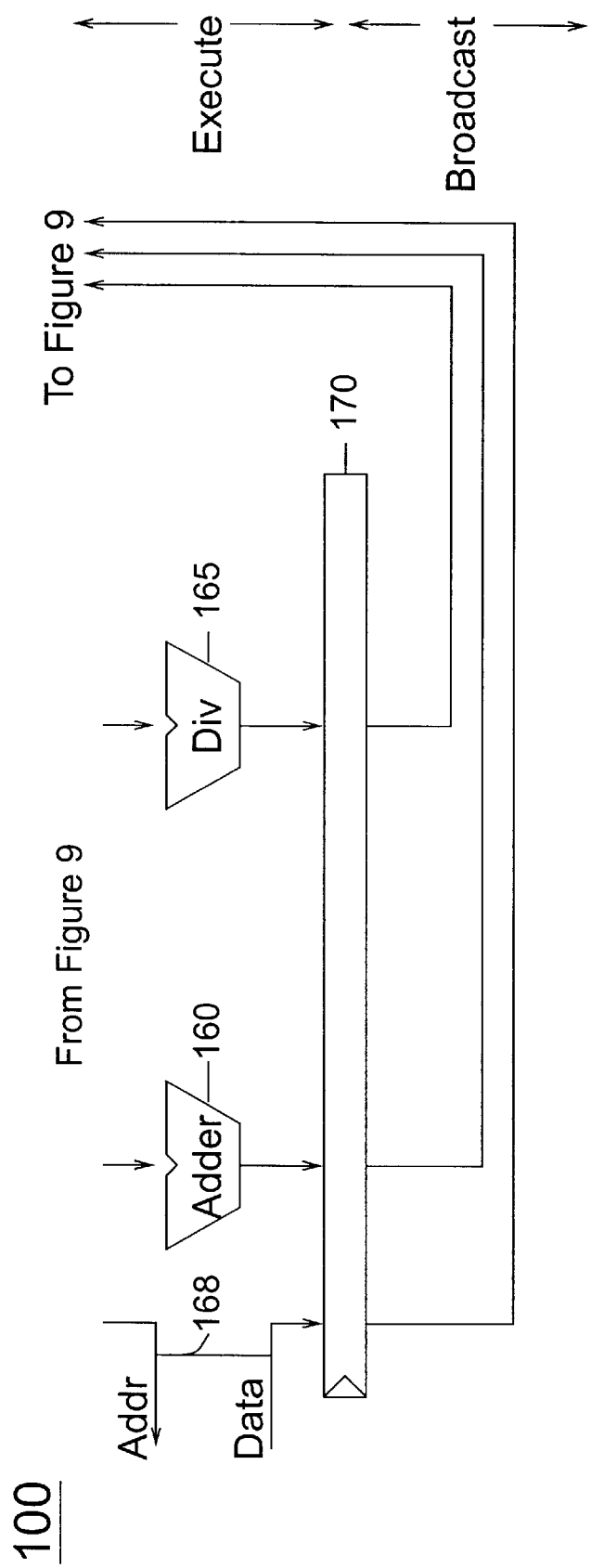
Figure 13:
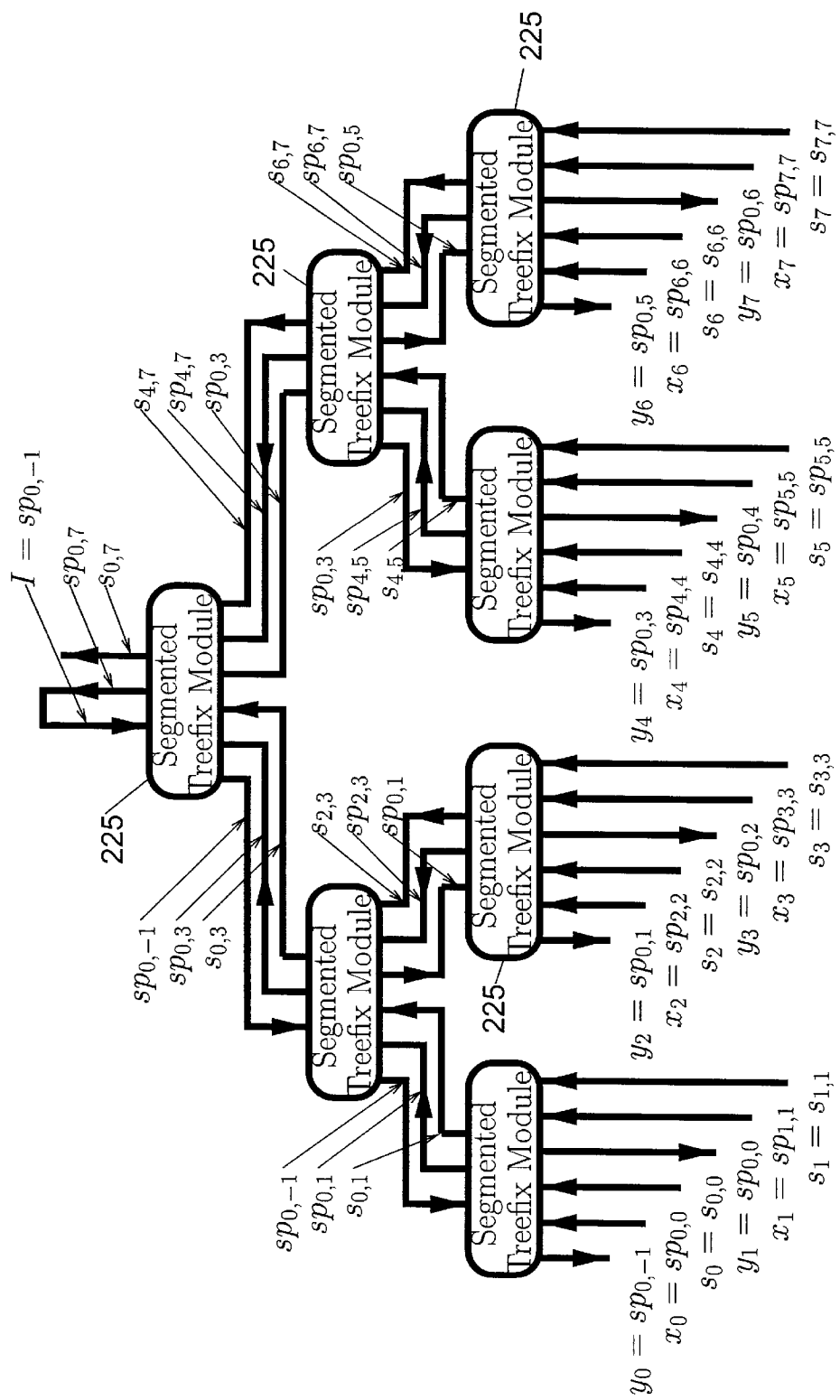
FIG. 13 is a schematic representation of an illustrative embodiment of a cyclic segmented parallel prefix (CSPP) circuit of the present invention.

A cyclic segmented parallel-prefix circuit can be implemented by starting with a segmented parallel prefix tree, and modifying it as follows: connect the output at the root of the tree to the input at the root, discarding the segment bit. FIG. 13 shows a cyclic segmented parallel prefix circuit (CSPP) 220 comprising a plurality of treefix modules 225 connected as shown. The individual treefix modules 225 are the same as treefix modules 65 of the segmented acyclic circuit shown in FIGS. 6 and 7. Note that the tree produces some value even if none of the segment bits are equal to one (there is no cycle in the combinational logic), but the value produced is not the indicated by the formula above.

Figure 14:
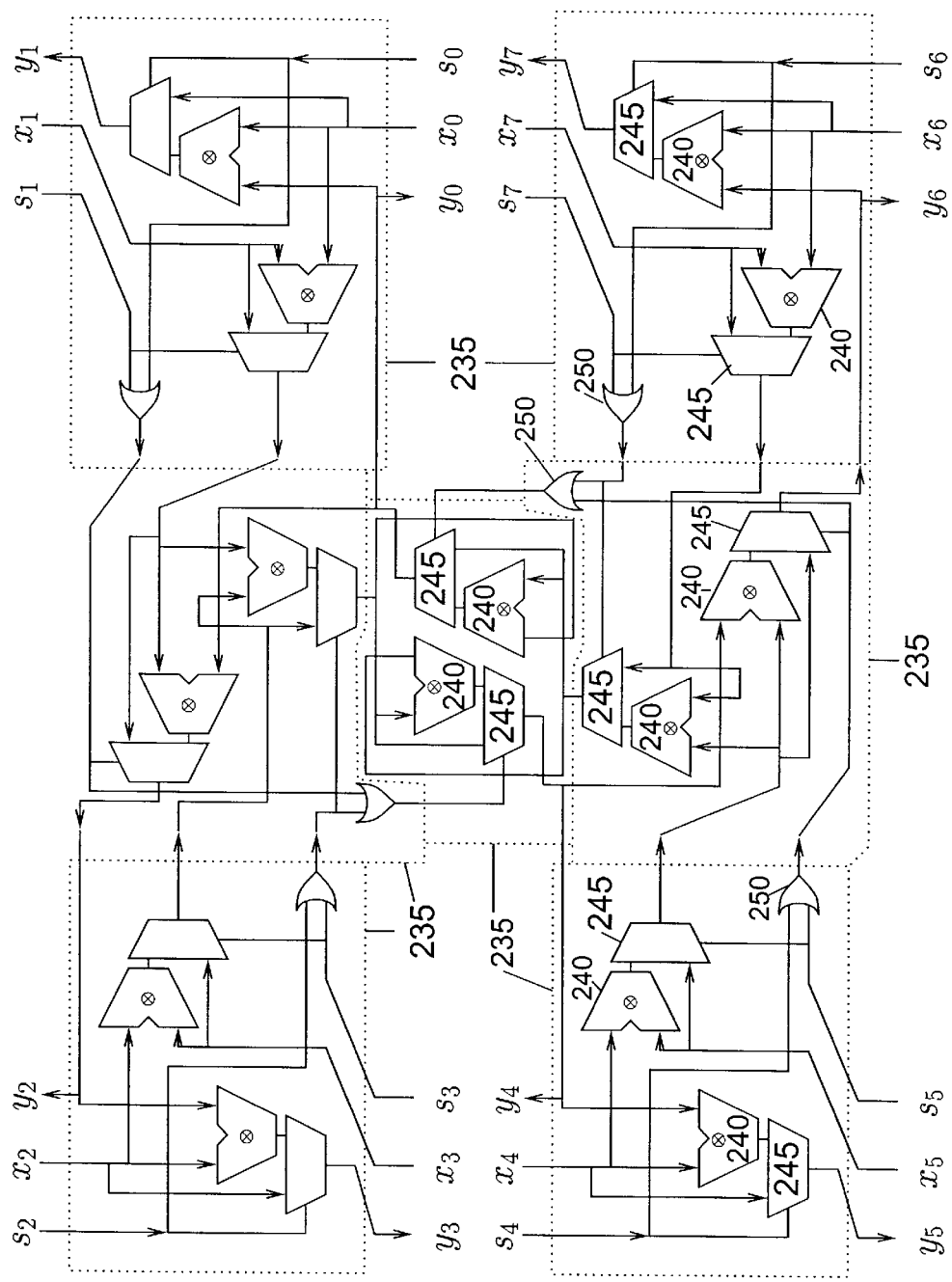
FIG. 14 is a schematic representation of an H-tree layout of the CSPP circuit of the present invention.

FIG. 14 shows a CSPP circuit 230 laid out in an H-tree layout. The subtree that is drawn on the left in FIG. 13 is at the top of FIG. 14 and the subtree on the right is at the bottom of FIG. 14. FIG. 14 comprises six treefix modules 235, each including two function generator 240 and two multiplexers 245. The leaf modules also include an OR gate 250. The root node of the tree has been optimized to take advantage of the fact that at least one of the segment bits must be set to one.

4.1.1 Variations of CSPP

Just as ordinary prefix circuits can have inclusive and/or backwards prefix operations, so also inclusive and/or backwards prefix operations can be implemented with cyclic segmented parallel-prefix circuits.

It is clear that there are many alternatives for building prefix circuits. One can build a linear-time prefix chain, or one can build a separate tree to compute each output, possibly sharing some common subexpressions, or one can build a single bidirectional tree as described here. One can vary the degree of the tree, so that instead of each node having two children, each node could have three or more children. One could vary the timing methodology. For example, in a self-timed system data traveling along the tree links would carry its own clocking information. Or one could build a globally clocked system. Other timing schemes would work as well. One could vary the technology so that the circuits are implemented in CMOS or Bi-CMOS or other logic families, and the communications links could be implemented with traces on circuit boards, or twisted pair cables, or coaxial cables, or fiber optic cables, or other technologies. Standard circuit optimization techniques can be used to improve the speed of the circuit. For example, in some technologies, NAND gates are faster than any other gate. In such technologies, the circuits using AND and OR gates could be transformed into circuits using only NAND gates. Another example is shown in FIG. 14 which shows a CSPP circuit of the AND function. In that case, the MUX is simplified to an OR gate.

4.1.2 Examples of CSPP

This section describes a number of CSPP circuits that we use in our designs. At block-level, all the CSPP circuits that we are about to describe are identical to each other. The different CSPP circuits only differ in their implementation of the treefix modules. In the following sections, we will specify different instances of these CSPP circuits by defining the circuit's inputs and wire widths.

Figure 15:
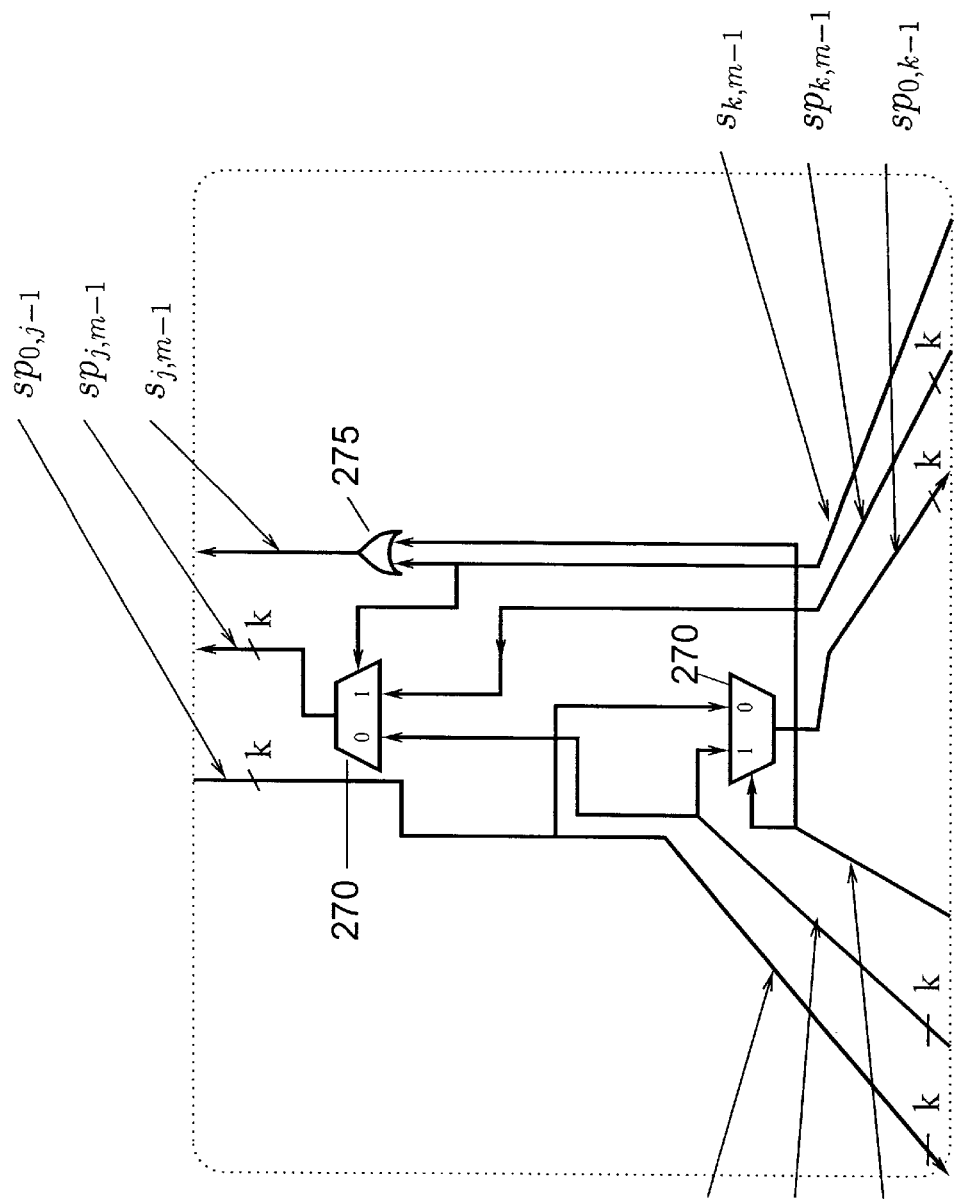
FIG. 15 is a schematic representation of a first embodiment of a treefix module for use in the invention.

The first example is the "oldest" CSPP circuit. The "oldest" CSPP circuit passes to each leaf node in the CSPP tree the input value of the oldest node in its segment. This circuit is useful for passing data between producer and consumer instructions, for example. The "oldest" CSPP circuit uses the operator $a \otimes b = a$. FIG. 15 illustrates the circuitry inside each treefix module for an "oldest" CSPP circuit 260. The circuitry comprises first and second multiplexers 270 and an OR gate 275. The inputs to the OR gate are the segment bits from the left and right subtrees. The output of the OR gate is a segment bit that is applied to the next treefix module in the tree. The segment bit from the right subtree also controls the upper multiplexer to determine whether signals from the left subtree or the right subtree are passed to the next module. The segment bit from the left subtree controls the lower multiplexer to detect whether signals from the left subtree or the next module are passed to the right subtree.

Figure 16:
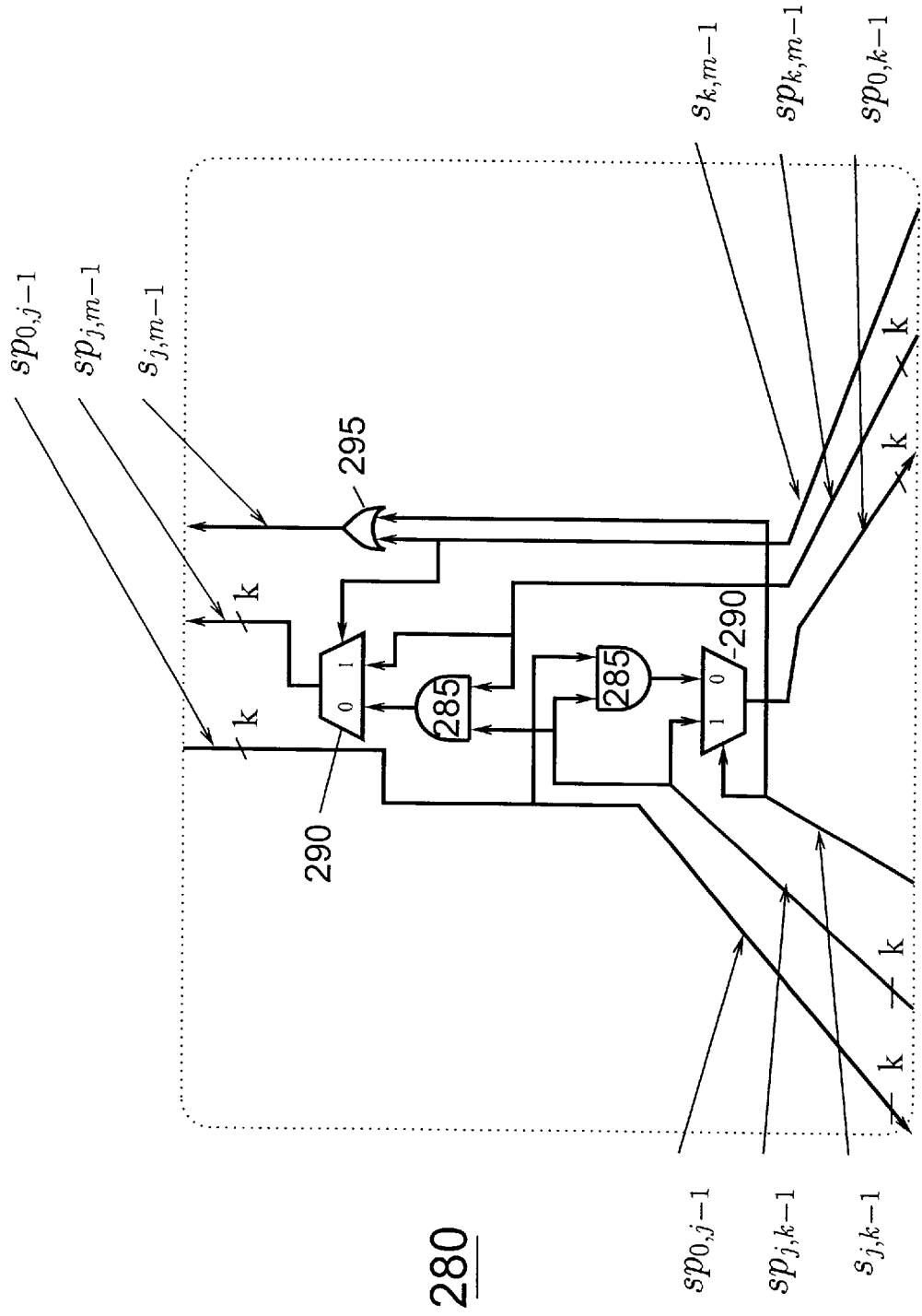
FIG. 16 is a schematic representation of a second embodiment of a treefix module for use in the invention.

Another very useful type of a CSPP circuit is the conjunction CSPP circuit. The conjunction CSPP circuit tells each leaf node in the CSPP tree whether all preceding leaf nodes within its segment have met a certain condition. For example, a conjunction CSPP circuit can tell each instruction within an instruction window whether all preceding instructions have computed. The conjunction CSPP circuit uses the operator $a \otimes b = a \wedge b$. FIG. 16 shows the circuitry inside each treefix module for a conjunction CSPP circuit 280. Circuit 280 takes a k-bit input, and performs bitwise logical AND operations on those inputs. This can be viewed as performing k independent AND operations using a single, shared, segment bit. Circuit 280 comprises first and second AND gates 285, first and second multiplexers 290 and an OR gate 295. The inputs to OR gate 295 are the segment bits from the left and right subtrees. The output of the OR gate is a segment bit that is applied to the next treefix module in the tree. The segment bit from the right subtree also controls the upper multiplexer and the segment bit from the left subtree controls the lower multiplexer. Signals from the right subtree are one input to the upper multiplexer and the logical AND of the signals from the left and right subtrees is the other input. Signals from the left subtree are one input to the lower multiplexer and the logical AND of the signals from the next module and from the left subtree is the other input.

Figure 17:
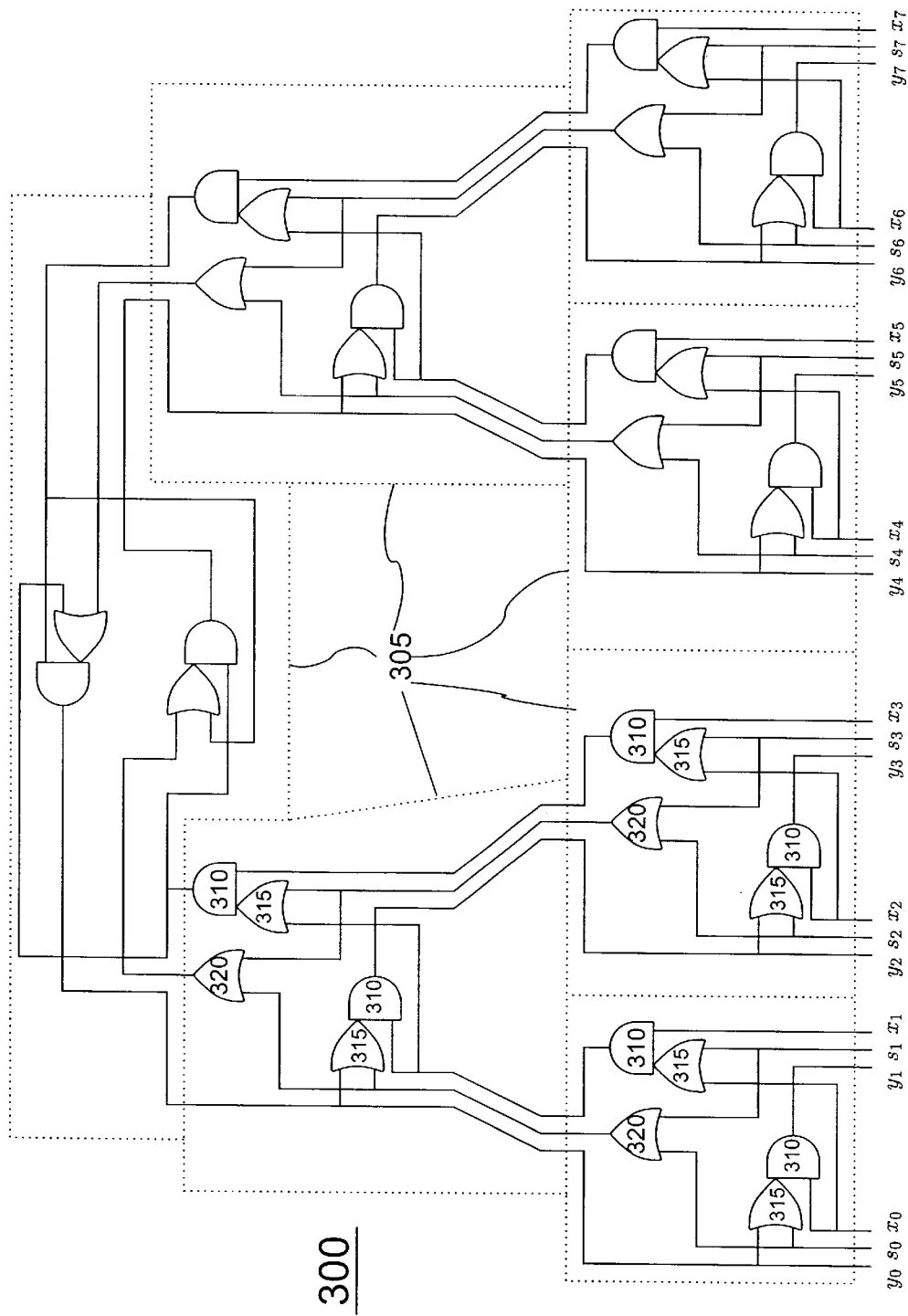
FIG. 17 is a schematic representation of a preferred embodiment of a CSPP circuit of the present invention.

Of course, the circuitry within each treefix module can be optimized. For example, FIG. 17 shows an optimized, 8-leaf-node conjunction CSPP 300 with input and output width of 1 (k=1). Circuit 300 comprises six treefix modules 305 each including two-input AND gates 310. One of the two inputs to each AND gate is the output of an OR gate 315. The leaf modules also include an additional OR gate 320 which ORs together the segment bits from the left and right subtrees.

Figure 18:
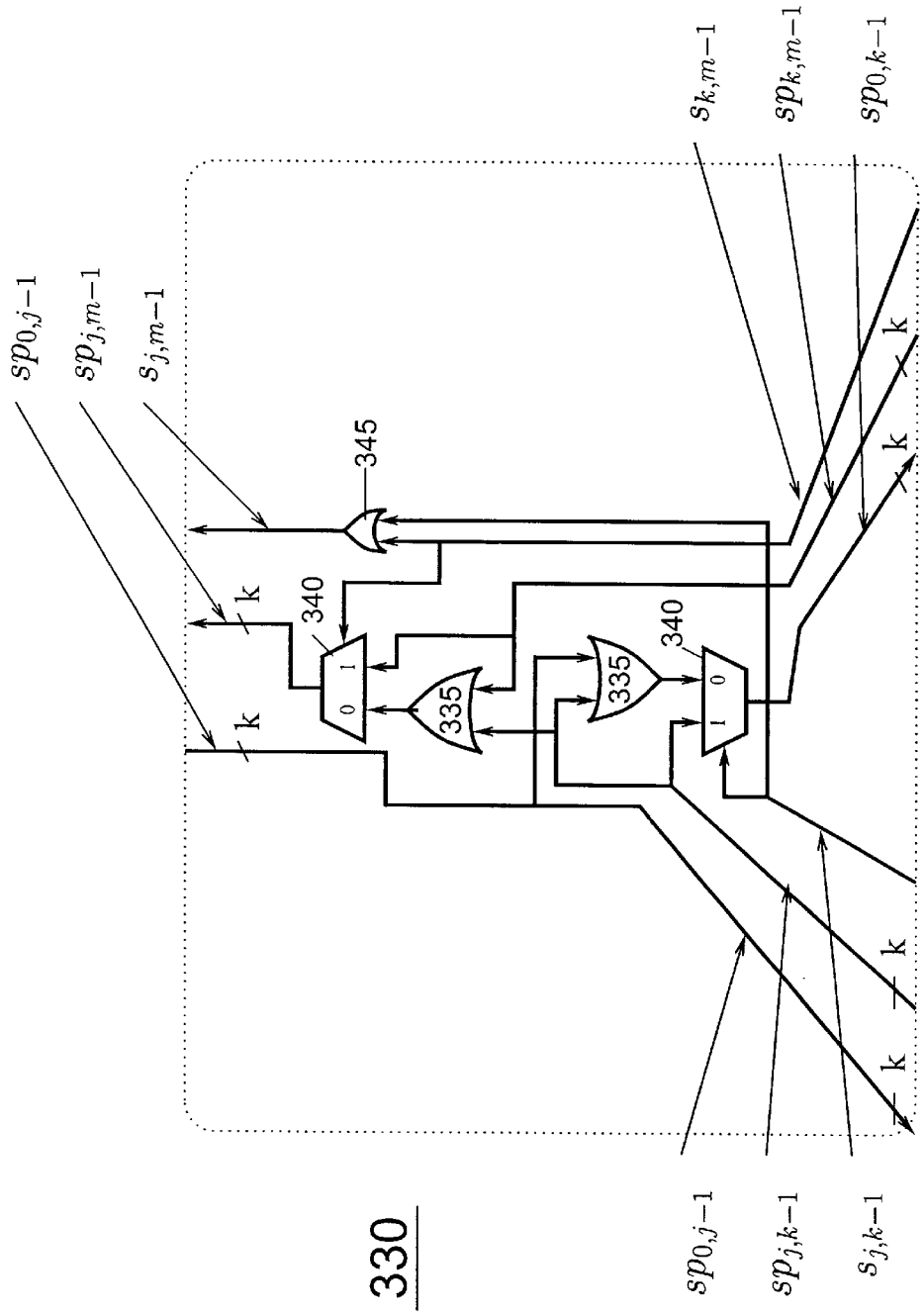
FIG. 18 is a schematic representation of a third embodiment of a treefix module for use in the present invention.

A disjunction CSPP circuit indicates whether any previous node within the segment has met a certain condition. This can be implemented by inverting the $x_i$ inputs and the $y_i$ outputs for the conjunction CSPP circuit, or it can be implemented directly. FIG. 18 shows an unoptimized treefix module 330 for a disjunction CSPP circuit. Of course this module can also be optimized from $$f(a, b, s) = \begin{cases} a \vee b & \text{if } \bar{s} \\ b & \text{otherwise,} \end{cases}$$

$$f(a, b, s) = b \vee (a \wedge \bar{s}).$$

Module 330 comprises first and second OR gates 335, first and second multiplexers 340, and a third OR gate 345. The inputs to OR gate 345 are the segment bits from the left and right subtrees. The output of the OR gate is a segment bit that is applied to the next higher treefix module in the tree. The segment bit from the right subtree also controls the upper multiplexer 340 and the segment bit from the left subtree controls the lower multiplexer 340. Signals from the right subtree are one input to the upper multiplexer and the logical OR of the signals from the left and right subtrees is the other input. Signals from the left subtree are one input to the lower multiplexer and the logical OR of the signals from the next module and from the left subtree is the other input.

Figure 19:
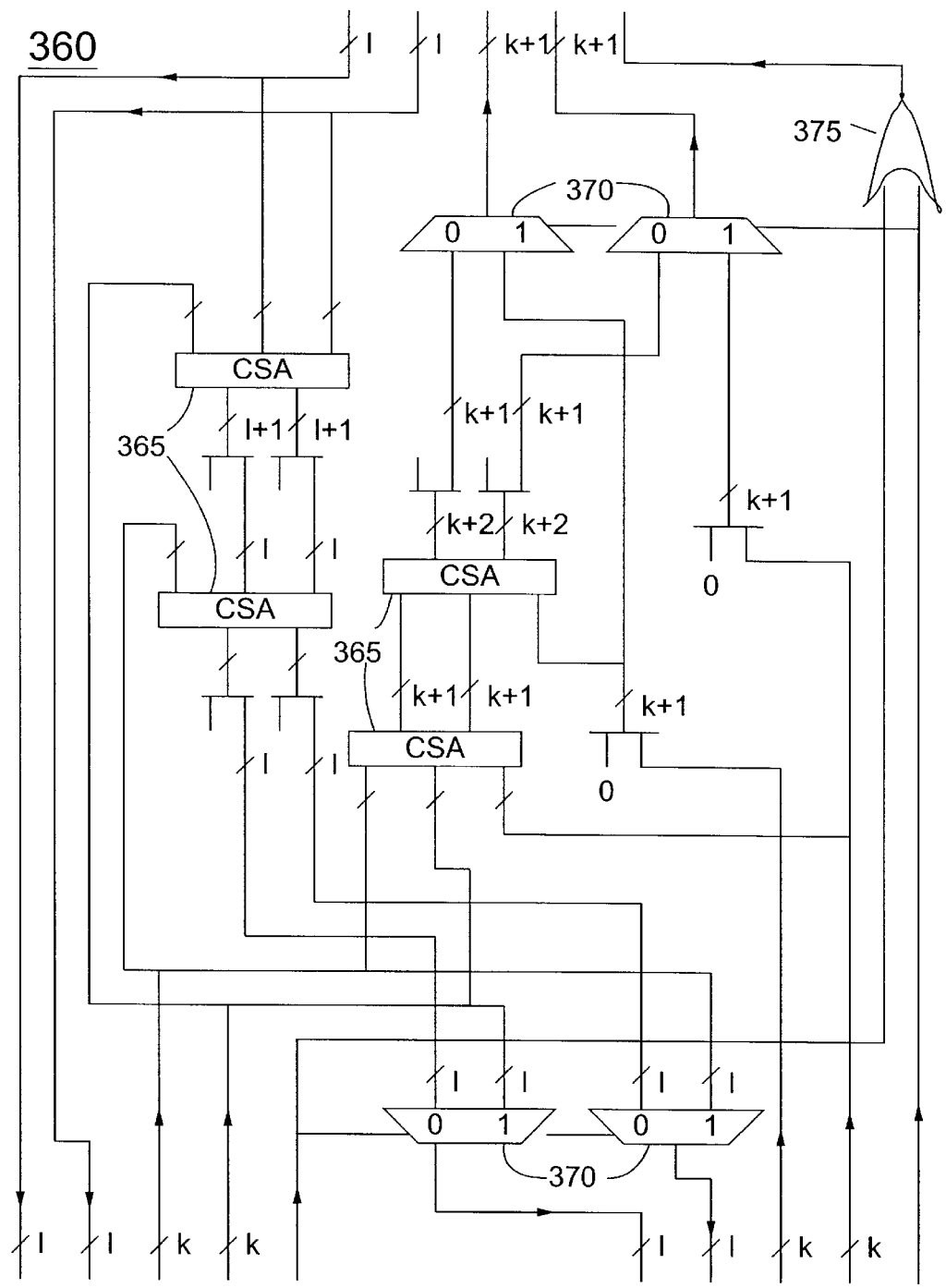
FIG. 19 is a schematic representation of another embodiment of a CSPP circuit of the present invention.

Another important type of a CSPP circuit is the summation CSPP circuit. The summation CSPP circuit tells each leaf node the sum of the preceding leaf nodes' inputs within its segment. A summation CSPP can be used, for example, to sum up the number of requests for a resource. A straightforward implementation of a summation CSPP uses a lookahead adder for each $\otimes$ operator. A more efficient implementation can be achieved by using carry-save adders. FIG. 19 shows one possible implementation of a treefix module 360 for a summation CSPP circuit. Module 360 comprises first and second pairs of cascaded carry-save adders (CSA) 365, first and second pairs of multiplexers 370 and an OR gate 375. The inputs to OR gate 375 are the segment bits from the left and right subtrees. The output of the OR gate is a segment bit that is applied to the next treefix module in the tree. The segment bit from the right subtree also controls the upper pair of multiplexers and the segment bit from the lower subtree controls the lower pair of multiplexers. Signals from the right subtree are one input to the upper pair of multiplexers and the other input is the output of one of the cascaded pairs of CSA. Signals from the left subtree are one input to the lower pair of multiplexers and the other input is the output of the second pair of cascaded CSAs.

This CSPP circuit represents each sum by two partial sums that add up to the sum. Each pair of CSAs reduces four partial sums to two partial sums. Each CSA takes three n bit inputs and produces two n+1 bit outputs. As partial sums propagate up the tree, they increase in size by one bit at each treefix module. (In some situations, it is known that the output requires at most n bits to represent, in which case the high order bits can be removed from the circuit. An example of such a situation is adding together 32-bit numbers modulo $2^{32}$ to get a 32-bit sum for an address calculation.)

The advantage of using CSA circuitry is that the entire summation of n numbers to produce a k-bit result can be performed with critical-path delay $\Theta(\log n + \log k)$ instead of $\Theta(\log n \cdot \log k)$ for adders using a nonredundant representation.

4.2 Parallel Prefix in a Conventional Superscalar Processor

This section describes a number of novel circuits that can improve the performance of traditional superscalar processors. These novel circuits can plug into a traditional superscalar processor, replacing an existing component such as the scheduler. Most of the circuits are instances of CSPP circuits.

4.2.1 Fetch Logic

Figure 20:
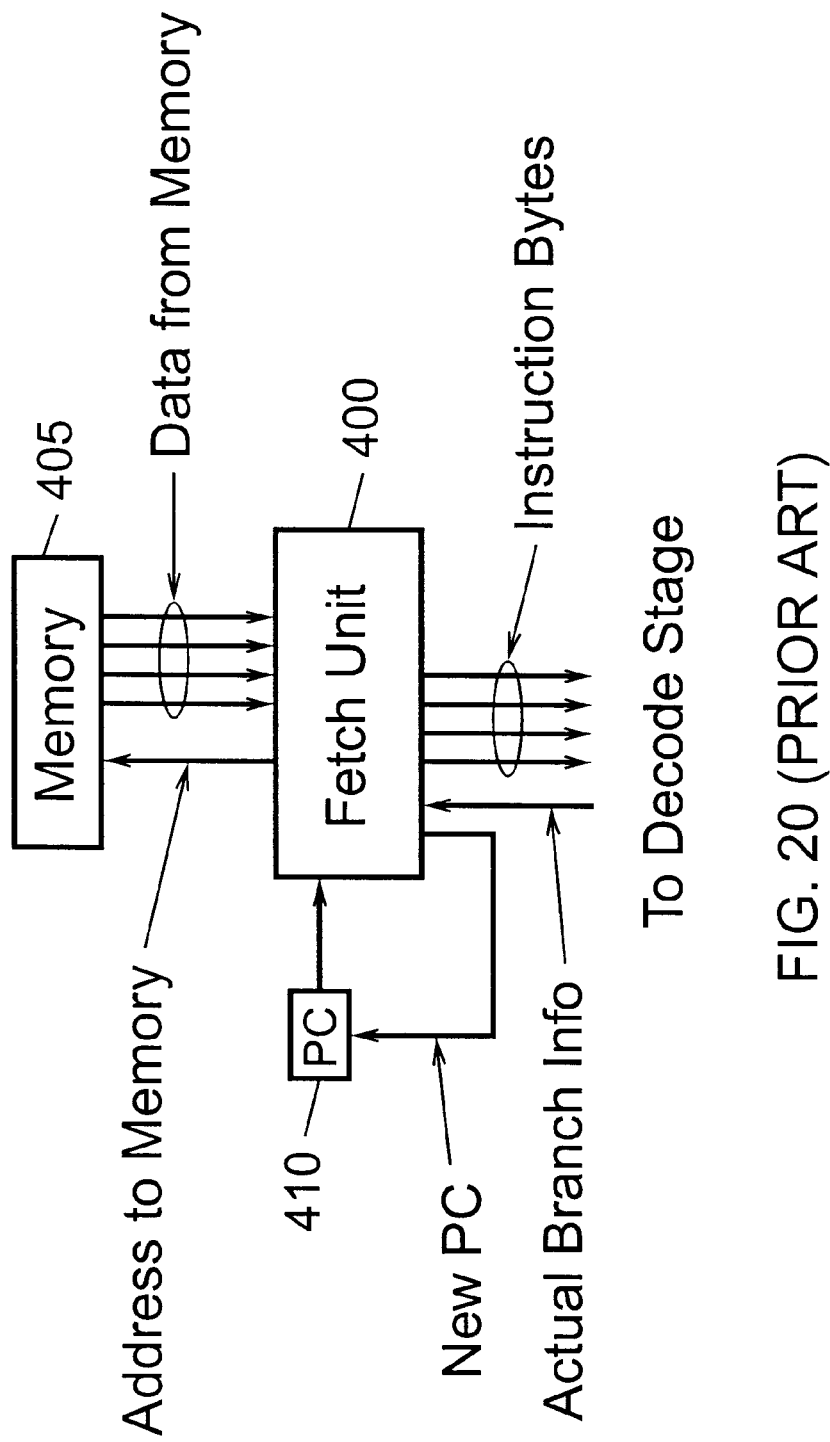
FIG. 20 is a schematic representation of an instruction fetch unit.

CSPP can be used to speed up the fetch stage of a conventional superscalar processor. FIG. 20 shows a typical simple fetch stage of the prior art. A fetch unit 400 provides an address to a memory 405. The memory (typically an instruction cache) responds with four instructions, labeled "data from memory." The fetch unit then takes those instructions and provides them to a decode stage (not shown). Meanwhile the fetch unit computes a new program count (PC) based on the branch prediction rules and stores it in a PC register 410. The fetch unit also receives information about how branches actually were taken, and uses that to adjust the program count. The contents of the PC register are then used by the fetch unit to fetch the next block from memory. The problem with this system is that only one taken branch can be handled per clock cycle. As soon as the processor takes a branch, the rest of the data from the cache line is no longer needed.

Figure 21:
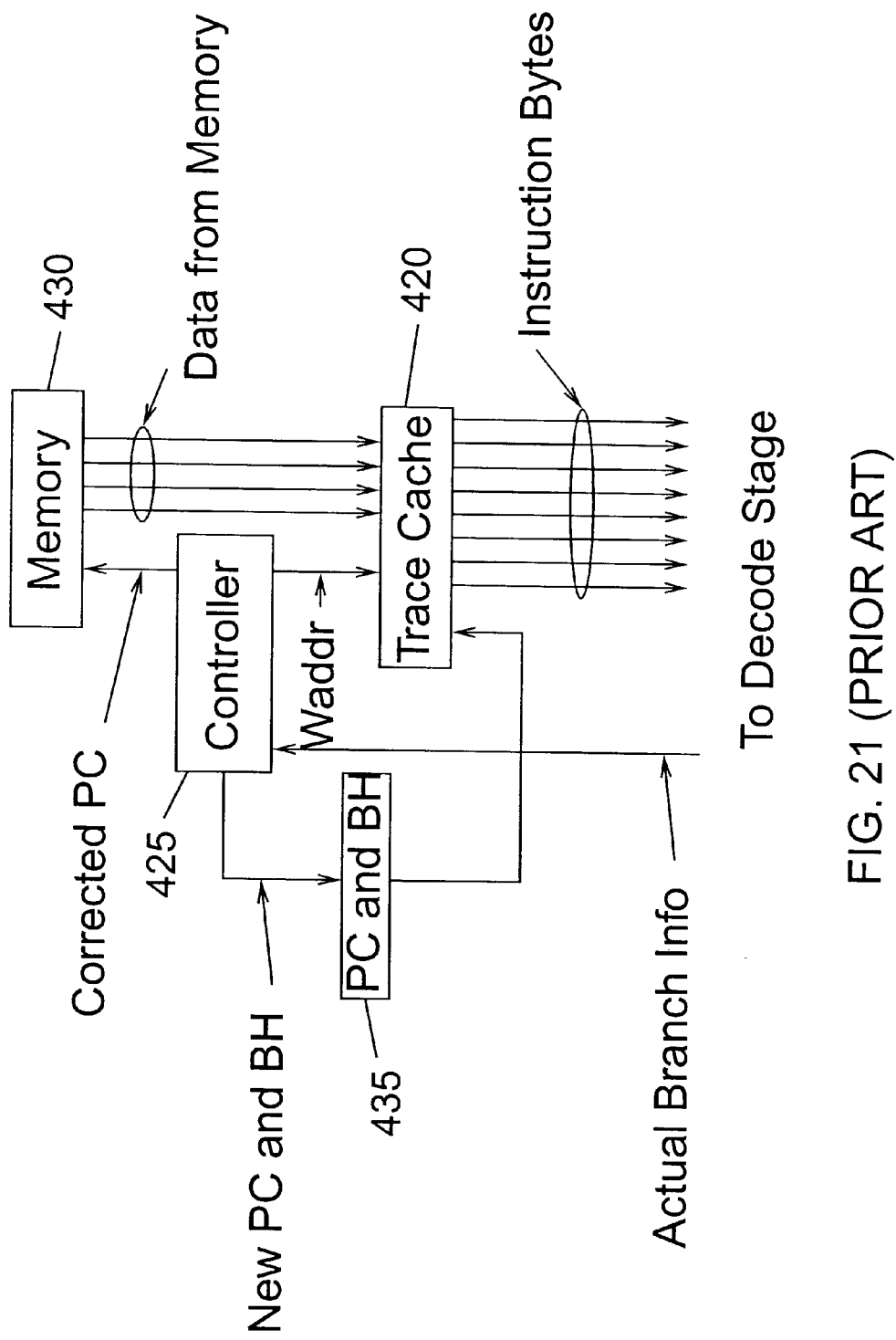
FIG. 21 is a schematic representation of an instruction fetch unit using trace cache.

FIG. 21 shows a prior art instruction fetch unit using a trace cache 420. The unit further comprises a controller 425, a memory 430 and a register 435. In this system register 435 holds the program count (PC) and the branch history (BH). The PC and BH are provided to the trace cache 420, which then fetches eight successive instructions that were executed in the past. Those eight instructions do not necessarily have to have been contiguous in memory. They are simply eight successive instructions that were once executed before when the PC and BH matched the current state. Meanwhile, controller 425 watches how the branches actually are taken, and adjusts the PC and BH. If the controller determines that the trace cache does not have the right data for a particular combination of PC and BH, then the controller fetches four instructions at a time from memory 430 to refill the trace cache. Thus, the trace cache can handle multiple taken branches per clock cycle. However, this trace cache has the problem that only one block can be fetched from memory at a time, when the trace line is being constructed.

Figure 22:
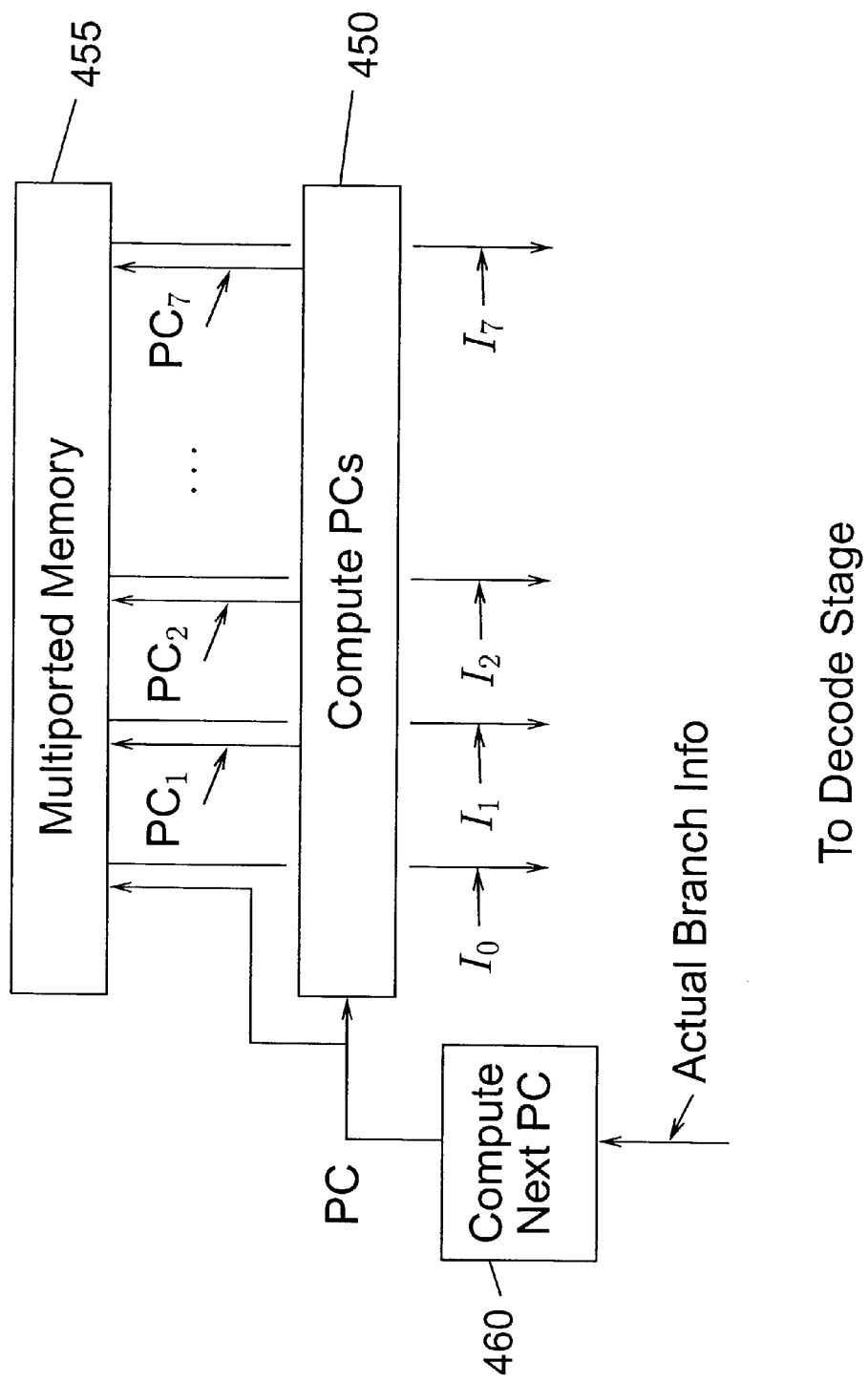
FIG. 22 is a schematic representation of an instruction fetch unit using a parallel prefix.

FIG. 22 shows an instruction fetch unit that can fetch more than one block at a time. In this model, the controller produces an initial PC. A parallel-prefix summation circuit 450 computes all the subsequent PC's, and fetches the instructions $I_0$ through $I_7$ from a multiported memory 455. A trace cache 460 keeps track of whether the instruction is a taken branch or not. If it is an untaken branch, the next instruction will be found at $PC_{i-1}=PC_i+1$. If the branch is taken, an offset $o_i$ is predicted, and the next instruction will be found at $PC_{i+1}=PC_i+o_i$. If parallel-prefix summation circuit 450 is an unsegmented acyclic circuit, it is set up with $$x_i = \begin{cases} 1 & \text{if instruction at } PC_i \text{ is predicted not taken,} \\ o_i & \text{otherwise.} \end{cases}$$

and $y_i$, is the predicted value of $PC_i$.

By adding segmentation in circuit 450, we can handle absolute unconditional branches. We use the following:

$$\langle x_i, s_i \rangle = \begin{cases} \langle 1, 0 \rangle & \text{if the instruction is not a branch,} \\ \langle N, 0 \rangle & \text{if the instruction is an unconditional branch to offset } N. \\ \langle N, 1 \rangle & \text{if the instruction is an unconditional branch to location } N. \end{cases}$$

Figure 23:
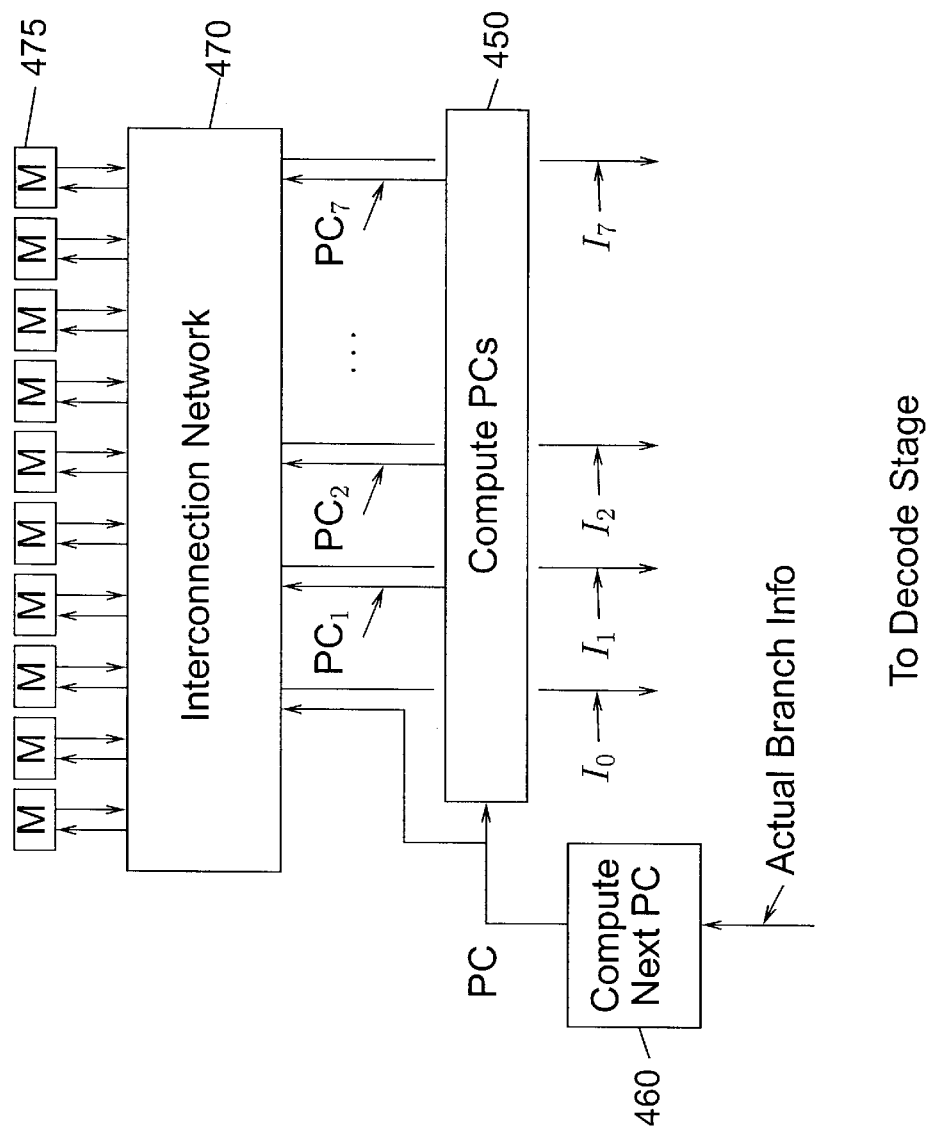
FIG. 23 is a schematic representation of an instruction fetch unit using a parallel prefix and a network.

FIG. 23 shows an instruction fetch unit similar to the one in FIG. 22 except with a scalable memory system. Summation circuit 450 and cache 460 are the same as the corresponding elements in FIG. 22. In the circuit of FIG. 23 the memory addresses are provided to an interconnection network 470 which routes the requests to various memory modules 475, and the memory modules respond with data which is routed back to the various slots of the fetch units.

There is a remaining problem with the systems of FIGS. 22 and 23. That is that for trace lines of length k, with B bits of branch-prediction history the memory requirements can grow to be $\Theta(k2^B)$ in the worst case. This is because for each instruction, and each combination of branch-prediction history there may be a unique trace cache entry of k elements. Some recent research indicates that the problem is not bad enough to make the system infeasible, however [46, 38, 34], at least for small values of k and B. For larger values of k and B the problem may become worse.

Another issue with this is that we cannot generally compute the address of later instructions until we have fetched previous instructions, since we won't know ahead of time if the instruction is a branch, and we may not know the branch address until even later when the instruction has computed. For conditional branches, we may not know whether the branch is taken until the previous instructions have finished executing. Unless this problem is handled, the processor may serialize often.

Today's processors cope with this problem by using speculation. The idea is to guess whether a particular instruction will be a branch, and if it is, where it branches to. If the guess is wrong, then the work must be undone. If the guess is right, then by the time the guess is verified, the processor needs only to commit its changes, and it needs not recompute them.

A series of not-taken branches can thus be handled in parallel. For not-taken branches, the instructions are stored in sequential memory locations. The instructions can be fetched in a single block, and we use a parallel-prefix circuit to quickly communicate branch-taken information. We would like the circuit to handle correctly predicted taken branches with short circuit delay, however. To solve this we need accurate prediction, we need to communicate the predictions to various components of the processors, and we need a way to use the prediction information to allow us to compute the addresses of the several different non-contiguous parts of the program, in parallel, so that we can fetch them all at once.

Figure 24:
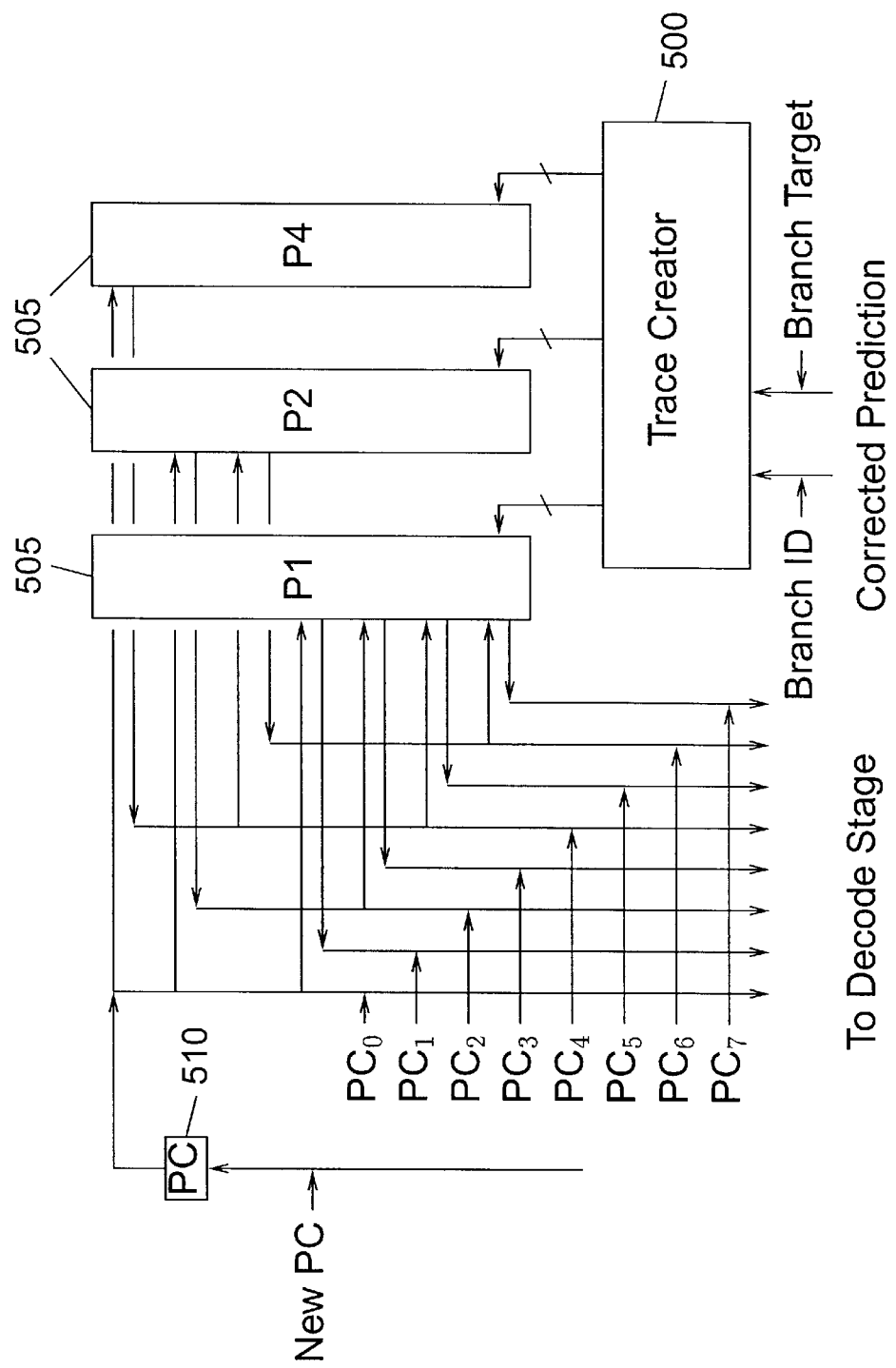
FIG. 24 is a schematic representation of a pointer jumping trace cache.

The system of FIG. 24 solves this problem. One advantage of this system is the memory requirements grow to be only $\Theta((\log k)2^B)$ a savings of (k/log k). As a matter of practice, it is likely that the savings will be even better than the k log k factor, because fewer branch-prediction bits will be needed to achieve the same success rate, reducing the $2^B$ component as well. FIG. 24 comprises a trace creator 500, lg k different stages 505 of memory, and a program count register 510. Since in our example k=8, there are three stages, labeled P1, P2, and P3. Each stage is a memory that takes a PC (and a branch-prediction history, which we don't show for simplicity.) Given an address x, we write P1[x] to indicate the value of P1 at index x. We write $PC_i$ to mean the address of the ith instruction in the predicted dynamic instruction sequence after instruction PC. Thus, $PC_0$=PC, $PC_1$ is the address of the first instruction after PC, and $PC_4$ is the address of the fourth instruction after PC. Note that if the instruction at $PC_i$ is not a branch, then $PC_{i+1}$=$PC_i$+1. If the instruction at $PC_i$ is a branch, however, then $PC_{i+1}$ may be quite different from $PC_i$. The memory is set up so that P1[x] contains the address of the instruction predicted to follow x, that is $x_1$; and P2[x] contains the predicted address of the 2nd instruction after x, that is $x_2$; and P[4] contains the address of the 4th instruction after x, that is $x_4$. Now to compute $PC_7$, we can simply read it out of the memory stages with a logarithmic number of lookups as $PC_7$=P1[P2[P4[PC]]].

Generally to compute $PC_i$, we write i down as a sum of distinct powers of two: $i=2^a+2^b+2^c$ and then read Pa[Pb[Pc[PC]]].

Note that there are many ways to achieve high bandwidth and minimize contention:

Use many banks of memory.

Use Ranade's algorithm on a butterfly switch with hashing of memory address [37].

Use the Ultracomputer fetching algorithm [11]. (There is no direct relationship between the Ultracomputer and the Ultrascalar processor.)

Build a sorting network which sorts the requests by their address. After the requests are sorted, duplicates can be identified. Only a single request to any given memory is actually sent to the memory. After the request has been filled, then use a segmented parallel prefix operation to distribute the data to the duplicate requesters (see [20,21].)

To fill in a trace cache there are many options:

Use static branch prediction (initialize the table once and then change it very seldom.)

When a trace is discovered to be wrong, repair only that trace. Other traces that are affected by the incorrectly predicted branches are not necessarily repaired. (For the system of FIG. 24, repairing one trace often causes other traces to be repaired as well, but we do not necessarily need to track down every incorrect trace entry.)

For each entry Pi[j] of the table of FIG. 24 one could maintain a list of the entries in level P(i−1) that refer to Pi[j]. When we change Pi[j] we then go and fix up the entries that refer to Pi[j] and then fix the entries that refer to those entries, and so forth. This fixing up can be done by a log-depth pointer jumping as well (see the next section on pointer jumping) with the advantage that only those entries that are changed need to be examined.

Perform the pointer-jumping algorithm described below.

Pointer Jumping for Log-Time Conditional Branches

This subsection explains how to handle correctly predicted taken and untaken branches in parallel. Here is a scheme to use pointer jumping to compute the addresses fast. We explain with an example. Suppose we have the following code 0: a=1000
1: c=d+e
2: e=a+1
3: f=a+2
4: a=a−1
5: c=c+f
6: e=e+1
7: if (a>0) goto 3;

We would like to be able to compute the branch prediction very fast for large issue width (let us use I=64 for example.) (One can make this work whether I is a power of two, or not. We chose a power of two for ease of explanation.) To do this we use a technique known as pointer jumping, which has been used in parallel computing [22]. We fill in a table, with one row for each instruction address and a number of columns equal to lg I. (Think of this table as being built into the instruction cache of the processor.) Let us refer to the jth column of the ith instruction entry as $T_{ij}$. We fill in one column at a time, from left to right. We initially fill in column 0 with the next instruction prediction using a standard branch-prediction strategy. (In our example, we will predict that every instruction i (i≠7) is followed by instruction i+1. For Instruction 7 let us assume that the branch prediction hardware predicts that the branch is taken to Instruction 3. Our assumption is reasonable since a is initially very large: Most state-of-the art compilers and profilers and branch predictors would be able to tell us that this particular branch is usually taken.) Thus on Step 0 we have $$T = \begin{pmatrix} \text{Instruction} & \text{Column 0} \\ & \text{Successor} \\ \hline 0: & 1 \\ 1: & 2 \\ 2: & 3 \\ 3: & 4 \\ 4: & 5 \\ 5: & 6 \\ 6: & 7 \\ 7: & 3 \end{pmatrix}$$

Now we iterate for lg I steps. On step k we fill in column k by letting $T_{i,k}=T_{(T_{i,k-1}),k-1}$.
Thus on Step 1 we have $$T = \begin{pmatrix} \text{Instruction} & \text{Column 0} & \text{Column 1} \\ & \text{Successor} & \text{2nd Successor} \\ \hline 0: & 1 & 2 \\ 1: & 2 & 3 \\ 2: & 3 & 4 \\ 3: & 4 & 5 \\ 4: & 5 & 6 \\ 5: & 6 & 7 \\ 6: & 7 & 3 \\ 7: & 3 & 4 \end{pmatrix}$$

and on Step 2 we have $$T = \begin{pmatrix} \text{Instruction} & \text{Col. 0} & \text{Col. 1} & \text{Col. 2} \\ & \text{Succ.} & \text{2nd Succ.} & \text{4th Succ.} \\ \hline 0: & 1 & 2 & 4 \\ 1: & 2 & 3 & 5 \\ 2: & 3 & 4 & 6 \\ 3: & 4 & 5 & 7 \\ 4: & 5 & 6 & 3 \\ 5: & 6 & 7 & 4 \\ 6: & 7 & 3 & 5 \\ 7: & 3 & 4 & 6 \end{pmatrix}$$

and on Step 3 we have $$T = \begin{pmatrix} \text{Instruction} & \text{Col. 0} & \text{Col. 1} & \text{Col. 2} & \text{Col. 3} \\ & \text{Succ.} & \text{2nd Succ.} & \text{4th Succ.} & \text{8th Succ.} \\ \hline 0: & 1 & 2 & 4 & 3 \\ 1: & 2 & 3 & 5 & 4 \\ 2: & 3 & 4 & 6 & 5 \\ 3: & 4 & 5 & 7 & 6 \\ 4: & 5 & 6 & 3 & 7 \\ 5: & 6 & 7 & 4 & 3 \\ 6: & 7 & 3 & 5 & 4 \\ 7: & 3 & 4 & 6 & 5 \end{pmatrix}$$

and on Step 4 we have $$T = \begin{pmatrix} \text{Instruction} & \text{Col. 0} & \text{Col. 1} & \text{Col. 2} & \text{Col. 3} & \text{Col. 4} \\ & \text{Succ.} & \text{2nd Succ.} & \text{4th Succ.} & \text{8th Succ.} & \text{16thSucc.} \\ \hline 0: & 1 & 2 & 4 & 3 & 6 \\ 1: & 2 & 3 & 5 & 4 & 7 \\ 2: & 3 & 4 & 6 & 5 & 3 \\ 3: & 4 & 5 & 7 & 6 & 4 \\ 4: & 5 & 6 & 3 & 7 & 5 \\ 5: & 6 & 7 & 4 & 3 & 6 \\ 6: & 7 & 3 & 5 & 4 & 7 \\ 7: & 3 & 4 & 6 & 5 & 3 \end{pmatrix}$$

and after two more steps we have $$T = \begin{pmatrix} \text{Instruction} & \text{Successor} \\ & 2^0 & 2^1 & 2^2 & 2^3 & 2^4 & 2^5 & 2^6 \\ 0: & 1 & 2 & 4 & 3 & 6 & 7 & 4 \\ 1: & 2 & 3 & 5 & 4 & 7 & 3 & 5 \\ 2: & 3 & 4 & 6 & 5 & 3 & 4 & 6 \\ 3: & 4 & 5 & 7 & 6 & 4 & 5 & 7 \\ 4: & 5 & 6 & 3 & 7 & 5 & 6 & 3 \\ 5: & 6 & 7 & 4 & 3 & 6 & 7 & 4 \\ 6: & 7 & 3 & 5 & 4 & 7 & 3 & 5 \\ 7: & 3 & 4 & 6 & 5 & 3 & 4 & 6 \end{pmatrix}.$$

It takes lg I steps to compute this table, since there are lg I columns in the table.

Given Table T, we can, in lg I steps, compute the kth successor to any instruction. Suppose we want to know the instruction that is predicted to run k=37 instructions after the first instruction. We first write k down as a sum of powers of two (i.e., write k in binary): $37=2^5+2^2+2^0$.

Now we take the exponents. 5,2,0 and use them as follows: We find $$v = T_{T_{T_{0,5},2},0}.$$

That is we first look up Instruction 0's column 5. We find $T_{0,5}=7$. Then we look up Instruction 7's column 2. (7 comes from $T_{0,5}$ and 2 is one of the exponents.) We find $T_{7,2}=6$. Next we look up Instructions 6's column 0. We find $T_{6,0}=7$. Now we know that the 37th instruction after Instruction 0 will be Instruction 7 (if the branch prediction is correct.) We could have looked up the exponents in any order. For example, $T_{0,2}=4$, $T_{4,0}=5$, $T_{5,5}=7$, which gives us 7 again.

Computing the Branch Prediction

The above assumes that the processor has a branch prediction for each relevant situation. A typical branch predictor keeps some state bits, and appends them to the current program counter to look up, in a table, whether the instruction is a taken branch. (That is, for each instruction and for each combination of some state bits, there is a prediction for the next instruction.) Most of today's branch-prediction mechanisms run in time linear in the number of branches. This subsection shows how to compute the branch prediction values faster.

Another strategy is to propagate the table from one fetch destination to another through a parallel prefix tree. In the next section, we will show how to propagate such a table when used for memory renaming.

Another way to do this is shown by this example: In one branch predictor used in current processors, there are four bits, which indicate how each of the most recent four branches were resolved in the dynamic instruction sequence. Those four bits are used to index into a table to get the prediction for the next branch. The leftmost bit is shifted out, and the new branch result is shifted in on the right. A pointer-jumping calculation can be used in this case to compute what the branch prediction bits should look like after four branches are correctly predicted. Suppose we have the following 3-bit branch prediction table

| index      | 0 | 1 | 2 | 3 | 4 | 5 | 6 | 7 |
|------------|---|---|---|---|---|---|---|---|
| prediction | 0 | 0 | 1 | 1 | 1 | 1 | 0 | 0 |

If we started with branch history $1=001_2$, then we predict that the next branch is not taken, so we then get that the next branch history will be $2=010_2$ (shifting the zero to the right and throwing away the leftmost bit.) The next prediction is taken, so we get $5=101_2$. The next one is taken, so we get $3=011_2$. Thus after four instructions a branch history of $001_2$ becomes $011_2$. To compute this in log-time we first transform the table to a table with a row indicating the next state.

| index | $0=000_2$ | $1=001_2$ | $2=010_2$ | $3=011_2$ | $4=100_2$ | $5=101_2$ | $6=110_2$ | $6=110_2$ |
|---|---|---|---|---|---|---|---|---|
| prediction | 0 | 0 | 1 | 1 | 1 | 1 | 0 | 0 |
| next state | $0=000_2$ | $2=010_2$ | $5=101_2$ | $7=111_2$ | $1=001_2$ | $3=011_2$ | $4=100_2$ | $6=110_2$ |

Now we apply the pointer jumping algorithm to compute what will be the 2nd state after each initial state, and then the 4th state after each initial state.

| Index | $0=000_2$ | $1=001_2$ | $2=010_2$ | $3=011_2$ | $4=100_2$ | $5=101_2$ | $6=110_2$ | $6=110_2$ |
|---|---|---|---|---|---|---|---|---|
| prediction | 0 | 0 | 1 | 1 | 1 | 1 | 0 | 0 |
| next state | $0=000_2$ | $2=010_2$ | $5=101_2$ | $7=111_2$ | $1=001_2$ | $3=011_2$ | $4=100_2$ | $6=110_2$ |
| $2^{nd}$ next | $0=000_2$ | $5=101_2$ | $3=011_2$ | $6=110_2$ | $2=010_2$ | $7=111_2$ | $1=001_2$ | $4=100_2$ |
| $4^{th}$ next | $0=000_2$ | $7=111_2$ | $6=110_2$ | $1=001_2$ | $3=011_2$ | $4=100_2$ | $5=101_2$ | $2=010_2$ |

And we can read the state off in logarithmic time.

One of the issues for implementing this pointer-jumping algorithm is that sometimes several fetches are made from the same memory location. There are several approaches to implement those fetches efficiently.

- Build a multiported memory system. This has the disadvantage of not being scalable, but it can work well for small numbers of concurrent reads.
- Serialize the fetches, effectively ignoring the problem. It may be the case that the congestion happens infrequently enough that it is not a serious performance problem.
- Use a combining network, such as the one described for the Ultracomputer [11] or Ranade's algorithm [37].

Use a sorting network, followed by a prefix network, followed by a conflict-free routing network as described above.

4.2.2 Decode Logic

This section describes a novel circuit that can compute the next n states of a finite state machine with log n gate delay. The circuit is a prefix circuit and can be used, among other things, to decode instructions. This is useful for architectures where the instruction length is not known in advance. If you have an array of bytes that encodes a variable-length instruction stream, the problem is to identify those bytes that are the first byte of an instruction. (An example of such an instruction-set would be the Intel IA-32"x86" instruction set.)

If we want to decode in linear time, we can build a finite-state machine (FSM) that can determine the first byte of each instruction by considering the bytes one at a time. Microprocessors today use such a finite state machine. The finite state machine can find the beginnings of the instructions in time that is linear in the number of bytes being analyzed.

For example, suppose that the machine language for the processor looks like this: An instruction can be a basic instruction, which is two bytes long: The first byte of a basic instruction can be any number from 2 to 255. The second byte of a basic instruction can be any number. Or an instruction can have a prefix which is the number 1 followed by a basic instruction. Or an instruction can have a prefix which is the number 0 followed by an optional 1, followed by a basic instruction.

Figure 25:
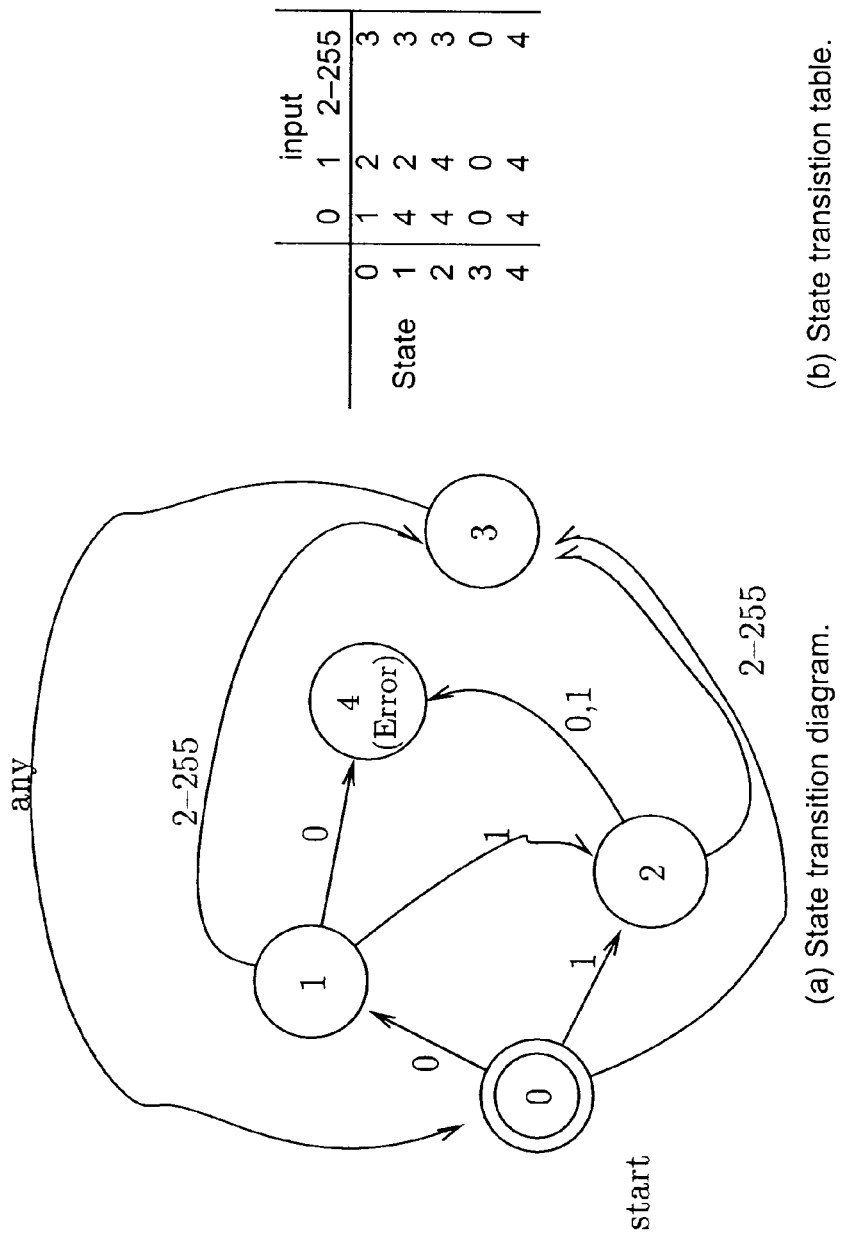
FIG. 25 is a schematic representation of a finite state machine.

FIG. 25 shows a finite state machine for recognizing the beginnings of these instructions. Part (a) shows the state transition diagram, and Part (b) represents the same information as a state transition table. State zero (notated with a double circle) is the inital state, and indicates the beginning of an instruction.

Suppose we are given the following byte sequence to be interpreted as instructions: 0 1 3 0 1 3 0 1.

The beginnings of the instructions will turn out to be Byte numbers 0 (the first byte), 4, and 7.

The finite state machine would determine this in linear time by stepping through the bytes one at a time:

| State before seeing byte | Input Byte | State after seeing byte |
|---|---|---|
| 0 | 0 | 1 |
| 1 | 1 | 2 |
| 2 | 3 | 3 |
| 3 | 0 | 0 |
| 0 | 1 | 2 |
| 2 | 3 | 3 |
| 3 | 0 | 0 |
| 0 | 1 | 2 |

All the lines with 0 in the leftmost column are the beginnings of instructions. We can read, for example, that the next byte will not be the first byte of an instruction, because we will be in State 2.

The rest of this section describes how we can compute the leftmost column, and so determine the beginnings of all instructions, in logarithmic time using a parallel prefix circuit. We start by outlining how to compute the nth entry in the leftmost column. FIG. 26 illustrates. It shows how to compute the 9th entry and so determine whether the 9th byte will be a start byte. The top line of the figure is the input stream. Below each input byte is a Level 0 state vector. Below each pair of Level 0 state vectors is a Level 1 state vector. Below each pair of Level 1 state vectors is a Level 2 state vector. Below each pair of Level 2 state vectors is a Level 3 state vector. The Level 0 state vectors show the final state of the finite state-machine (FSM) for each possible initial state, given the particular input. The Level 1 state vectors show the final state of the FSM for each possible initial state given the pair of input bytes above it. (For example, the entry with a $$\boxed{\text{box}}$$

around it shows the final state of the FSM if it started in State 3, and saw the bytes 0 and then 1. It would end up in State 2.) The Level 2 state vectors show the final state for each initial state, given the four bytes above. The Level 3 vector shows the final state of the machine, given any initial state, and the 8 bytes of input. We can read that if the machine started in State 0, it ends in State 2 (since 2 is the value of the first line in the Level 3 vector (which corresponds to an initial state of 0).) Thus, the next byte, the 9th byte, will not be a starting byte.

Figure 27:
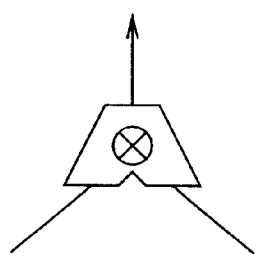
FIG. 27 is a schematic representation of the composition operator.
Figure 28:
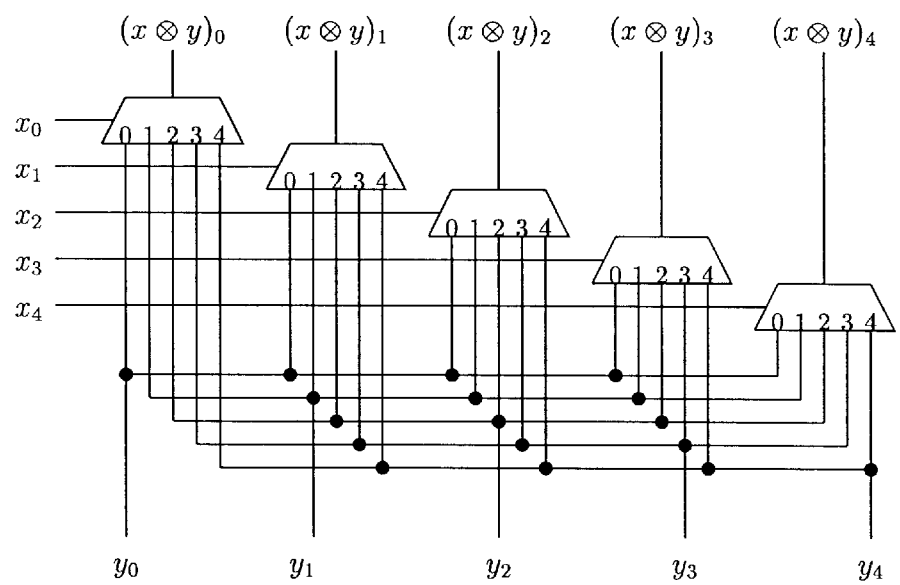
FIG. 28 is a schematic representation of an implementation of the composition operator.

We can implement the algorithm of FIG. 26 using a simple (one-directional) parallel-prefix circuit. We number the states in the finite-state machine. The data being passed up the tree is a vector of state numbers. If there are n states in the finite-state machine, we use a vector of n integers (each integer is [lg n ] bits.) Given such a vector x, the ith element is written $x_i$. The idea is that vector x will tell us for each state where we will end up after parsing a particular sequence of bytes. A machine starting in State i will end up in State $x_i$. The identity vector is $I_i$=i. The identity vector is the vector for parsing no bytes. At the i-th leaf of the tree, we input the vector that tells us for each state where we will end up after parsing the i-th input. At each node of the tree, we compose the two incoming state vectors with this associative composition operator: $(x\hat{y})_i = Y_{x_i}$. That is, the ith entry in the composition is found by taking the ith entry of x and using that as an index into y. FIG. 27 gives an example of the inputs and the output to a node. FIG. 28 shows one possible implementation of the composition operator. At the root of the tree, an additional multiplexer computes $z_s$, where z is the output vector of the root node and s is the initial state of the FSM before the current sequence of instruction bytes. The resulting output, $z_s$, indicates whether the 9th byte is not or is a starting byte.

To design a circuit that computes the next k states of a finite state machine, given the next k instruction bytes, we simply turn the above one-directional tree into a two-directional parrallel-prefix tree. The inputs to the tree and the associative operator are the same as above. The prefix tree's i-th output vector, at the i-th leaf node, specifies for each initial state where we will end up after parsing the preceding (i−1) bytes.

For the problem of instruction decoding, we can design our decoder so that the initial state at the oldest byte is always the start state. So to determine whether the i-th byte is a start byte, one simply looks at the 0-th element of the prefix tree's i-th output vector.

In the more general case, we may wish to run a finite-state machine continuously, without resetting it to its starting state at the oldest unparsed byte. This can be useful for the general problem of finite-state interpretation at high-speed, and has many applications, including network protocols, parsing regular expressions, and program compilation. For this general problem, we want to compute for each byte what state the machine is in. To do this, we build a parallel prefix circuit. The operator is the composition operator shown in FIGS. 27 and 28. At each leaf of the parallel prefix tree, an additional multiplexer computes $z_s$, where z is the output vector of the parallel prefix circuit at that node and s is the initial state of the FSM at the oldest byte (i.e., before the current sequence of instruction bytes). The resulting output, $z_s$, at each leaf indicates the byte's state. Thus, we can keep on continually decoding a stream of instruction bytes (or any other FSM input) written into a wrap-around queue by using a cyclic, segmented parallel prefix circuit. The segment bit identifies the oldest byte in the sequence. The initial state of the oldest byte in the sequence, s, x$\hat{y}$=x can be broadcast to all the leaves using an additional CSPP circuit with the operator. The oldest instruction supplies its initial state as data and sets its segment bit high.

4.2.3 Rename Logic

This section describes a novel circuit that merges a wrap-around sequence of partial tables, tables that contain updates to a subset of the table's entries. The circuit can produce all intermediate tables that reflect earlier updates applied in serial order with gate delay logarithmic in the length of the sequence. The circuit can be used as a replacement for the renaming hardware in today's logic. The renaming hardware's job is take logical register names and change them to physical register names, or tags. The renaming hardware must support the following operations: (1) Find the current tag for a logical register, (2) change the current tag for a logical register, (3) checkpoint the current mapping from logical registers to tags, and (4) restore a mapping from a checkpoint. (The checkpoint and restore are only required for speculative execution, but speculative execution is generally viewed as being indispensable in a modern processor.) Furthermore, it must be possible to perform several of these operations in parallel. The results should be the same as if the operations were performed one after another, serially. In the prior art there are two ways to implement the renaming hardware: direct-addressing, and content-addressing.

Direct Addressing Approach

In direct addressing, there is a RAM table, called T, indexed by logical register number. For a typical RISC processor, the table has 32 entries, one for each register in the instruction-set architecture. Each entry contains a tag.

To find the tag currently associated with logical register $R_i$, one does a fetch from the RAM table, looking up j:=T [i] to get the tag.

To change the tag for a logical register, one writes the tag to T[i]:=j.

To checkpoint, one copies the entire table T to a "shadow table".

To restore, one copies the shadow table back to T.

Note that the number of shadow tables, if small, may limit the amount of speculative execution that can be performed. If the number of shadow tables is large, on the other hand, then it will require much VLSI area to implement. In the prior art, to handle multiple find and change operations at the same time requires a memory with multiple ports. The memory of the prior art is slow if it has too many ports [32].

Content Addressing Approach

In content addressing, there is a table U with one entry for each tag. The jth entry contains the name of the logical register that uses that tag.

The find problem for logical register i is to find the youngest entry that names i. The entries may be sorted so that the oldest entries are first (e.g., [36]), in which case the last row that names i is the correct row. Or the entries may be kept unsorted, with an additional "age" associated with each row (e.g., [27].) To find the youngest entry that names the logical register i, the logical register number, i, is broadcast to all the table entries. Each table entry has an associated comparator that compares its entry to i. For the entries that match i, then a reduction operation is performed to determine which is the oldest entry. For either approach [36, 27], no circuit is shown for actually performing the reduction, and no suggestion is made that it could be done in faster than linear time. One reference [27] does show a circuit for finding the oldest row that satisfies a certain condition.

To change the tag for a logical register, one writes a new entry into the table.

To checkpoint a tag requires noting which entries are currently valid, and which are not. For the sorted system, one just remembers where the boundary is between the unwritten entries and the written entries. For the ageing system, one just remembers the current time.

To restore, one deletes the entries that were invalid at the time of the checkpoint. For the sorted system, one simply moves the boundary. For the ageing system, one marks as deleted any entry which has an age indicating that it was created after the time of the checkpoint.

The reuse of entries within the U table introduces additional complexity. For the sorted-by-age systems in the prior art, the system must eventually "retire" renaming entries, writing their register values to a canonical register file. Also, the system must stop processing instructions when it reaches the bottom of the renaming table, and then after retiring all instructions, it can start reusing the top again. Another approach is followed by [8], which keeps the table rows sorted (oldest at the top), but compacts the table entries upward when old entries are no longer needed. Many of the circuits described in [8] are slow as the issue width increases. For example, the compacting circuit must be capable of compacting up to n holes per clock cycle. The compacting circuit's delay is at least O(n).

In addition to those problems, the prior art also has the problem that a special circuit is required to perform dependency checks and renaming between the instructions that are being renamed in the same clock cycle. If two instructions are being renamed in the same clock cycle, then the second one will not see the the first one's entry in the renaming table. Special dependency checking hardware is used to resolve this situation. Such dependency checking hardware is quadratic-time in the prior art [32].

Our Approach

We show a different implementation of renaming logic. Our implementation uses "partial renaming maps". A partial renaming map renames only some registers, not all of them. First we explain the concept using a mathematical notation, then we show circuitry to implement partial renaming maps. Here is the notation: Suppose that we have a sequence of instructions as follows:

| Instruction | Renaming |
|---|---|
| $R_1 = R_2/R_3$ | {1→42} |
| $R_3 = R_4 + R_1$ | {3→43} |
| $R_1 = R_0 + R_2$ | {1→44} |
| $R_4 = R_1 + R_2$ | {4→45} |

Here we have shown the tag that each instruction's destination register is renamed to. (For example, Register 1 is renamed to Tag 42.) The effect of the entire sequence can be written as $\{1\rightarrow44, 3\rightarrow43, 4\rightarrow45\}$.

Note that we did not include the effect of the first renaming because after renaming the sequence it is no longer important. We can compose two renamings as follows: Suppose we have the renaming from the first pair as $\{1\rightarrow42, 3\rightarrow43\}$, and the renaming of the second pair as $\{1\rightarrow44, 4\rightarrow45\}$.

The composed renaming is $\{1\rightarrow42, 3\rightarrow43\} \odot \{1\rightarrow44, 4\rightarrow45\} = \{1\rightarrow44, 3\rightarrow43, 4\rightarrow45\}$.

The rule for composing two renamings $A \odot B = C$ is that renaming $x \rightarrow y$ is in C if $x \rightarrow y$ is in B or ($x \rightarrow y$ is in A and there is no renaming of x in B.)

Figure 29:
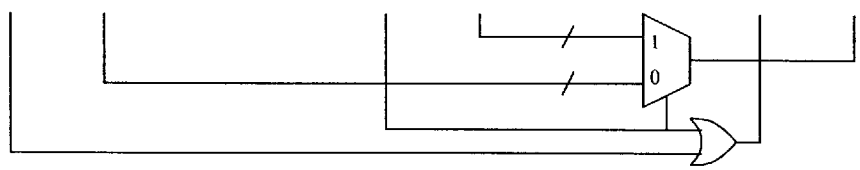
FIG. 29 is a schematic representation of partial renaming in hardware.

FIG. 29 shows how to implement a partial renaming in hardware. For each partial renaming, one keeps a table T of renamings, with an additional bit vector V indicating which of the table entries are valid. The top of the figure shows the hardware representation of three renamings. Renaming A (left) is combined with Renaming B (center) to get Renaming C (right). Each renaming consists of a bit vector V indicating which entries are valid, and a table T of entries. We show only the valid entries in this example. At the bottom is shown the circuit which computes a row of C given a corresponding row of A and B. Note that the rows are independent. The circuit comprises on OR gate 550 and a multiplexer 555. The inputs to the OR gate are the values of V in a given row in A and B. The inputs to the multiplexer are the values of T in the same row in A and B. The value of V from Renaming B is used to select the output of the multiplexer.

Suppose we wish to rename a large number of instructions. We start with a complete renaming, A, that corresponds to the renaming state before renaming any instruction. (A complete renaming is a partial renaming in which all the V bits are 1.) We then create a partial renaming for each of the instructions (note that each instruction typically renames only one register.) Call those partial renamings $B_0, \ldots B_{n-1}$. We then would like to compute the effect, for each instruction, of all previous renamings. That is, for instruction i we would like to compute $C_i = A \odot B_0 \odot B_1 \odot \ldots \odot B_{i-1}$.

We can do this in linear time simply by attaching N of the partial renaming circuits of FIG. 29.

Figure 30:
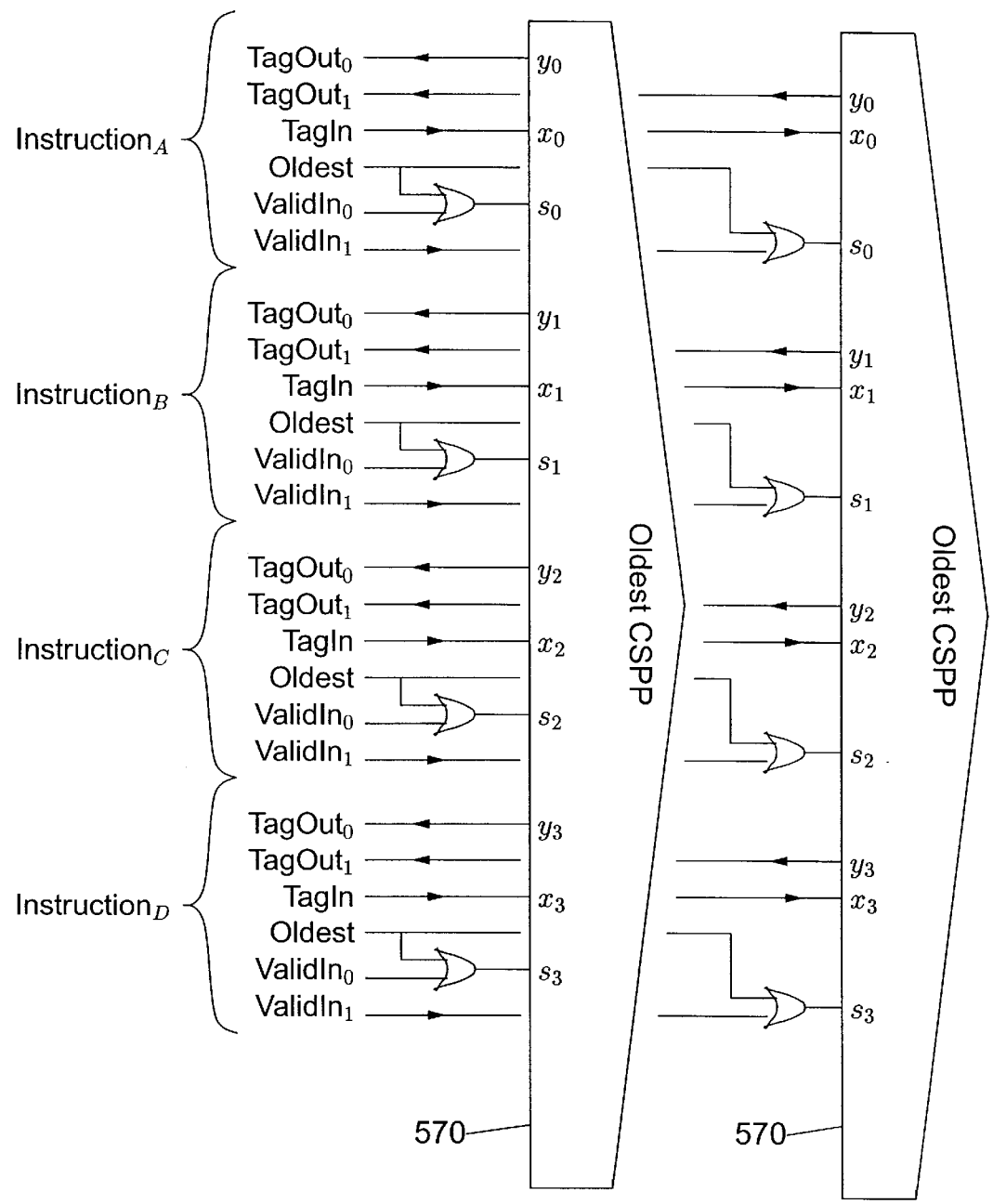
FIG. 30 is a schematic representation of rename logic (part 1).
Figure 31:
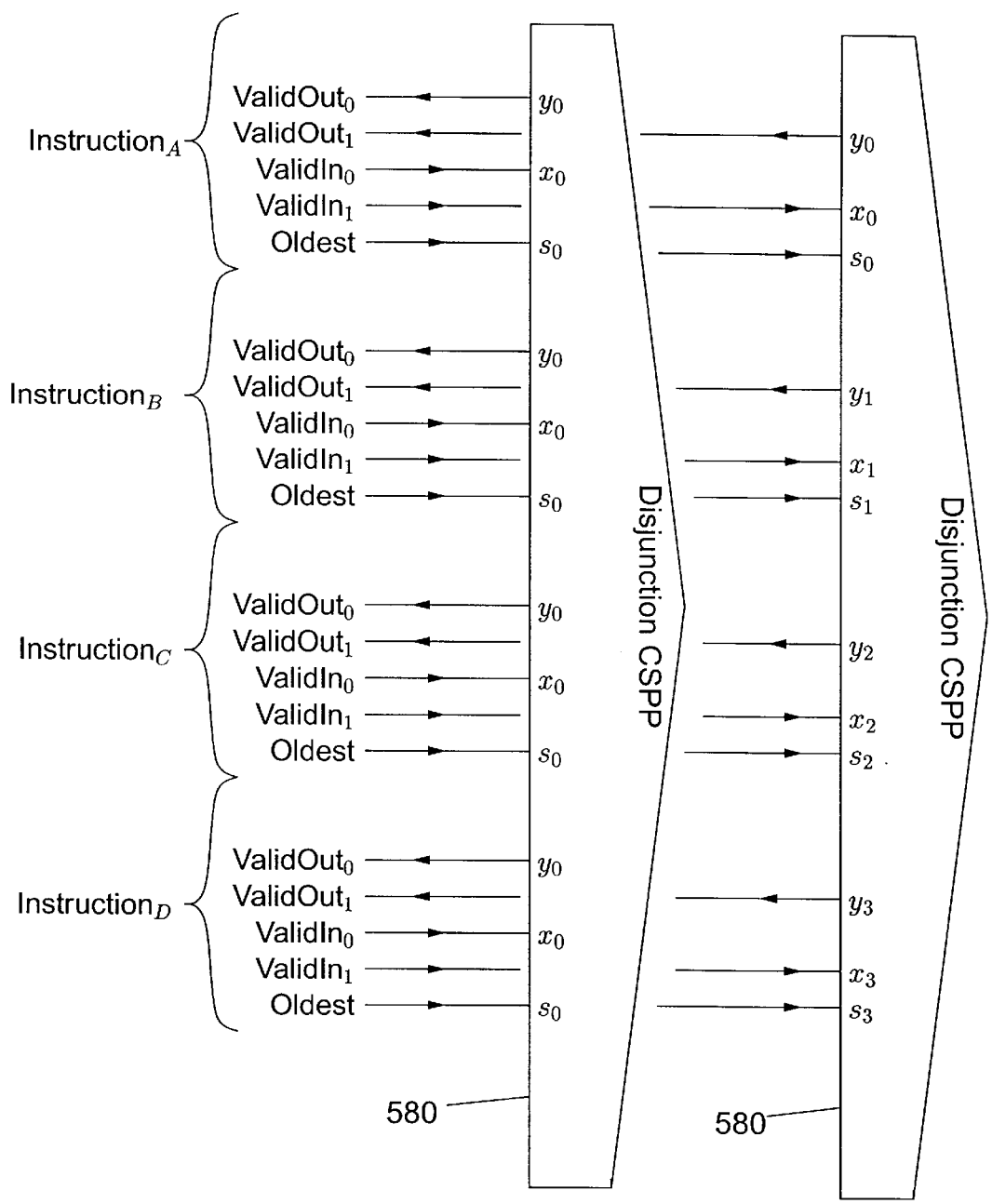
FIG. 31 is a schematic representation of rename logic (part 2).

FIG. 30 and FIG. 31 describe circuitry that implements our renaming approach in logarithmic gate delay as opposed to linear gate delay. Specifically, the figures show renaming logic that renames a sequence of four instructions and uses two logical registers. The sequence of instructions wraps around, with the oldest instruction identified by its signal Oldest being high. The circuitry comprises two components. FIG. 30 shows the circuitry that computes the tags for all four instructions' partial renaming tables. FIG. 31 shows the circuitry that computes the valid bits for all four instructions' partial renaming tables. Each figure shows two CSPP circuits 570 and 580, one for each of the two logical registers. For a machine with 32 registers, 32 CSPP circuits would be needed.

In addition to its Oldest bit, each instruction sends into the circuitry a tag, TagIn, and an array of valid bits, $ValidIn_i$, one for each logical register. If $ValidIn_j$ is high, then the instruction has renamed register $R_j$ to TagIn. The circuitry returns to each instruction an array of tags, $TagOut_i$, and an array of valid bits, $ValidOut_i$, one for each logical register. If $ValidOut_j$ is high, then $TagOut_j$ contains the tag to which logical register $R_j$ is currently renamed. If $ValidOut_j$ is low, then the preceding instructions in the sequence have not renamed register $R_j$.

The circuitry in both FIG. 30 and FIG. 31 include CSPP circuits. FIG. 30 uses one "oldest" CSPP circuit 570 for each logical register. The "oldest" CSPP circuit is described in FIG. 15 and FIG. 13. FIG. 31 uses one disjunction CSPP circuit 580 for each logical register. The disjunction CSPP circuit is described in FIG. 18 and FIG. 13. The circuitry in FIG. 30 and FIG. 31 can be easily extended to rename more instructions or to use more logical registers. For each new logical register, we add one more CSPP circuit to each figure. For each additional instruction, we add one more leaf node to every CSPP circuit in the two figures. The oldest instruction provides a complete renaming table, providing all ValidIns to be true and all TagIns to be the respective tags from the previous instruction execution.

The advantages of this circuitry are that it runs in logarithmic time, it requires no compacting, and it keeps instructions sorted in chronological order (which can help with certain other aspects of the circuit design.) Checkpointing and restoring are straightforward, and require no additional shadow storage. To restore renamings on a misprediction, we simply label the mispredicted branch instruction to be the newest, effectively moving the pointer to the newest instruction. Furthermore, because we designed this circuit as a cyclic circuit, when we get to the bottom of the renaming table, we can simply start using entries from the top of the table without interruption. Also no special additional dependency check needs to be done, since the correct renaming happens in a single clock cycle. Also, when an instruction commits, its result tag does not need to be written to a canonical renaming table, which saves additional complexity.

Reusing Tags

Here we describe several novel circuits that, given an array of bits, compute the binary (or unary) indexes of the first N entries in the array that are high. One of the applications of these circuits can be the reuse of tags in a superscalar processor.

On every clock cycle, a superscalar processor allocates a tag to the result register of every instruction entering the rename stage. Different superscalar implementations allocate tags differently. For example, some processors assign tags in a forward or wrap-around sequence. That is, the first instruction uses Tag 0, the next uses Tag 1, until all the tags are used up, by which time some of the early tags have retired, and we go back and start using Tags 0 and 1 again. Often, the tag number is the same as the number of the reservation station. The allocation of tags in such a system is the same as the allocation of reservation stations in the reordering buffer. The disadvantage of such a scheme is that the tags and the buffer entries are allocated together, and the tags cannot be reused without clearing out the buffer entries (e.g., by writing them to a canonical register file.) Such a write has typically been performed by a multiported register file which has poor scaling properties.

In other processors, tags are allocated out of a pool of tags. One advantage of this approach is that a separate logical register file may not be necessary. The problem for this system is to allocate tags quickly. On every clock cycle, the processor must identify I tags to reuse, where I is the number of instructions to be renamed per clock cycle. In this problem, there is a collection of tags that are free, and we need to find the names of several of those. Our input is a bit vector x indicating which tags are free. $x_i$ is one if tag i is free, and zero if tag i is not free. The problem then is to determine the indexes of the first N bits that are one in a vector of bits. Finding the indices of the first N true bits has other applications, such as ALU scheduling, as we shall see below.

Figure 32:
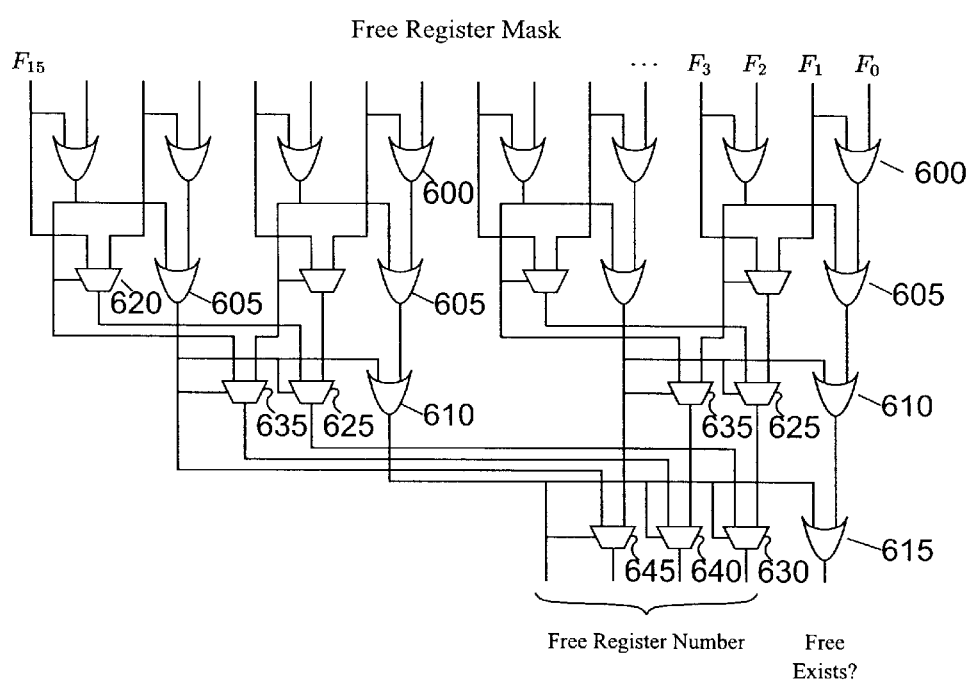
FIG. 32 is a schematic representation of quickly find the index of the first "1" bit.
Figure 37:
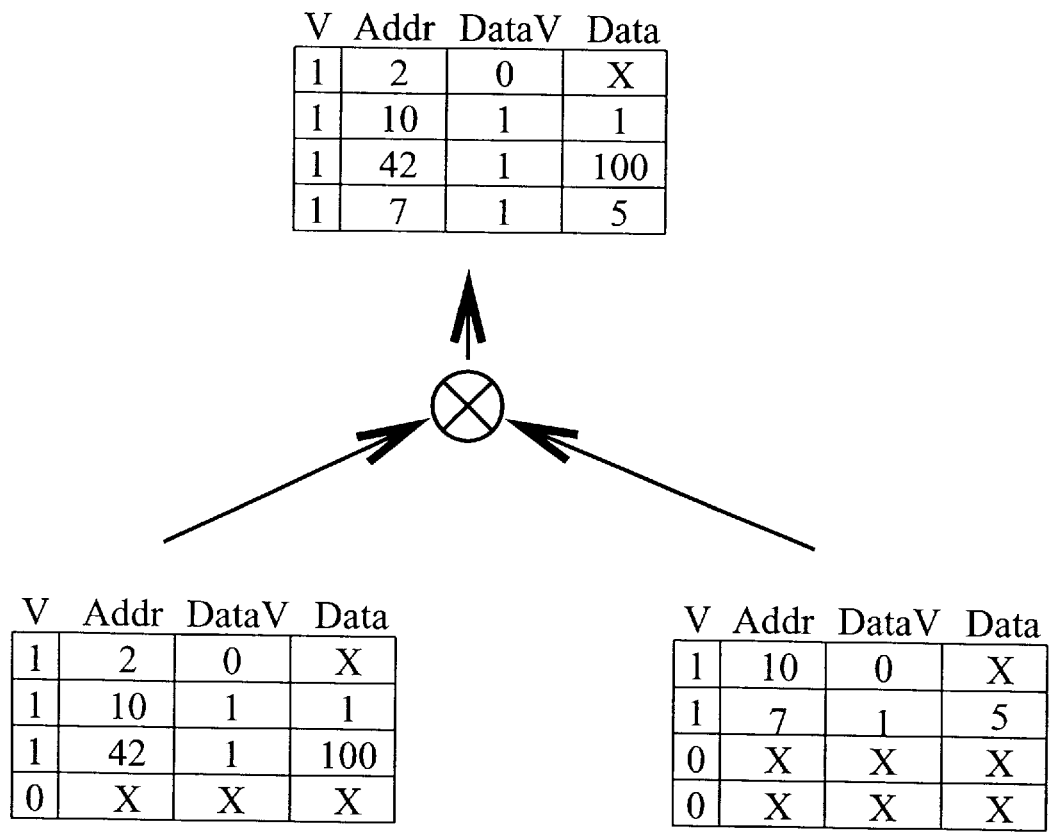
FIG. 37 is a schematic representation of an example of invalidating redundant entries.

To find the first bit that is one, we ask "what is the maximum i such that $x_i=1$?" FIG. 32 shows how to compute that maximum i. The circuit is shown for a bit vector of length 16. The bit vector comes from the top, and out of the bottom comes a signal indicating that some bit is 1 (the "free exists?" signal) along with 4 bits indicating the number of the highest-numbered one. The 16 bits of the input bit vector are applied in pairs to eight two-input OR gates 600. The outputs of the eight OR gates 600 are applied in pairs to four two-input OR gates 605. In turn, the outputs of the OR gates 605 are applied in pairs to two two-input OR gates 610 and the outputs of OR gates 610 are applied to two-input OR gate 615. Every other bit of the input bit vector is also applied to a two-input multiplexer (MUX) 620. The outputs of MUXes 620 are applied in pairs to two input MUXes 625 and the output of MUXes 625 are applied to MUX 630. The output of every other OR gate 600 is also applied in pairs to two-input MUXes 635 and the output of MUXes 635 is applied to MUX 640. The outputs of every other OR gate 605 are also applied to two-input MUX 645. The MUXes are controlled by the output of various OR gates as shown in FIG. 37. In particular, the four MUXes 620 are controlled by the output of every other one of the eight OR gates 600. MUXes 625 and 635 are controlled by the output of every other one of the four OR gates 605. And MUXes 630, 640 and 645 are controlled by one of the two OR gates 610.

The underlying structure of this circuit will be apparent. At a first stage, each four bits of the input bit vector are processed by two OR gates 600, one OR gate 605 and a MUX 620 to produce a set of three outputs. In the next stage, each set of three outputs is processed by OR gate 610 and MUXes 625 and 635 with another set of three outputs to produce a set of four outputs. And in the final state, the two sets of four outputs are processed by OR gate 615 and MUXes 630, 640, 645 to produce the five outputs of the circuit.

To find the one bit of the 8-bit system requires building two circuits to find the bitnum of 4 bits. The two subcircuits are combined with some MUXes and an OR gate. If there is a bit in the left batch of 4, the MUXes select the low order bits of the bit number from the left side, otherwise the low order bits come from the right side. It will be clear to the reader how to extend this system to handle any number N of tags with gate-delays that are only O(log N).

Prior art for this problem includes [9] and [12]. Both perform an operation similar to the circuit of FIG. 32. In both of those circuits the output is encoded in unary, where in our circuit the result is output in binary. The circuits shown here are also faster and smaller.

Figure 2:
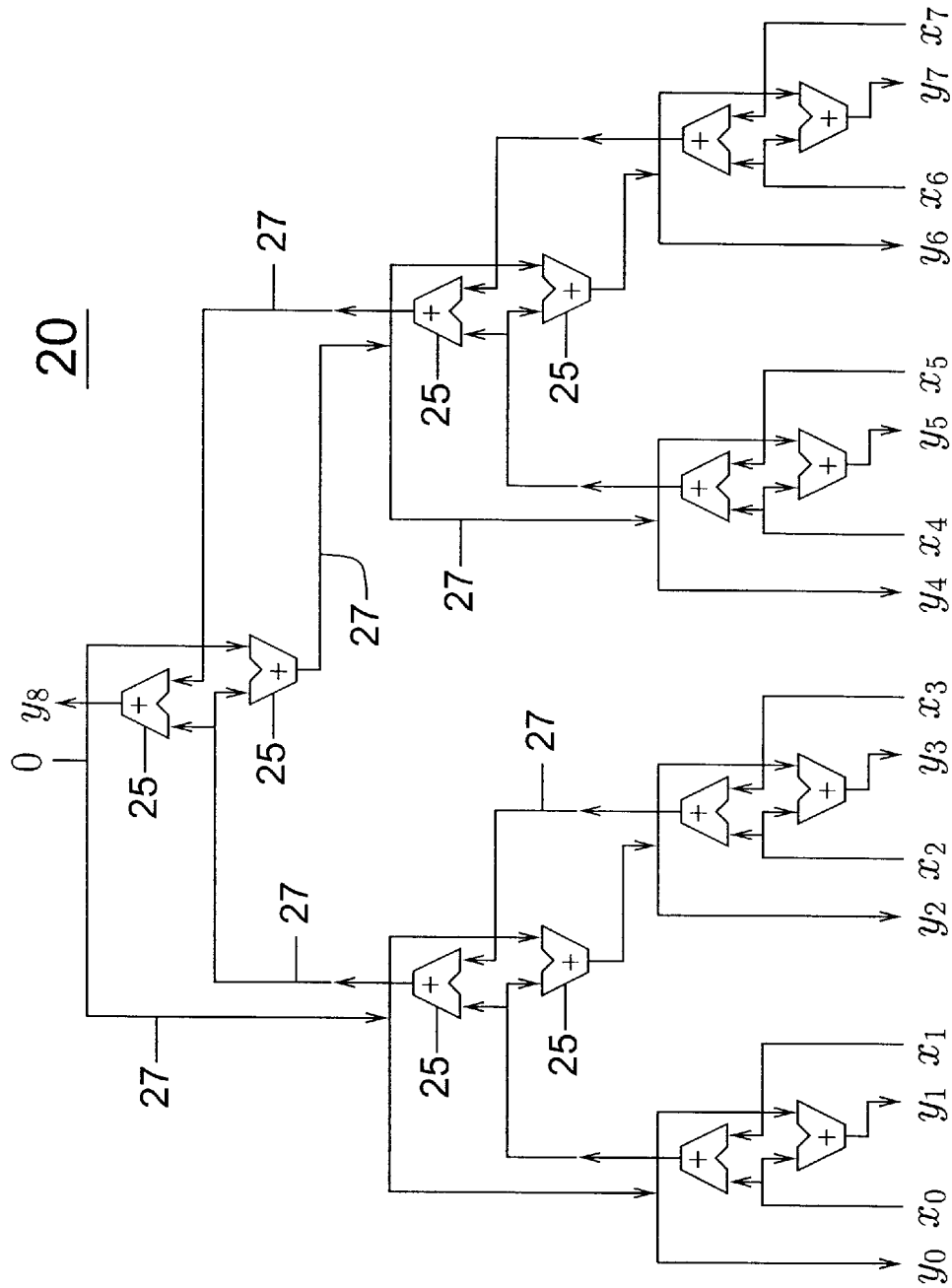
FIG. 2 is a schematic representation of a parallel-prefix summation circuit of the prior art.
Figure 3:
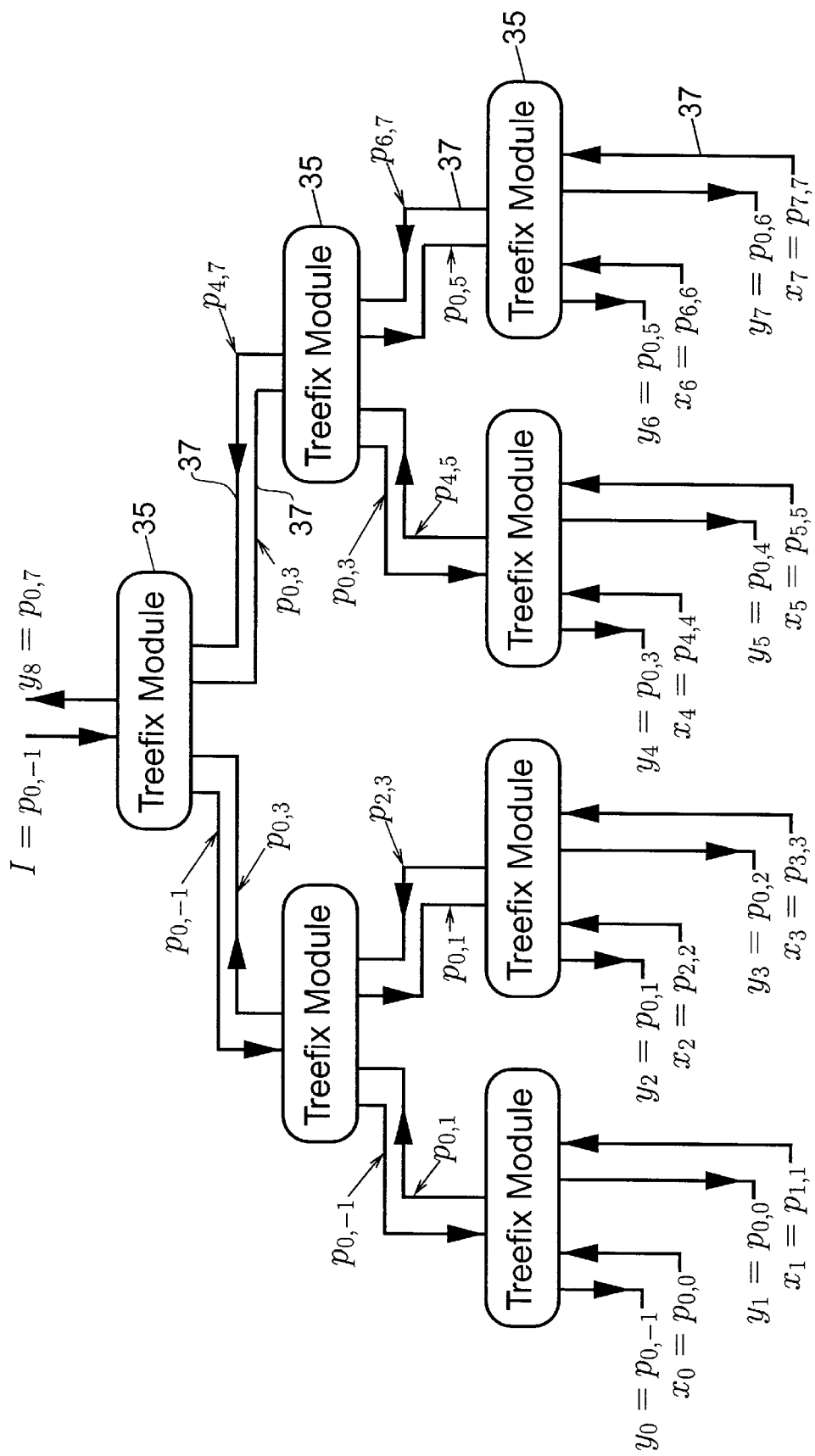
FIG. 3 is a schematic representation of a parallel-prefix circuit of the prior art.
Figure 4:
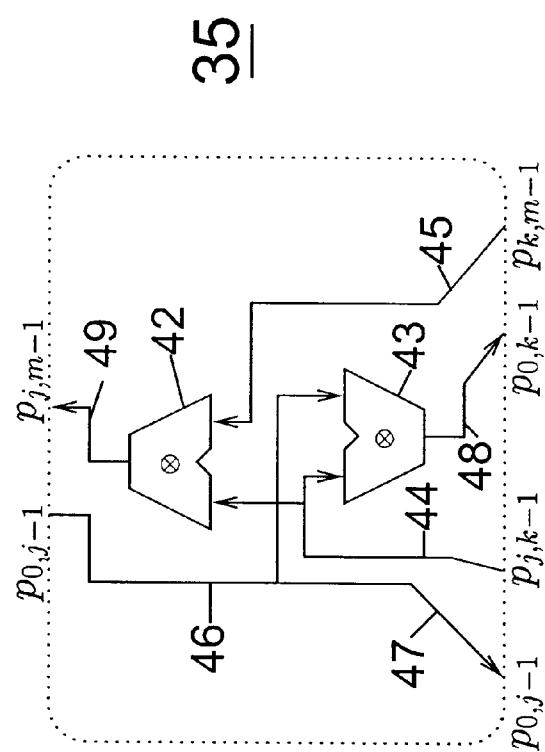
FIG. 4 is a schematic representation of a treefix module of the prior art.

Another variation works as follows: We use a parallel-prefix circuit with summation (e.g., see FIG. 2). The inputs provided are the free bit vector x indicating which tags are free (encoded as a one) and which are busy (encoded as a zero.) The outputs indicate for each bit, how many bits to the left of that bit are true. This number thus provides each bit with a unique nonnegative number in a contiguous range starting at zero. Let us call the output the enumeration index. Now each bit has an address, which is its index in the set of all bits, and an enumeration index which is the index in the set of all one bits. Each one-bit then sends its own address through a butterfly switch to the destination specified by the enumeration index. It is known that every such routing is conflict free in a butterfly switch [17]. Now destination zero has received the address of the first one bit, and destination one has received the address of the second one bit and so forth. An added innovation is to use a cyclic, segmented parallel-prefix circuit, with the segment bit indicating which bit is the oldest in a circular list. The result is that destination zero gets the address of the first free bit, in the cyclic ordering starting from the oldest, and destination one gets the next free bit, and so on.

Related prior art for the above circuit includes an enumeration algorithm that was described in a software context by Christman [4]. Our system is different from [4] in the following ways: (a) Our circuits are used in hardware in a microprocessor, whereas Christman's was used in software on a parallel computer. (b) We also have a cyclic version of the rendezvous.

Our enumeration algorithm is also superior to the ones of [12, 9] in that we can find an arbitrary number of first bits. [12] can only find the first 4 of 24 stations. [9] can only find the first one or two values. Also our system provides the results in binary or unary form (the address can be sent through the switch using binary or unary formatting), instead of only unary form. Also our system provides a cyclic allocator, whereas the systems in the prior art can only allocate from "left-to-right." The prior art machines have either (a) compacted the instructions in the window (which can be expensive in VLSI area and critical-path delay) [8], or (b) effectively drained the instruction window when it fills up (which hurts performance), or (c) allocated the leftmost bit even when the oldest instruction is in the middle of the window (which, e.g. when used in a scheduler, can cause newer instructions to run before older ones, which delays retiring instructions, which can hurt performance.)

Instead of using a butterfly switch to route the free indices to their respective destinations, we can take advantage of a unary encoding. In this case, after computing the enumeration, each one bit performs a write of a one into a two dimensional array of bits. The row number is the address of the one-bit, the column number is the enumeration index of the bit. Note that no two one bits could try to write into the same row, so no routing circuit is needed. All that is required is an address decoder, one per row, to write a one to the appropriate bit in the row according to the enumeration index. At this point destination j reads column j and retrieves a unary representation of the name of the newly allocated tag. Sometimes this circuit is more efficient than the butterfly circuit mentioned above. For example, if destination j needs to control a MUX to read tag i, having i in unary form can be faster because the MUX selectors can be driven directly instead of having to decode i first.

4.2.4 Register Dependence Analysis

This section describes a novel circuit that passes information about the validity of table entries through a wrap-around sequence of operations, where each operation can invalidate, validate, or leave unchanged each table entry. The circuit can be used to implement register dependence analysis, also known as wake-up logic.

Recall that in the dependence analysis stage, instructions reside in the reordering buffer. The role of the dependence analysis stage is to identify those instructions that are ready to run. An instruction is ready to run when all of its necessary register, memory, and control dependencies have resolved. (Not all instructions must wait for memory and control dependencies to resolve.) In this section, we describe logarithmic, delay circuits that identify instructions whose register dependencies have been met. In the following two sections, we describe circuits that identify instructions whose memory and control dependencies have been met.

The circuit that identifies when register dependencies have been met is the wake-up logic. The wake-up logic informs an instruction whenever one of its argument registers is computed. Typically the wake-up logic is implemented using associative memory. For every instruction in the reordering buffer, the wake-up logic compares the tags of its arguments against the tag of every broadcasted result. An instruction is awakened once all of its arguments have been broadcasted.

Our approach to implementing wake-up logic is based on prefix circuits and eliminates associative memory. The implementation is analogous to our implementation of renaming logic in Section 4.2.3. We use prefix circuits to compute information about each instruction's logical register file. Using prefix circuits, each instruction informs its successors which register it modifies and whether it has already computed the register's value. The prefix circuits in turn present each instruction with a bit vector indicating which of its incoming register values have already been computed. If the registers that an instruction uses (its "argument registers") have been computed already, the instruction is awakened.

Figure 33:
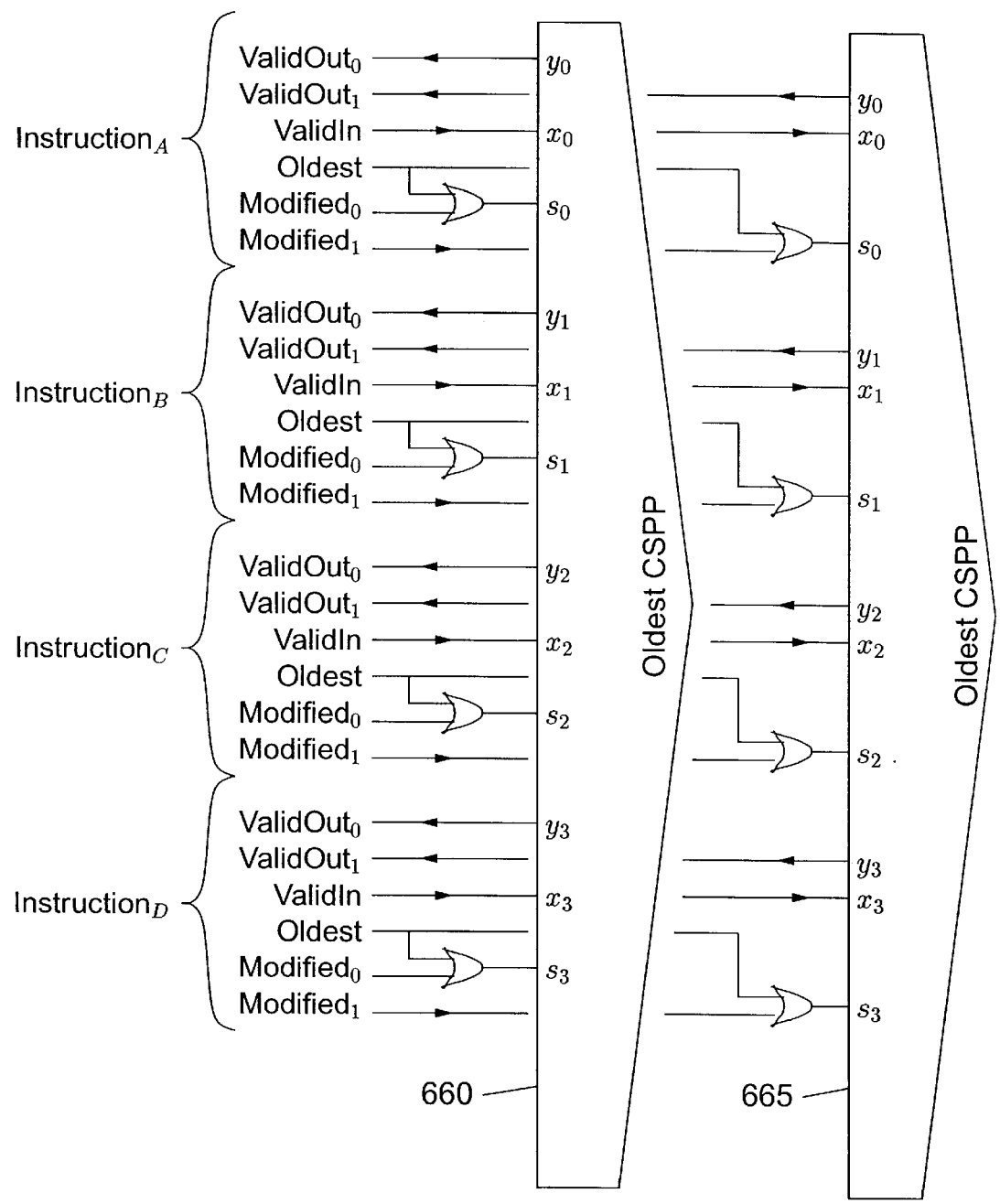
FIG. 33 is a schematic representation of wake-up logic.

FIG. 33 describes the circuitry that implements our wake-up logic in logarithmic gate delay using parallel prefix circuits 660, 665. Specifically, the figure shows wake-up logic that operates on a four-instruction reordering buffer and uses a two-register logical register file (L=2). (We use a small register file for ease of explanation. It is clear how to make the register file larger.) The sequence of instructions in the reordering buffer wraps around, with the oldest instruction identified by its signal Oldest being high. In addition to its Oldest bit, each instruction sends into the circuitry an L-wide array of modified bits, $Modified_j$, and, in general, an L-wide array of valid bits, $ValidIn_j$. For each instruction, $$Modified_j = \begin{cases} 1 & \text{if the instruction modifies register } R_j, \\ 0 & \text{otherwise.} \end{cases}$$

$$ValidIn_j = \begin{cases} 1 & \text{if the instruction modifies register } R_j \\ & \text{and the value has been computed,} \\ 0 & \text{if the instruction modifies register } R_j \\ & \text{and the value has not yet been} \\ & \text{computed,} \\ \text{don't care} & \text{otherwise.} \end{cases}$$

Note that in FIG. 33 we assume that each instruction modifies at most one register $R_j$ and so all the ValidIn signals for a given instruction, $ValidIn_l$ through $ValidIn_{(L-1)}$, can be set to $ValidIn_j$. The circuitry returns to each instruction an L-wide array of valid bits, $ValidOut_i$. If an instruction's $ValidOut_i$ is high, then the instruction's register $R_j$ has been computed.

FIG. 33 uses one "oldest" CSPP circuit for each logical register. The "oldest" CSPP circuit is described in FIG. 15 and FIG. 13. The circuitry in FIG. 33 extends easily to wake up more instructions or to use more logical registers. For each new logical register, we add one more CSPP circuit. For each additional instruction, we add one more leaf node to every CSPP circuit. In mathematical notation, for each logical register $R_j$, we have a CSPP with $a \otimes b = a,$ $s_i = \text{Modified} \vee \text{Oldest},$ $x_i = \text{ValidIn},$ $\text{ValidOut} = y_i,$ where i is the instruction number.

The circuitry we have described so far tells instructions when their arguments become available, but it does not tell them the argument values. There are a number of ways to pass argument values, once an instruction knows when its arguments become available. For instance, we can completely eliminate broadcasting by storing each result directly, according to its tag. In this implementation, computed results are stored directly. Consumer instructions are notified that the result has been computed via prefix circuits in FIG. 33. Once notified, consumer instructions read the result value directly, according to its tag. An alternate approach to passing argument values retains broadcasting. When an instruction is informed by a prefix circuit that its argument has just become available, it latches the broadcasted value. It there are multiple broadcast buses, the prefix circuits can compute which bus to latch from by passing bus identifiers in addition to valid bits along the prefix circuits in FIG. 33. Finally, a third approach passes argument values along the prefix circuits together with the valid bits. This is the approach taken in our Ultrascalar processor, described in Section 4.3.

4.2.5 Memory Dependence Analysis

In order to exploit instruction level parallelism (ILP), the memory bandwidth must also scale. In particular, the processor must be able to issue more loads and stores per clock cycle (i.e. sustain a higher data bandwidth) and the fetch unit must supply more instructions along a correctly predicted program path per clock cycle (i.e. sustain a higher effective instruction bandwidth.)

Figure 34:
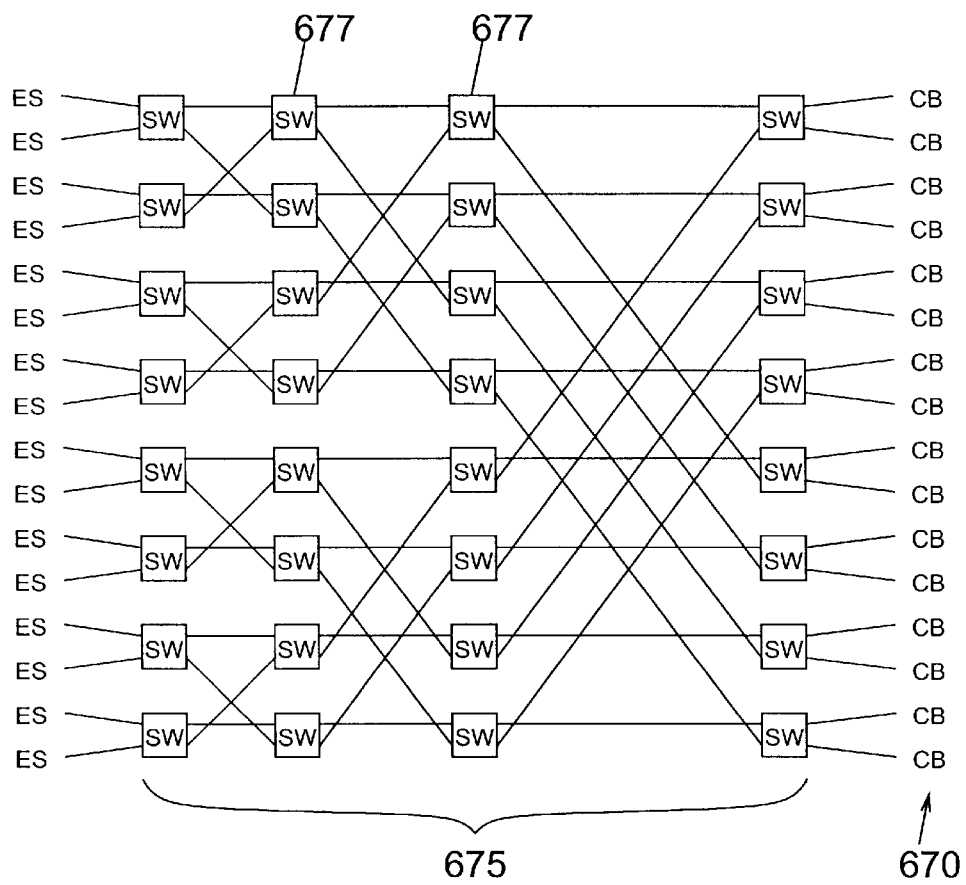
FIG. 34 is a schematic representation of a scalable memory system.

To accommodate more loads and stores per clock cycle without scaling up the number of data cache read and write ports, we can resort to the well known mechanism of interleaving. FIG. 34 illustrates an interleaved data memory subsystem. The memory subsystem comprises an on-chip level-one cache 670 and an on-chip butterfly network 675 connecting the cache to the execution stations ES. Much like the main memory in traditional supercomputers [39], the cache is interleaved among a number of banks CB. In this example, the number of cache banks CB is the same as the number of execution stations ES. In particular, the system shown has 16 execution stations ES, 16 cache banks CB and a butterfly network of four tiers of eight two-input, two-output switches 677 connected as shown. The nth cache bank holds every nth cache line. (To illustrate, let us assume that the number of banks and execution stations is sixteen, that the cache is direct mapped with block size of one word and total size of 1 MB, and that the instruction set architecture uses 32-bit byte addresses. A memory access to address A will then be routed to bank A[5-2]. Bank A[5-2] will find entry A[19-6] and compare its tag against address bits A[31-20]. Should the comparison fail, the level-one cache will access off-chip memory.) The cache banks are connected to the execution stations via a butterfly network and to off-chip memory (not shown) directly. The butterfly network allows n load and store requests to proceed in parallel if they form a rotation or other conflict-free routing. For example, a vector fetch loop will run without any conflicts if the address increment equals the cache block size. But in general, multiple memory accesses may compete for the same bank, or they may suffer from contention in the butterfly, thus lowering the memory bandwidth. The same programming, compiler, and hardware techniques used to alleviate bank conflicts in an interleaved main memory will apply to an interleaved data cache. (For example, making array lengths be relatively prime to each other can reduce the conflicts to a banked memory system.)

Note that the circuitry of a scalable memory system can be used to fetch both instructions and data from memory to the processor.

Another promising approach to increasing data memory bandwidth is to duplicate the data cache. We could allocate a copy of the cache to different subtrees of the Ultrascalar datapath or, in the extreme, to every execution station. Duplicate caches must be kept coherent using, for example, a scalable SMP cache-coherence protocol.

Given that there are several ways to provide memory bandwidth, there is still the problem of coping with memory dependencies.

This section describes several novel circuits that enforce or eliminate memory dependencies in a wrap-around sequence of instructions. The simplest circuit detects when all preceding instructions in a wrap-around sequence of instructions have finished writing memory. An instruction in the sequence is free to read memory once all preceding instructions have finished writing memory. The more complex circuits pass memory addresses and values from producer to consumer instructions. They do so by propagating information about all preceding memory writes to every instruction. The circuits vary in complexity based on whether they append information about subsequent writes or sort the information by address, whether they compact the information, and whether they eliminate older writes to the same address from the information.

In addition to resolving register dependencies, memory instructions must also resolve their memory address dependencies before they access memory. For example, if there are several load instructions between two store instructions in the reordering buffer, then the loads can run in parallel. But the loads must often wait for at least some previous store operations to complete to get the right data. (Note that if we speculate on the data then the loads need not necessarily wait for the previous stores. Below, we discuss branch speculation, which has similar issues to data speculation.) We first present the design for a conservative strategy, which is to wait for all previous store instructions to complete, then we show how to relax this constraint to exploit more parallelism.

Conservative Approach

Our conservative approach requires only one cyclic, segmented conjunction prefix. FIG. 16 and FIG. 13 described a conjunction CSPP. The number of leaf nodes in the CSPP tree, n, is equal to the size of the reordering buffer. The CSPP's inputs are:

$$x_i = \begin{cases} 1 & \text{if instruction in slot } i \text{ of the reordering buffer is not} \\ & \text{a store or if it is a complete store,} \\ 0 & \text{otherwise.} \end{cases}$$

$$s_i = \begin{cases} 1 & \text{if instruction in slot } i \text{ of the reordering buffer is the} \\ & \text{oldest,} \\ 0 & \text{otherwise.} \end{cases}$$

The prefix circuit computes for each instruction whether all previous writes have completed.

Memory Renaming

Some of today's processors perform renaming on memory locations. This allows loads and stores to execute out-of-order and in parallel in the case where the memory addresses are known. In this situation, a read must wait until the memory addresses of all the previous writes are known and all writes to the same address have completed. (We have heard that the Pentium Pro memory subsystem uses memory renaming to allow out-of-order memory operations. In the Pentium Pro scheme, some small number of memory operations are queued on-processor. The off-chip memory operations are performed serially. The on-chip queue will allow reads to complete out-of-order, even if unrelated prior writes have not been committed to memory.)

Memory-renaming has three sources of delays: (1) The addresses of loads and stores are generally not known right away. (2) The data is often not ready. (3) The circuitry for moving data to a load from the correct previous store may introduce delays. This section shows how to keep the circuit delay down to logarithmic cost, and to minimize the impact of the other delays. The trick is to determine when there are dependencies between instructions as soon as possible after an address becomes known, and to pass the data between the instructions as soon as the data becomes available.

Our novel implementation of memory renaming passes a partial memory-renaming table along a prefix circuit called the memory renaming datapath. The approach is comparable to our partial register-renaming maps. Recall that, to rename registers, we passed information about the current renaming of every logical register through a prefix circuit. We do not pass information about every main memory location, but instead we pass information about only the memory locations written to by the instructions currently in the reordering buffer.

Consider a CSPP implementation of the memory renaming datapath for a reordering buffer using 32-bit addresses and data. Each instruction in the reordering buffer contributes one 66-bit memory-renaming entry. The memory-renaming entry specifies:

whether the instruction writes to memory, indicated by the V bit, whether the data it writes, if any, has resolved, indicated by the DataV bit, the memory address, and the data to be written.

As memory renaming entries propagate through the memory-renaming datapath, an associative operator can simply append them: $a \otimes b = \{a,b\}$. Thus, the CSPP's inputs are $x_i$=memory renaming entry for the instruction in slot i of the reordering buffer $$s_i = \begin{cases} 1 & \text{if instruction in slot } i \text{ of the reordering buffer is the oldest,} \\ 0 & \text{otherwise.} \end{cases}$$

An additional prefix circuit computes whether the addresses of all preceding memory writes have resolved. We can compute this information using one cyclic, segmented conjunction prefix. FIG. 16 and FIG. 13 described a parallel cyclic segmented conjunction prefix. The number of leaf nodes in the prefix tree is equal to the size of the reordering buffer. The prefix's inputs are:

$$x_i = \begin{cases} 1 & \text{if instruction in slot } i \text{ of the reordering buffer does not} \\ & \text{write memory or if the address of the write has resolved,} \\ 0 & \text{otherwise.} \end{cases}$$

$$s_i = \begin{cases} 1 & \text{if instruction in slot } i \text{ of the reordering buffer is the oldest,} \\ 0 & \text{otherwise.} \end{cases}$$

The prefix circuit computes for each instruction whether the addresses of all preceding memory writes have resolved.

The memory renaming datapath outputs to each instruction in the reordering buffer an array of n memory-renaming entries, where n is the size of the reordering buffer. The entries are sorted by age. If an instruction in the reordering buffer is executing a memory read and if the addresses of all preceding memory writes have resolved as indicated by the above conjunction CSPP, then the instruction can search the array for the most recent entry with the same address. If there is such an entry, then whenever the DataV bit of that entry goes high, the instruction can read the entry's data. If there is no such entry, then the instruction must read from the data cache. (While waiting for addresses to resolve, the instruction can always speculatively read from the memory renaming datapath or the cache.)

We can reduce the size of the datapath by sending the addresses of memory reading instructions up the tree and sending down the tree only the memory-renaming entries to be read, analogously to the optimized Ultrascalar datapath that will be described in Section 4.3.8.

To reduce the width of the memory-renaming datapath, we may also choose to pass information about a number of writes W that is less than the size of the reordering buffer. Since most instructions within the reordering buffer are unlikely to write to memory, a much narrower memory-renaming datapath should suffice in practice. If the number of memory writes within the reordering buffer exceeds W, however, memory instructions past the Wth write may have to wait. (A one-bit wide disjunction CSPP circuit can notify every instruction in the reordering buffer whether the memory-renaming datapath has overflowed.) Alternately, the instructions can speculate (value speculation or possibly doing the read from memory, and possibly use the scheme mentioned above with cache tagging). To limit the number of memory-renaming entries to W, we can simply stop doubling the size of the memory-renaming tables at level log W of the CSPP tree. (We could even reduce the size of the memory-renaming tables at lower levels of the tree, to further reduce the cost of the system. For example, we could set up the circuits so that at level i of the tree, there are $\lceil 2^{i/2} \rceil$ table entries, limiting the number of entries in the system to about $\sqrt{W}$.) The new associative operator $a \otimes b$ returns the compacted and appended valid entries $\{a,b\}$ by if the total number of valid entries in the two tables is less than W.

To try to keep the number of memory-renaming entries small, we can use an optimized associative operator that invalidates older writes to the same address and then compacts the table. FIG. 37 illustrates the behavior of this optimized operator. The inputs to the operator are two partial memory-renaming tables with four memory-renaming entries. Let's assume that W=4 and so the output is also a partial memory-renaming table with four memory-renaming entries.

Mathematically, a partial memory renaming table is a mapping f from memory addresses to values. Thus f(x)=y means that address x contains value y. (We need an extra NONE value in the range of f to indicate that f has "no value" for x.) The prefix operation that eliminates older writes to the same address, $\otimes$, is defined by $$(f \otimes g)(x) = \begin{cases} g(x) & \text{if } g(x) \neq \text{NONE, and} \\ f(x) & \text{otherwise.} \end{cases}$$

If we have I instructions in the reordering buffer and it takes time $\tau_m$ for the $\otimes$ to run, then our CSPP circuit will have a critical path of length $\Theta(\tau_m \log I)$. Note that $\tau_m$ depends on W, the maximum size of the partial memory-renaming table.

To invalidate older writes to the same address, we must construct $f \otimes g$. One way to do this is to append f and g and then remove the entries from f that also appear in g. It is easy to design a circuit to perform the $\otimes$ computation in time O(W). For example, a bus can be used. Each table entry, in sequence, broadcasts its memory address and sequence number, and any older sequence numbers with the same memory address delete themselves from the table. One can build a system which is faster, however.

Figure 38:
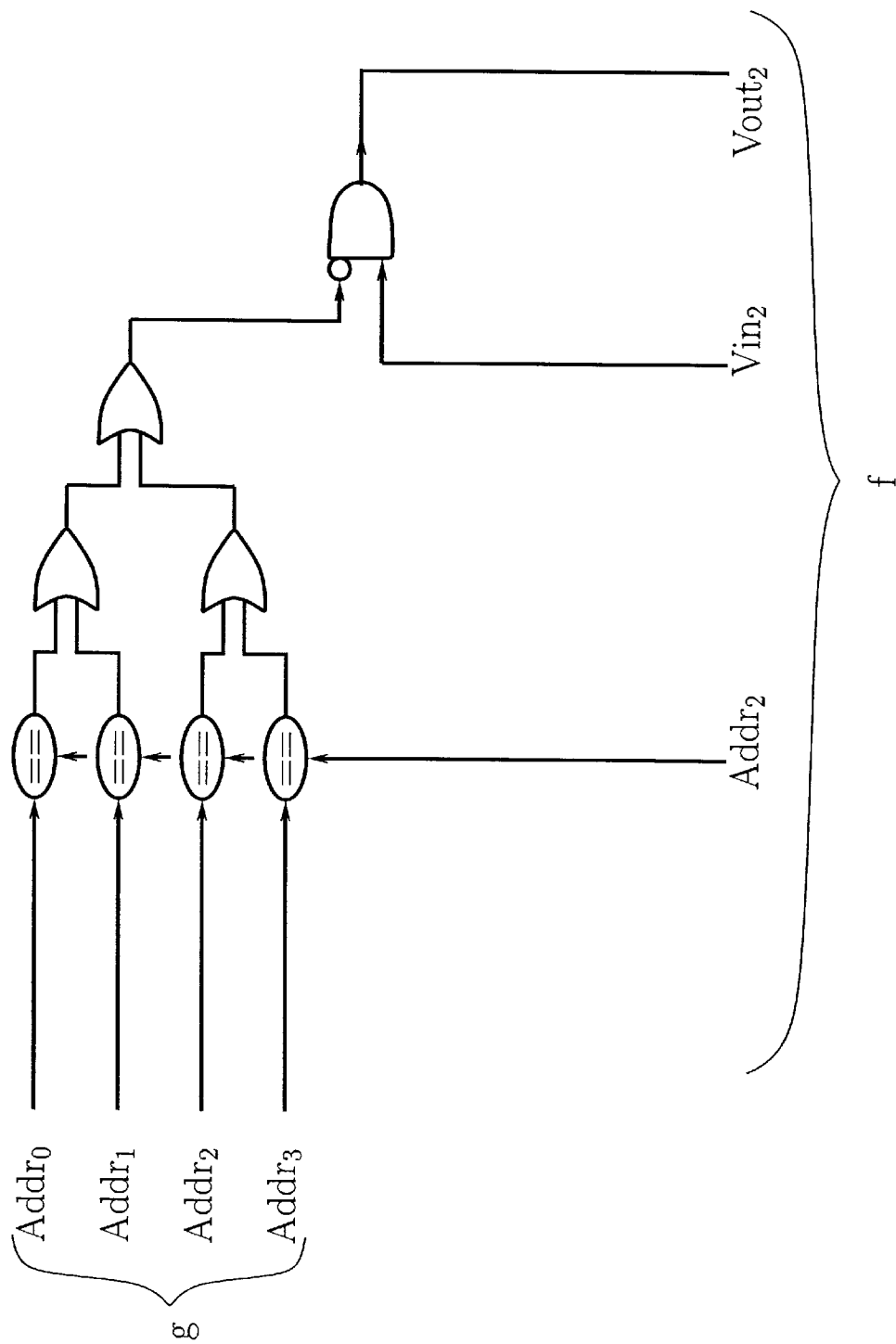
FIG. 38 is a schematic representation of a circuit that invalidates redundant entries.

A logarithmic depth implementation of $f \otimes g$ compares each entry of g against each entry of f in parallel and then uses W W-to-1 or-trees to compute which entries of f should be invalidated. FIG. 38 shows how the third valid bit is computed when W=4. The inputs to the circuit are the addresses of the memory renaming entries in g on the left, the addresses of the memory renaming entries in f and the input valid bits of the memory renaming entries in f on the bottom. The shown output is the output valid bit of the third entry in f.

In general, to eliminate duplicates from a single sorted array, we can use an optimized version of the above circuit. We create a square grid of logic. Write the array entries along the bottom of the grid, and also write another copy of the array entries along the left edge of the grid. Broadcast the array along the rows of the grid, and also along the columns. Now at each grid point we have one combination of a row and a column. At the grid points above the diagonal, we check to see if the row and column entries match. If they do, the column entry should be invalidated.

Another improvement on the memory renaming datapath can merge sorted entries according to their addresses. The associative operator then replaces its append circuit with a merge circuit that merges two arrays of memory-renaming entries according to their addresses. Once the associative operator merges sorted arrays, it is easy to invalidate older writes to the same address. Each entry in the array independently reads its younger neighbor's address, and invalidates itself if its address matches that of its younger neighbor. It is also easy to compact a merged array. When merging entries, we simply sort using the inverted valid bit as the most-significant bit. Thus, invalid entries will appear at the end of the merged array.

Memory Data Speculation

Another approach is to use speculation on the memory reads: A read can assume that no uncommitted instruction actually writes to the same location, and go ahead and read. To make that work, one must go back and redo any reads that made this assumption incorrectly. To our knowledge, no processors perform read speculation, but ideas for read speculation appear in the literature (e.g., [40].)

One way to implement read speculation is to have the read operation put a note on the cache line indicating that if anyone writes to the cache line, then a particular reorder-buffer entry must be notified. If the entry sees that all previous instructions have committed, and it has not been notified, then it knows that the read got the right value, and it may commit, (and it must go and remove the note from the cache line.) If the execution station is notified that the value was changed, then the notification contains the proper data, and the execution station updates its output, and waits for the commit signal. (Also the execution station must continue to wait for notification that a serially previous memory operation has affected its result: For example if a previous store modifies the memory location read by the execution station, then the cache will notify the execution station. That is the reason that the cache must take note of all the readers of a particular location.) A similar idea is described for the Wisconsin Multiscalar architecture [40], to indicate which processor in a multiprocessor system has read or written a particular memory location.

To handle write-after-write conflicts we can play a similar trick. When an execution station writes to a cache-line, the cache line should be given a sequence number of the instruction that did the write. This sequence number contains enough information to determine which instruction is first (if there are N execution stations, then a sequence number in the range [0 . . . 2N−2] should suffice, since given two such sequence numbers we can determine whether they are closer by wrapping forward or closer by wrapping backwards, and thus determine their relative ordering.) The cache line must then keep a list of all the writes along with their sequence numbers and when writes commit they need to update the cache, and reads need to provide a sequence number so that the cache can provide the right value. Thus, a write with sequence number x affects all reads with sequence numbers in [(x+1) . . . (x+N−1)]. All reads with those sequence numbers must be given updated data.

Our scheme is divided up into cache lines to allow the system to be more scalable without costing more area. Thus our scheme is superior to a single queue as used, for example in the Pentium Pro.

4.2.6 Control Dependence Analysis

This section describes a novel circuit that detects when all preceding elements of a wrap-around sequence have met a certain condition. In this case, the condition is that they have committed.

Superscalars are designed so that modifications to the logical register file can be quickly undone. Typically, memory writes cannot be undone and must instead wait until all previous instructions have committed (i.e., are not speculating on data or control flow) before writing memory.

We can compute whether all preceding instructions have committed using one cyclic, segmented conjunction prefix. FIG. 16 and FIG. 11 described a parallel cyclic segmented conjunction prefix. The number of leaf node in the prefix tree is equal to the size of the reordering buffer. The prefix's inputs are:

$$x_i = \begin{cases} 1 & \text{if instruction in slot } i \text{ of the reordering buffer has committed,} \\ 0 & \text{otherwise.} \end{cases}$$

$$s_i = \begin{cases} 1 & \text{if instruction in slot } i \text{ of the reordering buffer is the oldest,} \\ 0 & \text{otherwise.} \end{cases}$$

The prefix circuit computes for each instruction whether all previous instructions have committed.

4.2.7 Scheduling Instructions

This section describes a series of novel circuits that assign a set of resources to a set of the requesting elements from a wrap-around sequence of elements. Not all the elements in the sequence need be requesting and the number of requesting elements may exceed the number of available resources. Various criteria can be used to select which requesting elements receive the resources. For example, one of the circuits assigns the resources to the oldest requesting elements. A more elaborate circuit subdivides elements into several priority levels and assigns resources to higher priority level elements first and, within each level, to older elements first. Additional circuitry enables the assignment of only a subset of resources.

These circuits can be used to implement the scheduling stage of a superscalar processor which selects a set of ready instructions to run on functional units. The instructions are in reservation stations arrayed in the instruction window. Each reservation station contains information indicating whether its instruction is ready to run, and which functional unit is needed. The functional units include floating point adders, multipliers, integer units, and memory units. At the beginning of every clock cycle, some of the instructions in the reservation stations are ready to run. There may be more than one functional unit that can be used by any particular instruction. In many situations, certain of the instructions should be scheduled with higher priority than others. For example, it may be preferred to schedule the oldest instructions with higher priority, or it may be preferred to schedule instructions which resolve condition codes with higher priority. For memory operations it may be preferable to schedule nonspeculative loads rather than speculative loads.

We divide the functional units into classes. For our example, we let the adders be Class 0, the dividers be Class 1, and the memory units be Class 2. Let us assume there are three adders, two dividers, and one memory unit. The number of functional units in Class i is denoted by $F_i$. The functional units in Class i are numbered 0 to $F_i-1$. All $F_i$ functional units are available on every clock cycle.

After scheduling the instructions, the data must actually be moved to the appropriate functional units.

Scheduling The Instructions

Figure 39:
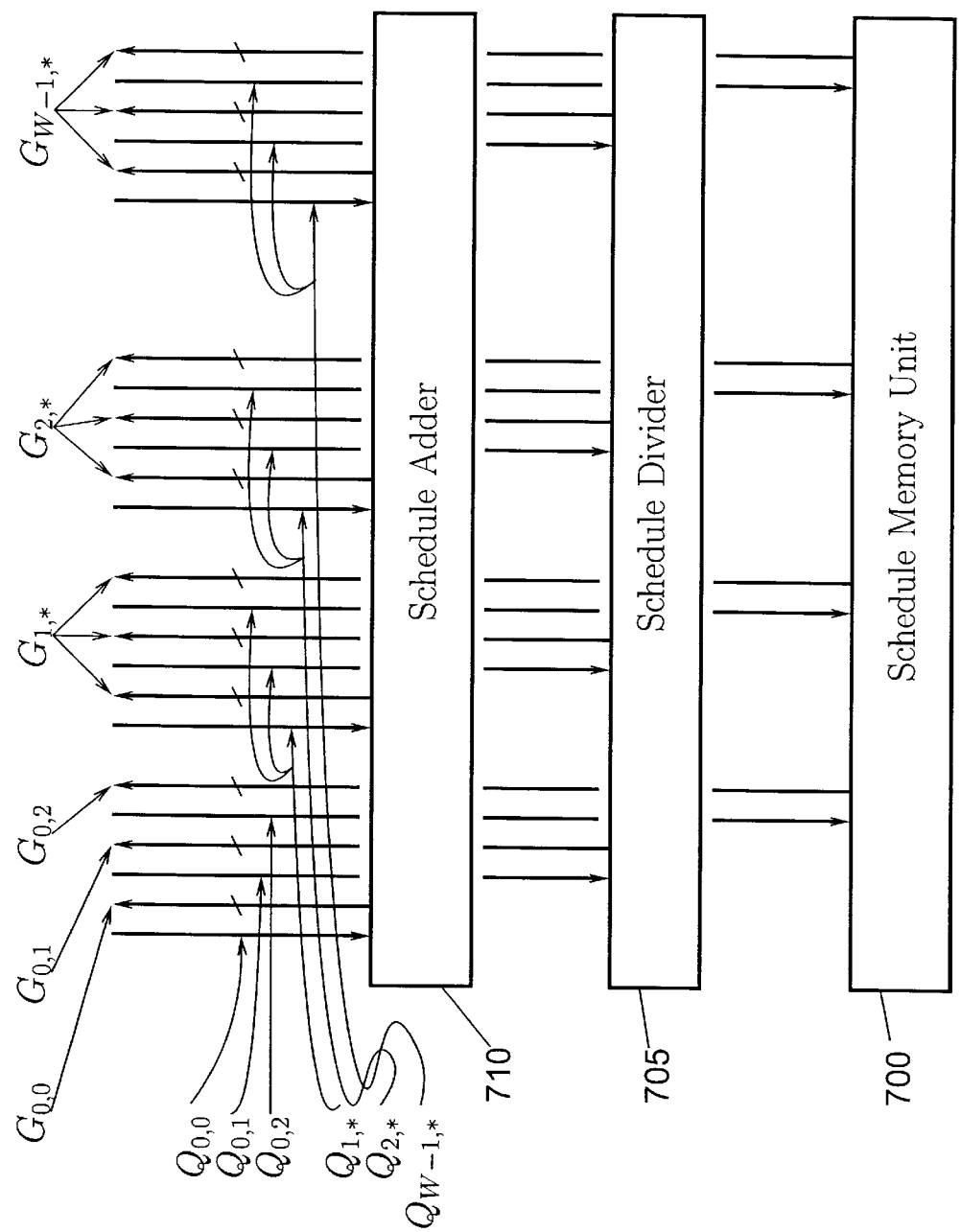
FIG. 39 is a schematic representation of a circuit for scheduling several kinds of resources.

FIG. 39 shows the logic that assigns functional units to ready instructions. This logic includes a schedule memory unit 700, a schedule divider 705 and a schedule adder 710. From the analyze dependencies stage come many "request" bits labeled $Q_{ij}$. Bit $Q_{ij}$ is true if and only if ith instruction in the window is ready to run and it needs a functional unit from Class j. To avoid cluttering up the figure, the signals $Q_{ij}$, are collectively labeled $Q_{1*}$, and the signals $Q_{2j}$, are collectively labeled $Q_{2*}$, and the last window entry's request bits are labeled $Q_{(w-1)*}$. The logic produces signals $G_{ij}$ (with a similar notation that $G_{i*}$, refers to all the request signals from Window i) which go back to the reordering buffer in the analysis stage. Signal $G_{ij}$ may require several bits to encode, since it must encode at least $1+F_i$ different values (one for each functional unit of that class, and one value to indicate that no functional unit was assigned.) Hence $G_{ij}$ must be at least $\lceil \lg(1+F_i) \rceil$ bits wide. Several different encodings are possible. For concreteness, we will use the following encoding for $G_{ij}$ $$G_{i,j} = \begin{cases} k & \text{if } i \text{ the instruction in the window is assigned to function unit Number } k \text{ in Class } j \\ F_i & \text{if } i \text{ instruction in the window requested a function unit and the request was denied,} \\ \text{don't care} & \text{if } i \text{ the instruction in the window did not request a function unit.} \end{cases}$$

In FIG. 39, schedule memory unit 700, schedule divider 705, and schedule adder 710 labeled "schedule, are the schedulers for each of our three example functional unit classes. Each of these is simply a CSPP summation circuit, summing 1-bit inputs $Q_{ij}$, followed by W comparators that compute $\min(y_j, F_i)$. Specifically, for Class i we have $s_i$=the bit indicating that Window Entry j is oldest.

$x_j = Q_{ij}$ $G_{ij} = \min(y_j, F_i)$

Thus if $y_j < F_i$ then $G_{ij}$ indicates that Window Entry j receives functional unit Number $y_j$ in Class j.

Note that there are some special cases that can be optimized to reduce the circuit complexity. Typically there are more window entries than functional units in a class. To compute $\lceil \lg W \rceil$ bits and then take the minimum of that number with $F_i$ may, in some situations, be wasteful. Instead of doing that, a saturating adder can be used in the tally circuit so that the number of bits going up and down the tree never becomes larger than $\lceil \lg(1+F_i) \rceil$ bits in size.

An important special case is if $F_i=1$, (for example, we only have one memory unit in our example.) In this case an OR gate implements a saturating adder, and the circuit becomes the one shown in FIG. 18.

Moving The Data

To move the data to the functional units, several different strategies can be used, including, for example, a broadcast bus or a tree of busses, or a broadcast tree. For very large issue widths and very large numbers of functional units, it is important that the data movement mechanism scale well. (That is, large amounts of data need to move with low latency.) Here we show how to use a butterfly routing network to implement the data movement. This butterfly has enough bandwidth to move all the data in all cases without introducing contention at the internal switches, and it can move the data with only a logarithmic number of gate delays.

Figure 40:
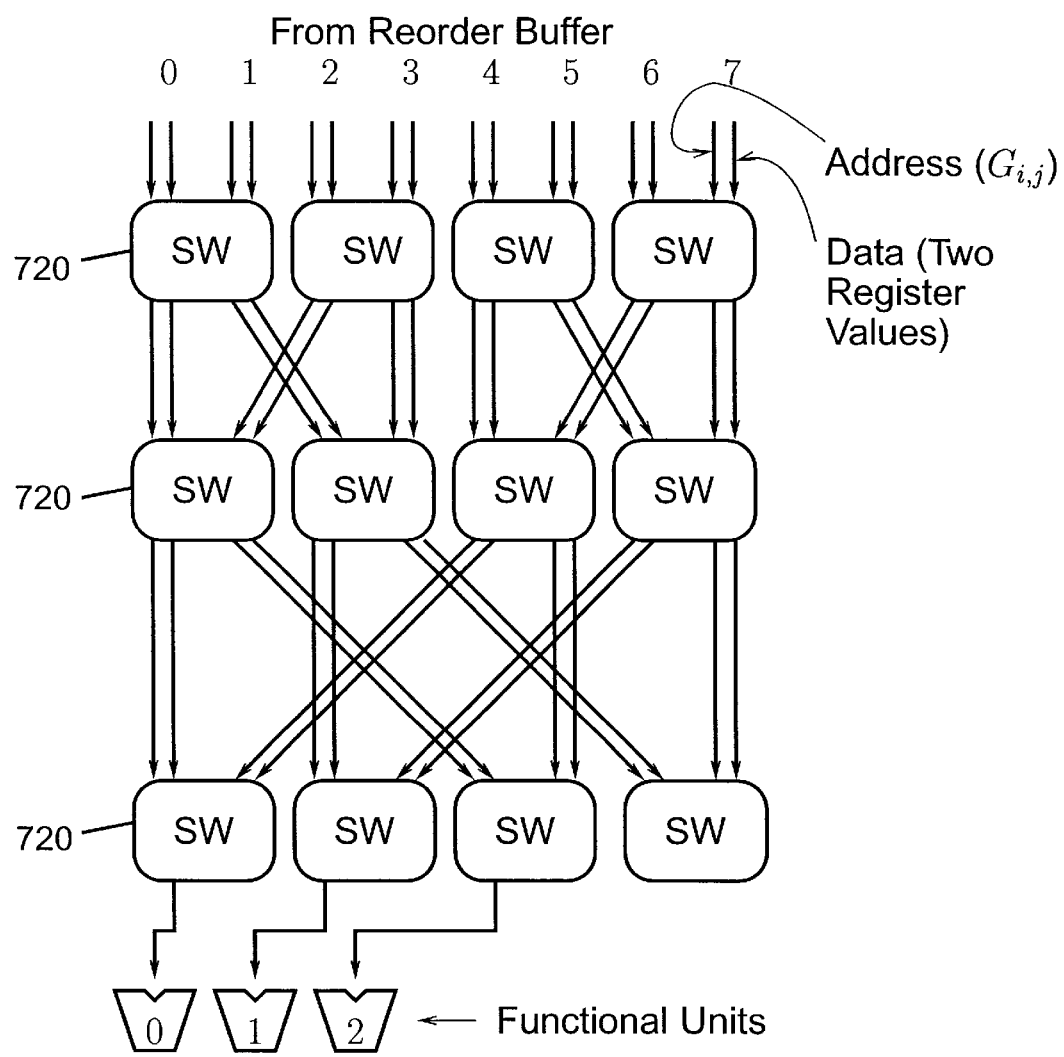
FIG. 40 is a schematic representation of the data movement network.

FIG. 40 shows a butterfly network implemented with switches 720 of degree two. (See, for example, [15, 20] for methods for routing in this kind of network.) This network can move data to the three functional units, illustratively adders from eight window locations 0–7. Switches 720 are connected in a butterfly network. The addresses are the $G_{ij}$, values provided by the scheduler CSPP circuits. The data are the two register values that the reorder buffer provides. Shown is a signal containing the address and a signal containing data from each of the 8 reorder buffer slots.

Figure 41:
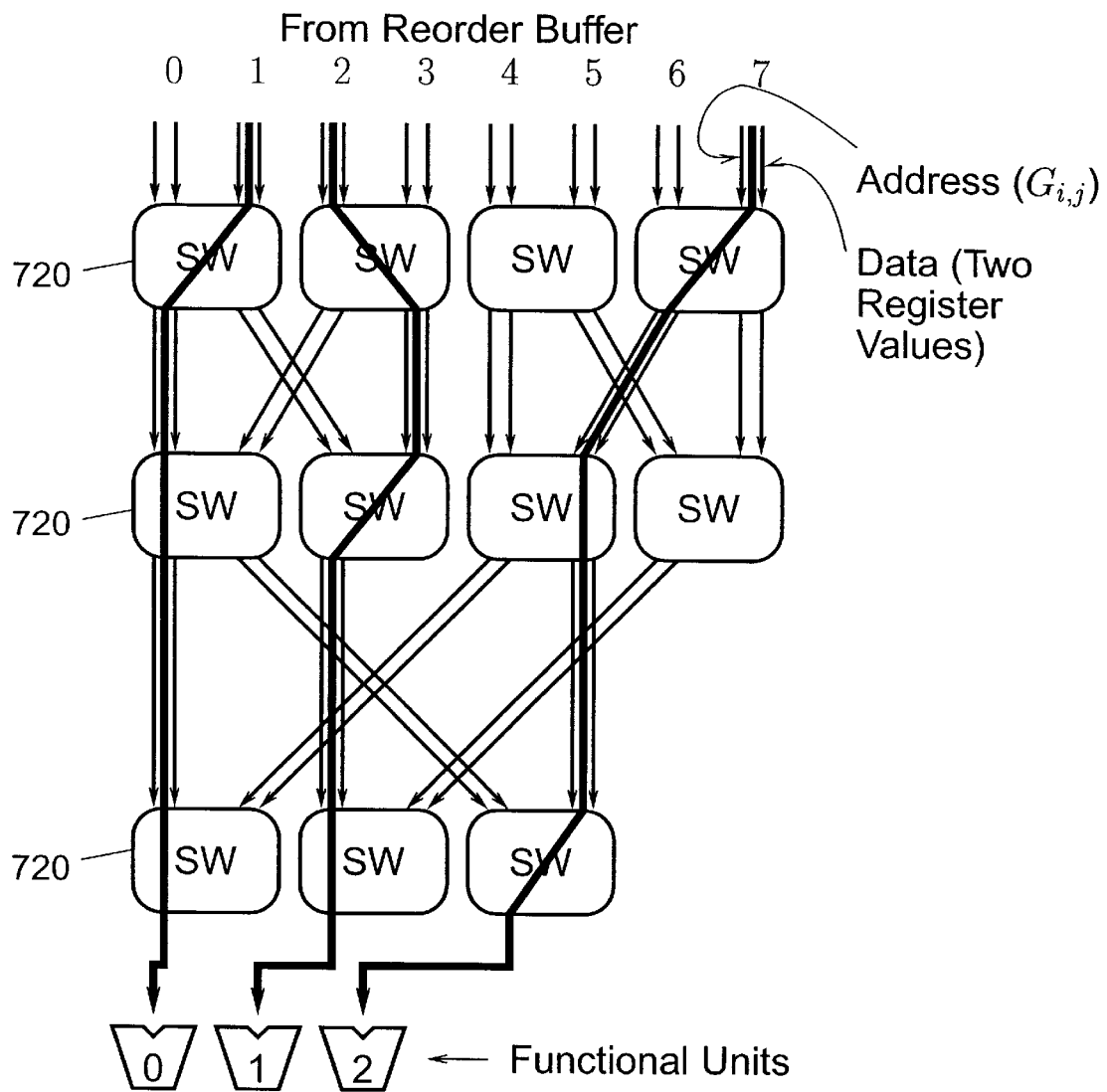
FIG. 41 is a schematic representation of moving data.

FIG. 41 shows an example of how this works. We have deleted a switch which was not needed since we had fewer destinations than sources. The thick line shows the path followed to get data from Sources 1, 2, and 7 to Destinations 0, 1, and 2 respectively. The path chosen is the one chosen by the algorithm of [15]. Specifically, to get from Source i to Destination j one computes the relative address XOR(i,j), which is the bitwise exclusive or of i and j. Then the message goes straight through switch k if bit k is false in the relative address. Thus to go from Source 1 to Destination 0, the relative address is 1 which is $001_2$, in base 2. The message should go diagonally through the first switch and straight through the next two switches.

To go from Source 7 to Destination 2, the relative address is $101_2$=XOR($111_2$,$010_2$), so the message should go diagonally through the first and third switch, and straight through the second switch. Note that [15] uses a wormhole router, but other routing mechanisms can be used to establish the path through the circuit, since the circuit is all one VLSI chip.

Note that for the example we showed there is no conflict for the use of the wires. It turns out that for all the routing patterns produced by this scheduling circuit, there are no conflicts, and the messages can go through in one clock cycle. This is because our scheduler produces only routing patterns that are semi-contractions. A semi-contraction is a routing which has the property that the distance between the destinations of two messages is no greater than the distance between their initial locations. I.e., $|i-j| \geq |f(i)-f(j)|$. In [17] a proof is given that semi-contractions can be routed on a butterfly with no conflicts.

Many of the other networks, such as fat trees, omega networks, complete networks, busses, or trees of busses can be used. Engineering considerations should include taking into account the exact size of the window, the number of functional units, and the number of function unit classes. For example, for a small system a bus may be the best solution, whereas for a large system, a butterfly of Radix 8 may be the best solution. For any particular problem size, determining the costs of the various options is straightforward, however. Also, several different VLSI layouts are possible, including the layout shown in FIG. 40 or an H-tree layout. See [20] for a complete discussion of networks for parallel computing.

Scheduling Certain Instructions with Higher Priority

Usually a scheduler that prefers older instructions rather than younger instructions is a good heuristic. Sometimes, certain younger instructions are preferred over older ones. For example, instructions that resolve conditional branches are good to execute. To schedule such instructions with higher priority we must first identify the instructions, and then schedule the identified instructions.

It is straightforward to use CSPP to identify an instruction that resolves a condition code for an unresolved branch. One performs a backwards CSPP with $\otimes$ = "and", $s_i$=true for unresolved branches, and $x_i$=true for instructions that do not resolve conditions codes.

In this case $y_i$ says that there are no instructions that resolve condition codes until the next unresolved branch. If an instruction resolves condition codes and $y_i$ is true (i.e., $y_i \wedge \bar{x}_i$), then instruction i is identified as a higher-priority instruction.

Among the higher priority instructions, one can schedule the oldest one using a CSPP scheduler as described above. After scheduling the high priority instructions, one uses another CSPP circuit to schedule the low priority instructions. To account for the fact that some of the functional units were allocated to higher priority instructions, one simply adds the number of previously allocated functional units to the output of the tally circuit to compute the assignment of instructions to functional units in the ordinary-priority instructions. Note that the resulting routing of data may not be conflict-free through the butterfly, however. There are several ways to solve this problem. One way is to design a network that can handle the resulting routings. One such network consists of two butterflies, one for the higher priority instructions and one for the lower priority instructions. Another approach is to take advantage of the fact that once we have decided which instructions are to be allocated to a function unit, we do not really care which functional unit in the class is allocated to which instruction. One can take advantage of this leeway by running an additional parallel prefix operation: after identifying all the instructions that will be assigned a functional unit, one then tallies those instructions. An acyclic unsegmented parallel prefix will do the job in this case with $x_i$=true if instruction i's first assignment was less than $F_j$, and $y_i$=the actual functional unit to which instruction i is assigned.

Then one can route the allocated instructions to their functional units through a butterfly switch with no conflicts.

Scheduling a Subset of Functional Units

Note that so far we have assumed that all $F_i$ functional units can be scheduled on every clock cycles. This is true of pipelined functional units such as a pipelined multiplier or 1-cycle functional units such as an integer adder. However, it is not true of multi-cycle functional units such as a divider. Consider the scenario where a processor has eight dividers that comprise Class 0. Dividers 3 and 7 are available to be scheduled. We wish to match dividers 3 and 7 with the two oldest requesting instructions, i and j. The two oldest requesting instructions received $G_{i,0}=0$ and $G_{j,0}=1$ respectively. To inform instructions i and j that they have been assigned dividers 3 and 7 respectively, we first use a summation parallel prefix to number available dividers: $x_j=1$ if divider is available, 0 otherwise. We then connect the scheduled instructions to available dividers using two back to back butterfly networks. The routing is collision free. Note that similar circuits were used for tag reuse and instruction scheduling.

4.2.8 Broadcast Logic

The broadcast stage of a superscalar processor is responsible for forwarding values between producer and consumer instructions. The forwarding is typically accomplished by broadcasting every computed value to every instruction within the reordering buffer. When an instruction is informed by the wake-up logic that its argument has just become available along a given broadcast bus, it latches the broadcasted value along that bus. To scale this approach to large numbers of outstanding instructions, values should be fanned out along a fan-out tree instead of being broadcast along a single bus.

An alternate approach can eliminate broadcasting of values by storing each result directly in a file, according to its tag. In this implementation, computed results are stored directly. Consumer instructions are notified that the result has been computed via the processor's wake-up logic. Once notified, consumer instructions read the result value directly from the file, according to its tag.

We can draw on our implementation of the wake-up logic in Section 4.2.4 to further optimize the forwarding of values between producer and consumer instructions. This is because the prefix circuits in FIG. 33 can pass other useful information in addition to valid bits. Consider an implementation in which values are broadcasted. It there are multiple broadcast buses, the prefix circuits described in Section 4.2.4 can compute which bus to latch from by passing bus identifiers in addition to valid bits along the prefix circuits in FIG. 33. A completely different implementation arises when we pass logical register values in addition to valid bits along the prefix circuits in FIG. 33. This is the approach taken in our Ultrascalar processor. In this case, values are automatically forwarded from producer instructions to consumer instructions without the need to broadcast results or to store results in an intermediate file.

4.2.9 Bypass Logic

To achieve good processor performance, it is critical to minimize the number of clock cycles between the time when an instruction's arguments become available and when that instruction begins executing. Superscalar processors can minimize this delay by broadcasting the tags of computed results a constant number of clock cycles before the results are actually computed. Since an instruction is awakened before its arguments are ready, it may be able to schedule itself and reach the beginning of the execute stage while its missing argument(s) are being computed. The instruction grabs its missing argument(s) along their bypass paths.

Note that our novel implementation of the wake-up logic described in Section 4.2.4 and illustrated in FIG. 33 allows instructions to be awakened a constant number of clock cycles, c, before their arguments are computed. To do that, each instruction in the reordering buffer simply sets its logical result register's ValidIn bit c clock cycles earlier:

$$\text{Modified}_j = \begin{cases} 1 & \text{if the instruction modifies register } R_j, \\ 0 & \text{otherwise.} \end{cases}$$

$$\text{ValidIn}_j = \begin{cases} 1 & \text{if the instruction modifies register } R_j \text{ and the value has been computed} \\ & \text{or will be computed within } c \text{ clock cycles} \\ 0 & \text{if the instruction modifies register } R_j \text{ and the value has} \\ & \text{not yet been computed} \\ \text{don't care} & \text{otherwise} \end{cases}$$

Each instruction then knows that its logical input register R, will be computed c clock cycles after ValidOutj goes high. If bus identifiers are also being passed along the prefix circuits of FIG. 33, they too can be passed early allowing for a speedy setting of the bypass paths. If logical register values are being passed along the prefix circuits of FIG. 33, the computed value will arrive c clock cycles after its valid bit has been set high, allowing the consumer instruction time to schedule itself.

4.2.10 Reusing the Reordering Buffer

As instructions compute and update state, the superscalar processor must remove them from the reordering buffer in order to make room for new instructions. Some superscalars store instructions in their reordering buffer in order with the oldest instruction in slot 0, second oldest in slot 1, and so on. These processors can use an and-tree circuit to compute when all instructions in the buffer have finished and then invalidate all buffer entries and begin refilling the buffer.

Some superscalars compact remaining unfinished instructions on every clock cycle and compute a pointer to the first free slot in the buffer. New instructions can be written into the buffer on every clock cycle starting at the first free slot.

The CSPP-based circuits that we have used to implement renaming logic, dependence analysis logic, scheduling logic, and broadcast logic, presume that instructions are stored in a wrap-around order, with the oldest instruction identified by its Oldest bit being set high. On every clock cycle, a buffer slot is free to be refilled when its instruction has finished and all older instructions have also finished. On every clock cycle, a buffer slot contains the oldest instruction if all the previous instructions have finished and its instruction has not finished. We can use another prefix circuit to compute these conditions on every clock cycle. The prefix circuit tells each buffer slot whether all the previous instructions have finished. The buffer slot can combine that information with information about its own instruction in order to determine its new status.

We can compute whether all preceding instructions have finished using one cyclic, segmented conjunction prefix. FIG. 16 and FIG. 13 described a parallel cyclic segmented conjunction prefix. The number of leaf nodes in the prefix tree is equal to the size of the reordering buffer. The prefix's inputs are:

$$x_i = \begin{cases} 1 & \text{if instruction in slot } i \text{ of the reordering buffer does not} \\ & \text{write memory or if the address of the write has resolved,} \\ 0 & \text{otherwise.} \end{cases}$$

$$s_i = \begin{cases} 1 & \text{if instruction in slot } i \text{ of the reordering buffer is the oldest,} \\ 0 & \text{otherwise.} \end{cases}$$

The prefix circuit computes for each instruction whether all previous instructions have finished.

4.3 The Ultrascalar Processor

We have seen that today's superscalar processors rename registers, bypass registers, checkpoint state so that they can recover from speculative execution, check for dependencies, allocate execution units, and access multi-ported register files. The circuits employed today are complex and irregular, requiring much effort and ingenuity to implement well. Furthermore, the delays through many of the circuits grow quadratically with issue width (the maximum number of simultaneously fetched or issued instructions) and window size (the maximum number of instructions within the processor core), making future scaling of today's designs problematic [32, 8, 10]. With billion transistor chips on the horizon, this scalability barrier appears to be one of the most serious obstacles for high-performance uniprocessors in the next decade. (Texas Instruments announced recently a 0.07 micron process with plans to produce processor chips in volume production in 2001 [42].) Surprisingly, it is possible to extract the same instruction-level parallelism (ILP) with a regular circuit structure that has only logarithmic gate delay and linear wire delay (speed-of-light delay) or even sublinear wire delay, depending on how much memory bandwidth is required for the processor. This section describes a new processor microarchitecture, called the Ultrascalar processor, based on such a circuit structure.

The goal of this section is to illustrate that processors can scale well with issue width and window size. We have designed a new microarchitecture and laid out its datapath. We have analyzed the asymptotic growth and empirically computed its area and critical-path delays for different window sizes. We do not evaluate the benefits of larger issue widths and window sizes. Some work has been done showing the advantages of high-issue-width and high-window-size processors. Lam and Wilson suggest that ILP of ten to twenty is available with an infinite instruction window and good branch prediction [19]. Patel, Evers and Patt demonstrate significant parallelism for a 16-wide machine given a good trace cache [34]. Patt et al argue that a window size of 1000's is the best way to use large chips [35]. The amount of parallelism available in a thousand-wide instruction window with realistic branch prediction, for example, is not well understood however. We believe that in future applications there will be plenty of parallelism to keep a wide-issue processor busy.

The rest of this section is organized as follows. Section 4.3.1 shows a linear-time Ultrascalar processor core. Section 4.3.2 describes a more detailed performance analysis to show the benefits of our approach. Section 4.3.3 shows a log-time processor core. Section 4.3.4 shows ways to scale the memory subsystem. Section 4.3.5 describes speculation in the Ultrascalar. Section 4.3.6 shows the VLSI layout of the processor core, and analyzes the chip complexity using that layout. Section 4.3.7 shows the performance of our prototype processor core, and shows how to further improve the performance. Section 4.3.9 compares the Ultrascalar to some related work.

4.3.1 A Linear-Time Datapath

This section describes the core of the Ultrascalar processor. The Ultrascalar processor core performs the same functions as a typical superscalar processor core. It renames registers, analyses register and memory data dependencies, executes instructions out of order, forwards results, efficiently reverts from mispredictions, and commits and retires instructions. The Ultrascalar processor core is much more regular and has lower asymptotic critical-path length than today's superscalars, however. In fact, all the scaling circuits within the processor core are instances of a single algorithm, parallel prefix, implemented in VLSI. Because of the core's simplicity, it is easily apparent how the number of gates within a critical path. grows with the issue width and window size.

The usual superscalar approach is to rename the registers mentioned in the instructions, and then build a sequential state machine that tries to schedule those instructions to execute in parallel. Our design is based on an alternative idea in which we assume that there are plenty of arithmetic logic units (ALUs) and our job is to wire them together to compute the right value. We start with the old register state and propagate the register state through a chain of switches and ALU's that produce new register values. Each instruction corresponds to a switch and an ALU. Each switch can locally set its switch settings based on its instruction's register fields.

An ALU is assumed to be cheap since to include one ALU for every instruction only costs linear area and costs no extra time. Since other parts of the chip have at least linear area the cost of ALU's will be acceptable for large I Also, it would be possible to share ALU's among different execution stations, using the same circuitry for sharing ALU's among buffer entries described in Section 4.2.7. In general, any circuit in Section 4.2 that operates on a sequence of instructions in the reordering buffer can also operate on a sequence of instructions in the Ultrascalar.

The core does not include the memory and branch prediction subsystems. Instead the core presents the same interface to the instruction fetch unit and the data cache as today's superscalar processor cores. Predicted instruction sequences enter the core, and data load and store requests are initiated by the core. We briefly discuss possible memory subsystems in Section 4.3.4, but the Ultrascalar core will benefit from the advances in effective instruction fetch rate and in data memory bandwidth that can be applied to traditional superscalar processors. In particular, since the Ultrascalar processor core performs the same functions as the core of today's superscalars, it achieves the same CPI, or more, performance as existing superscalars when attached to a traditional 4-instruction-wide fetch unit using traditional branch prediction techniques and a traditional cache organization. As effective fetch rates and data bandwidths increase, the Ultrascalar core can scale gracefully, raising the CPI without exploding the cycle time.

One way to think of the Ultrascalar processor is that it uses a circuit-switched network to compile at runtime the dataflow graph for a dynamic sequence of unrenamed instructions. The circuit switched network connects producer instructions with consumer instructions. The structure and the layout of this network are the key to the Ultrascalar's scalable performance.

Figure 42:
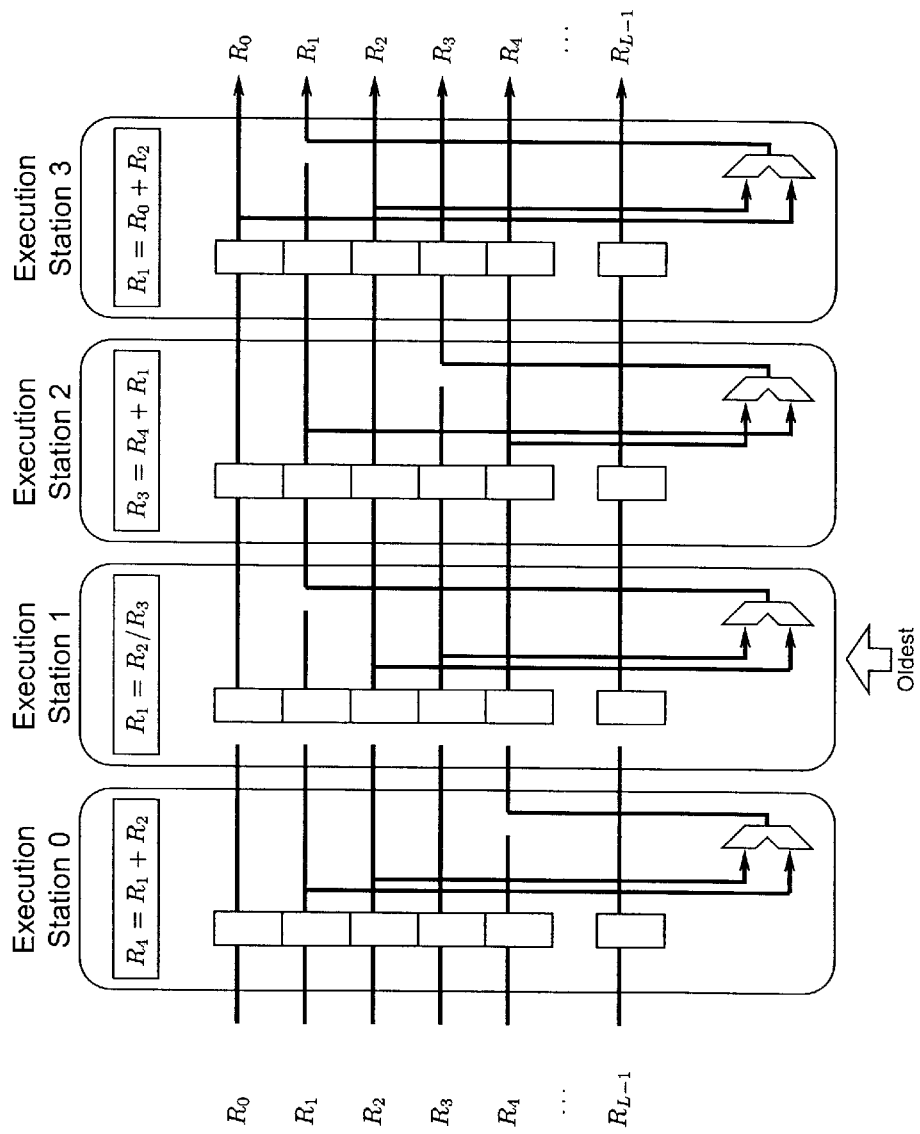
FIG. 42 is a schematic representation of a linear-time ring datapath.

Before we introduce the Ultrascalar, let us briefly consider a simpler datapath in which the network connecting producer instructions to consumer instructions consists of a simple ring. We will refer to this datapath as the linear-time datapath. FIG. 42 illustrates. The datapath is divided into four execution stations. Each execution station takes an entire copy of the registers and produces a new copy of the registers. The execution station includes, for each instruction, the instruction latch 730, its associated switching logic, and its ALU 735. The ring network routes the values of L logical registers through a pipelined series of execution stations. (The value of L is determined by the instruction set architecture. For example, for many RISC architectures L=32.) Each execution station holds and eventually executes one instruction from a dynamic sequence of instructions. Executing an instruction may take only one clock cycle (e.g., for integer addition) or many clock cycles (e.g., for division.) The number of execution stations corresponds to the number of outstanding instructions within the processor much like the instruction window (also known as the reordering buffer) in today's superscalars. As in today's superscalars, the fetch width is independent of the number of outstanding instructions. Newly fetched instructions simply refill execution stations in a wrap-around fashion, starting with the oldest instruction. In the figure, the oldest instruction in the current sequence resides in Execution Station 1, the youngest in Execution Station 0. Note that the pipeline registers of Execution Station 1 hold the committed state of the register file. Throughout the datapath, each register value has a ready bit. The ready bit is associated with the wires carrying the register value and indicates whether the value has already been computed. As instructions complete, they retire from the datapath and new instructions enter the datapath. Eventually, the output wires of Execution Station 0 hold the new state of the register file, with all of their ready bits set to high.

The execution station executes its instruction once its arguments are ready and outputs the result to the destination register's value bus. The execution station keeps the ready bit of the destination register low and raises it only after the result is ready. All other register values and their ready bits pass through the execution station unmodified. An execution station is committed when it has computed its values and its instruction definitely is to be run (e.g., no previous branch speculation can mispredict.)

Consider the performance of the linear-time datapath example in FIG. 42. The complete sequence of instructions currently in the datapath (with the corresponding execution station shown to the right) is:

| Instruction | Execution Station |
|---|---|
| $R_1 = R_2/R_3$ | (1) |
| $R_3 = R_4 + R_1$ | (2) |
| $R_1 = R_0 + R_2$ | (3) |
| $R_4 = R_1 + R_2$ | (0) |

Note that the first instruction in the sequence is not placed in the first execution station. Instead the first instruction is placed in any execution station and subsequent instructions wrap around. In our example, the first instruction is in the second execution station (Station 1), and the fourth instruction has wrapped around to Station 0. Suppose that division takes 24 clocks and addition takes one.

On Clock 0, we assume that all the registers become valid at Station 1. Station 1 begins executing.

On Clock 1, all the registers except for $R_1$ become valid at Station 2. Station 2 waits for $R_1$.

On Clock 2, all the registers except for $R_1$ and $R_3$ become valid at Station 3. Station 3 executes and produces a new value of $R_1$.

On Clock 3, all the registers except for $R_3$ become valid at Station 0. Station 0 executes and produces a new value of $R_4$.

On Clock 23, Station 1 finishes executing.

On Clock 24, Station 2 executes.

On Clock 26, all the registers become valid at Station 0. Note that the instructions executed out of order. The last two instructions completed long before the first two. Moreover, the datapath automatically renamed registers. The last two instructions did not have to wait for the divide to complete and write $R_1$.

Our linear-time datapath bears similarities to the counterflow pipeline [41]. Like counterflow, the linear-time datapath automatically renames registers and forwards results. Counterflow provides a mechanism for deep pipelining, rather than large issue width, however. The counterflow pipeline is systolic, with instructions flowing though successive stages of the datapath. Since instructions serially enter the pipeline in the first pipeline stage, the CPI is limited by the rate at which instructions can enter the pipeline. It is not clear how counterflow could be modified to increase its issue width. In contrast, in our linear-time datapath, all execution stations can refill with new instructions simultaneously. Thus, whereas our linear datapath has no corresponding limit on CPI (and is limited by the clock period), the counterflow can push the clock period down but is limited to one CPI.

Another difference between our linear datapath and counterflow is that counterflow uses less area to route data. It only passes results and arguments down its pipeline, not the entire register file. In Section 4.3.7 we will discuss a similar modification to reduce the number of wires used in the Ultrascalar.

One weakness shared by counterflow as well as our linear-time datapath is the speed of routing. In a synchronous implementation our linear-time datapath, if a producer and a consumer of a register value are separated by n instructions in the dynamic instruction sequence, it takes n clocks to serially route the value through all it intermediate execution stations. For example, it took 3 clocks to route $R_2$ from Station 1 to Station 0. (In a counterflow pipeline, it typically would take n/2 clocks to perform this operation.) This linear delay can be intolerably high compared to today's superscalars that forward values within one clock cycle.

4.3.2 A More Detailed Performance Analysis

Here we introduce another variant on the Ultrascalar in order to make it easier to show some analytical results.

Figure 43:
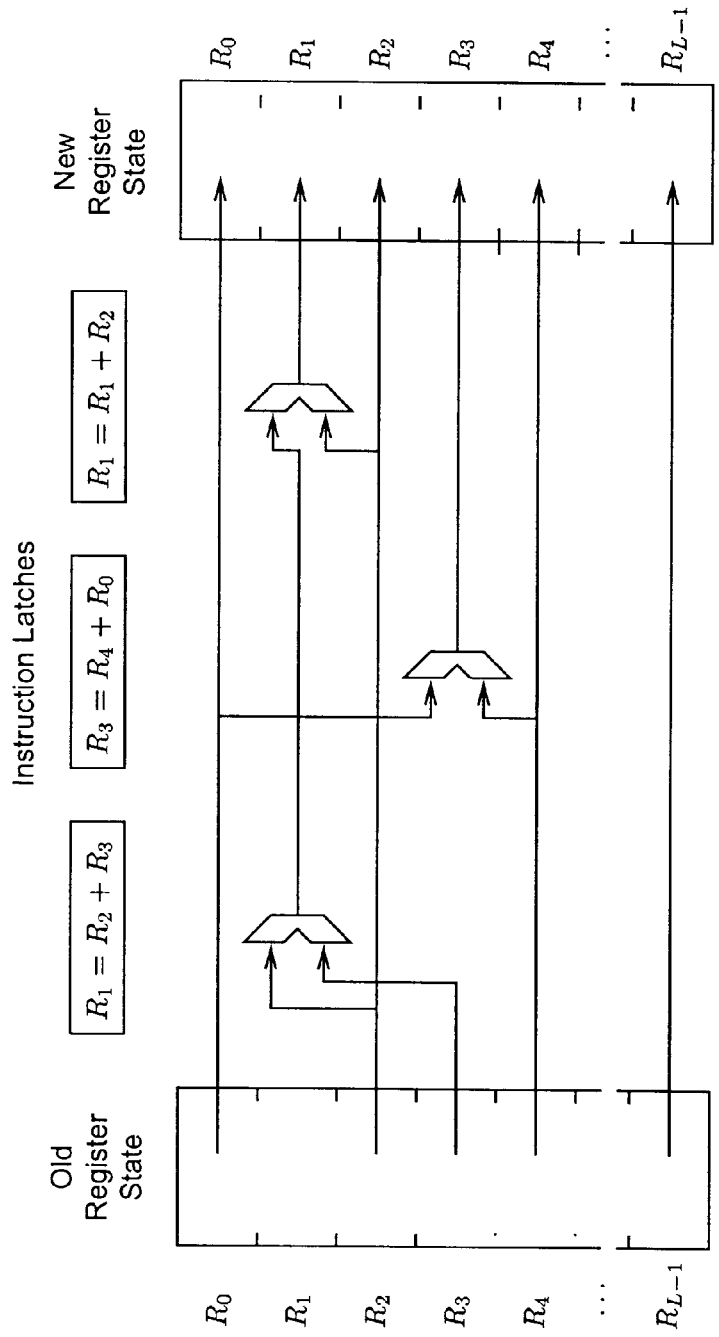
FIG. 43 is a schematic representation of how instructions specify a wiring.

Another way to implement the linear-time Ultrascalar datapath is to bypass the register flipflops in most execution stations. A simple scheme is shown in FIG. 43. In this simple model, there are two registers, one holding the old register state and one holding the new register state. The instructions can be thought of as specifying how to wire together registers and arithmetic units. In this case, there are three instructions, which are supposed to execute leftmost first. The old register state is on the left, and the new register state is on the right.

Figure 44:
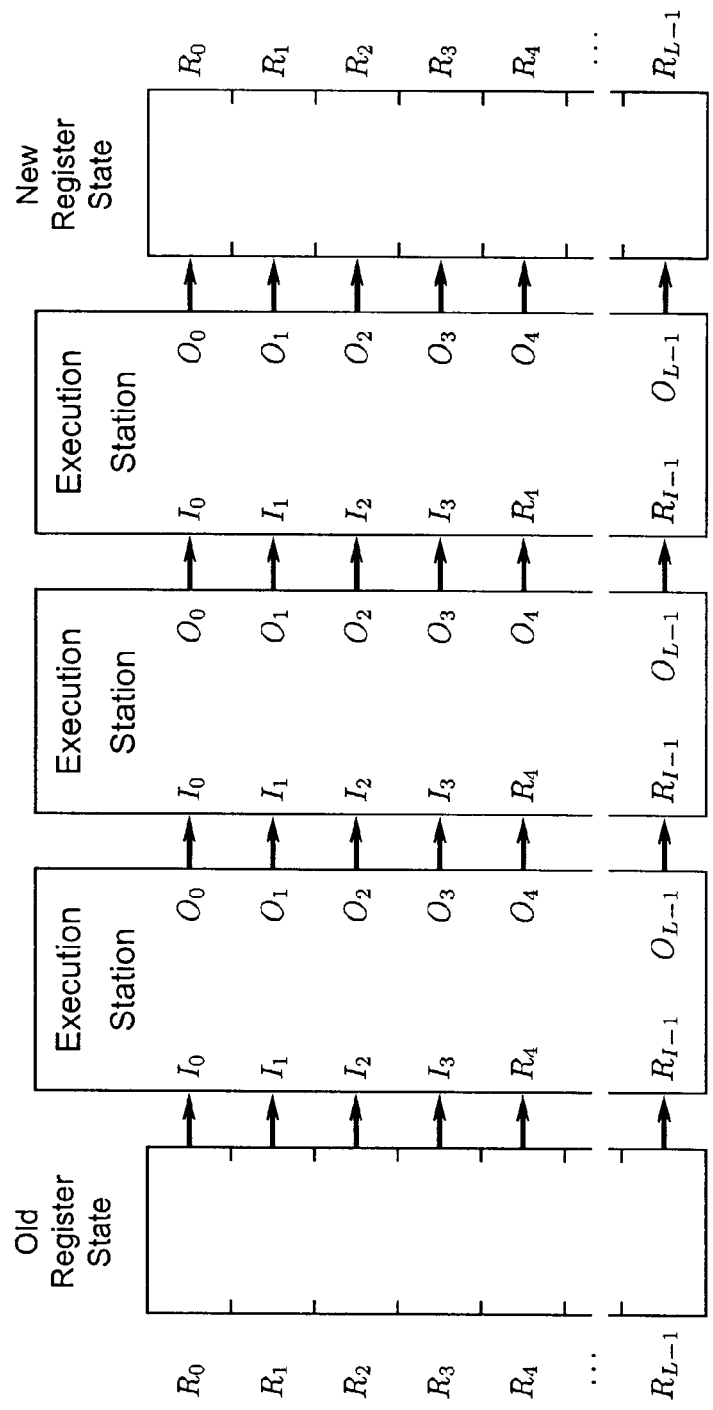
FIG. 44 is a schematic representation of an overview of a linear-time datapath.

FIG. 44 shows the same system as FIG. 43, but we have divided the system into execution stations.

Figure 45:
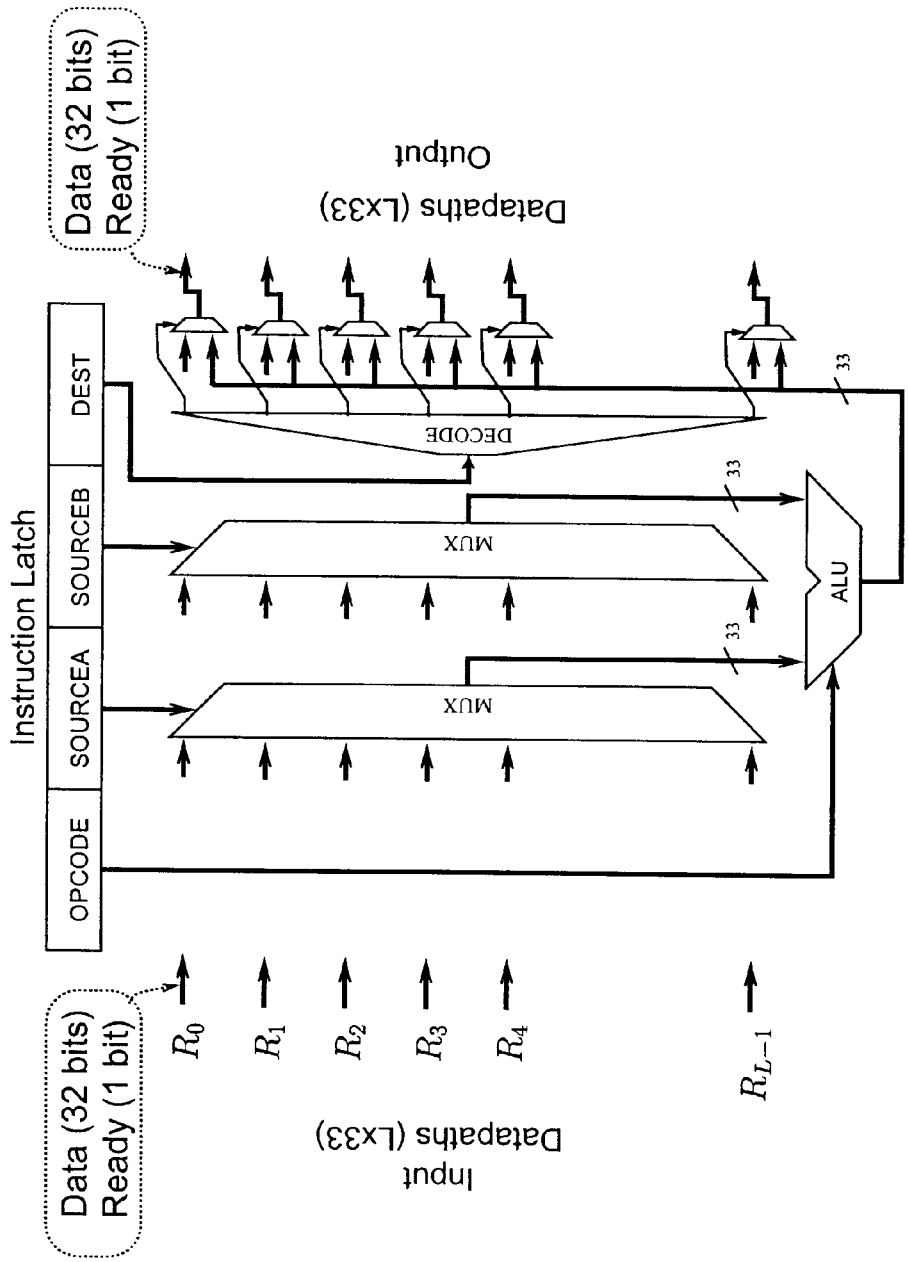
FIG. 45 is a schematic representation of an execution station for the linear-time datapath.

FIG. 45 shows the the executions station for FIG. 44. The execution station takes as its input the instruction, stored in its original form (not renamed) in the instruction latch at the top of the circuit. It also takes the values of all L registers from its left. We will assume from now on that each register is 32 bits wide, although all of our ideas extend to arbitrary width. Attached to each register value is an additional ready bit that indicates whether the value is ready (i.e. holds the correct register state for that instruction). The execution station produces as outputs the L register values and their ready bits. When all the ready bits are high, the output values hold the state of the register file right after the instruction's execution.

This Ultrascalar is also a a linear-time system, but in this case the clock period must grow as the machine size grows, whereas in the version shown in FIG. 42 the clock period does not grow but the number of clock cycles grows. This is the tradeoff between the clock period and number of clock cycles familiar to digital designers. With this variant we can analyze everything in terms of clock period.

The clock period grows with gate delays. The gate delays come from two sources: There is the delay induced by the data dependencies in the program, and there is the delay induced, even in parallel programs, by the circuit switches. We will analyze these cases by studying an instruction sequence which has no dependencies between instructions, a sequence in which every instruction depends on the previous one, and a sequence which has an intermediate number of dependencies.

The first case is an instruction sequence in which there are no true data dependencies. Consider this sequence of I instructions (I=5 in this case):

R1=R2+R3;
R2=R3+R4;
R3=R4+R5;
R4=R5+R6;
R5=R6+R7;

All of those instructions could run in parallel. In one of today's superscalar processors, all the registers are renamed to remove the antidependency between each pair of instructions. (An antidependency is a situation where a later instruction writes to a register that an earlier instruction reads from. This would constrain the second instruction from finishing before the first one started. Tomasulo showed how to rename the registers to get rid of those antidependencies [44]. Our parallel-prefix technique also gets rid of antidepencies automatically, since effectively every register is renamed on every instruction.) In this case, the longest gate delay through the circuit is a path that goes through one L-to-1 MUX, and through an ALU, and through I 2-to-1 MUXes. This is because each 33-bit datapath must be switched through a 2-to-1 MUX in every execution station. Thus we have gate delay $$\tau = \tau_{L\text{-}to\text{-}1\ mux} + \tau_{ALU} + I \cdot \tau_{2\text{-}to\text{-}1\ mux}.$$

The next case is an instruction sequence in which every instruction depends on all of its predecessors. Consider this instruction sequence:

R2=R1+R1;
R2=R2*R1;
R2=R2+R1;
R2=R2*R1;
R2=R2+R1;
R2=R2*R1;
R2=R2+R1;
R2=R2*R1;
R2=R2+R1;

Each of those instructions depends on the previous instruction. Thus, the longest delay through the circuit is through I L-to-1 MUXes, I ALUs, and I 2-to-1 MUXes. We have $$\tau = I \cdot (\tau_{2\text{-}to\text{-}1\ mux} + \tau_{L\text{-}to\text{-}1\ mux} + \tau_{ALU})$$

In this case we expect the delays of the L-to-one MUXes and the ALUs to dominate in comparison to the 2-to-1 MUX. (There are some mathematical transformations of the above instruction sequence to reduce the data dependency chain to logarithmic time as well. Such transformations could be implemented in hardware, but they are beyond the scope of this document. One such mechanism is described in [13].) Also, in this case, since the program has no parallelism, we would do just as well to use a 4-stage RISC pipeline of the sort found in late 1980's RISC processor.

Since our goal is to do well on programs that have parallelism, let us define the critical-path length, c, of an instruction sequence to be the maximum number of ALUs traversed through any path through the datapath, as set up by the switches for that instruction sequence. The critical-path length is a fundamental property of the instruction sequence and not an artifact of the details of the datapath.

Consider this instruction sequence which adds together the registers $R_1$ through $R_{16}$, storing the result in $R_1$.

Figure 46:
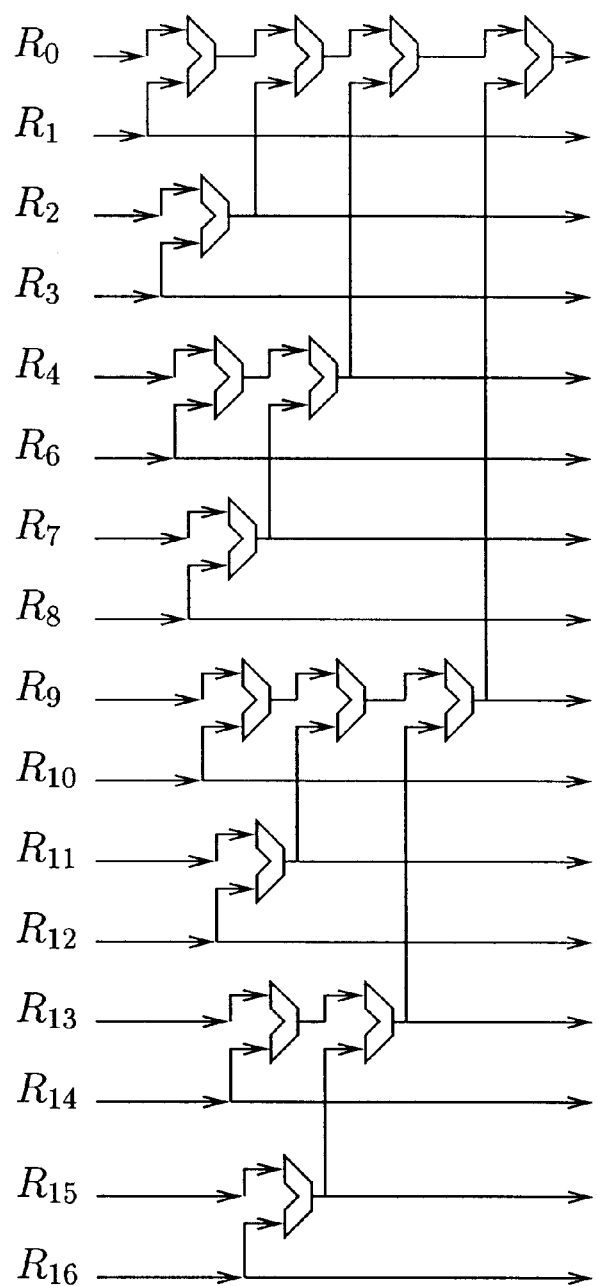
FIG. 46 is a schematic representation of a switching graph.

R1=R1+R2;
R3=R3+R4;
R5=R5+R6;
R7=R7+R8;
R9=R9+R10;
R11=R11+R12;
R13=R13+R14;
R15=R15+R16;
R1=R1+R3;
R5=R5+R7;
R9=R9+R11;
R13=R13+R15;
R1=R1+R5;
R9=R9+Ri3;
R1=R1+R9;

The switching graph for this sequence is shown in FIG. 46. Here there are 15 instructions, and the critical-path length is 4. If we do everything right, we should be able to exploit an average parallelism of 15/4=3.75 for this instruction sequence.

Using our linear-time circuit, we have that the time to execute an instruction sequence with critical-path length c is $$\tau = I \tau_{2\text{-}to\text{-}1\ mux} + c \cdot (\tau_{L\text{-}to\text{-}1\ mux} + \tau_{ALU}),$$

since a signal must travel through I 2-1-MUXes and through c ALU's and c L-to-one MUXes. Our goal in the next section will be to achieve circuit delay of $$(\lg I) \tau_{2\text{-}to\text{-}1\ mux} + c (\tau_{L\text{-}to\text{-}1\ mux} + \tau_{ALU}).$$

Thus, the challenge is to route the data through switches with only logarithmic delay from the switching (where the constant is small, so that the total delay fits into one short clock period) with the result that the performance of the program is limited only by the data dependencies, not by the switching time.

4.3.3 A Log-Time Datapath

Figure 47:
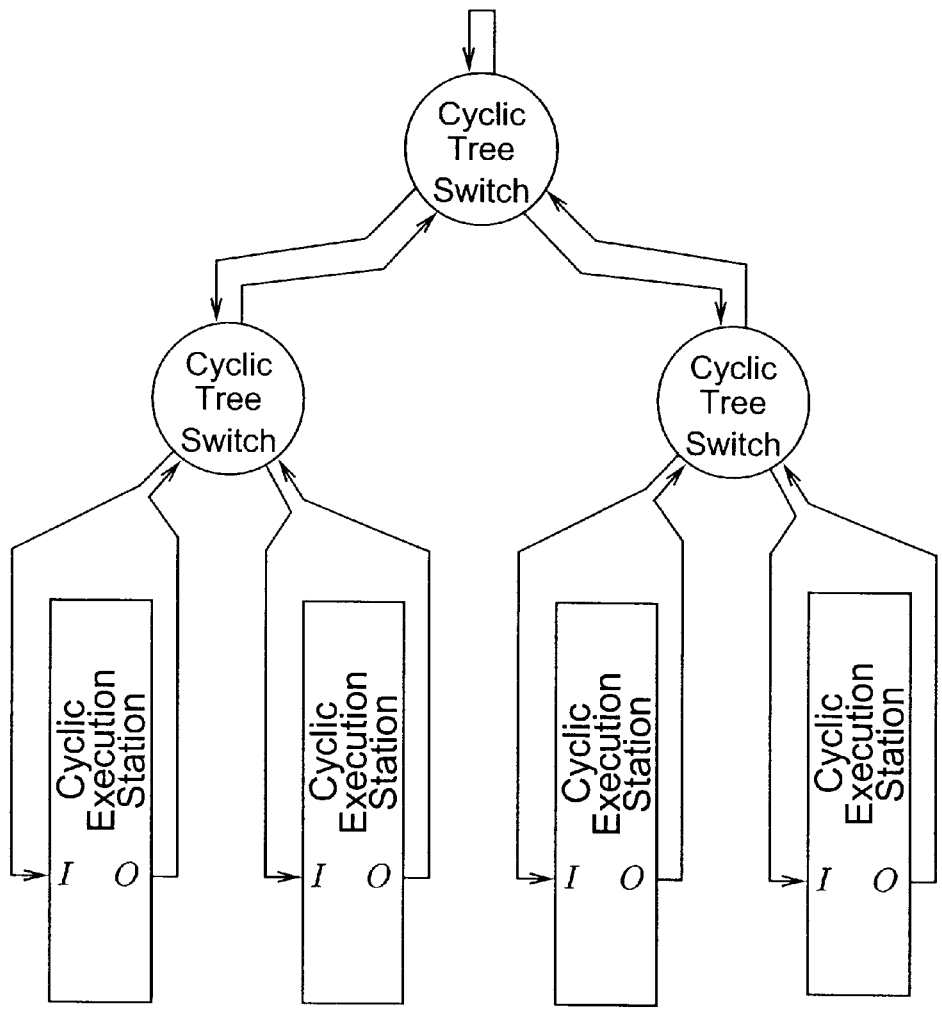
FIG. 47 is a schematic representation of a log-depth cyclic datapath.
Figure 48:
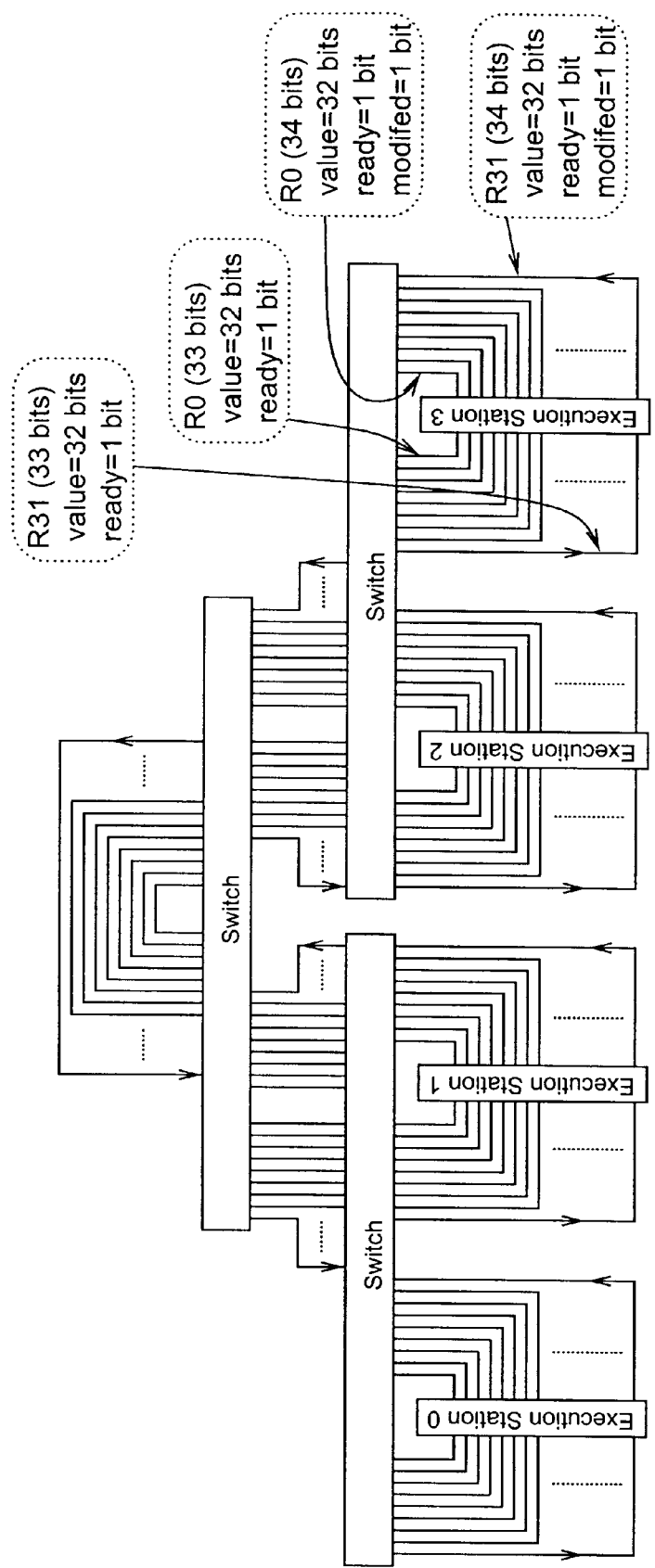
FIG. 48 is a schematic representation of a log-depth cyclic datapath.

Having shown how to execute instructions in linear-time we now show how to execute instruction sequences faster, with independent instruction sequences running in time logarithmic in the number of execution stations. The challenge is to propagate the data from left to right without each datum having to traverse through a linear number I of switches. The Ultrascalar datapath replaces the linear-time ring network of FIG. 42 with a faster logarithmic-depth network performing the same function. FIG. 47 shows an overview of the Ultrascalar datapath. It comprises CSPP circuits with execution stations at the leaves. FIG. 48 illustrates the same circuit with more detail shown on the wires. The logarithmic-depth network forms a bidirectional tree that routes the values of all L logical registers among the execution stations. The execution stations are the same as for the linear-time datapath, except that they produce an additional one-bit "modified" output for each logical register. This "modified" bit will be explained shortly. As before, instructions are assigned to execution stations in a wrap-around sequence.

Figure 49:
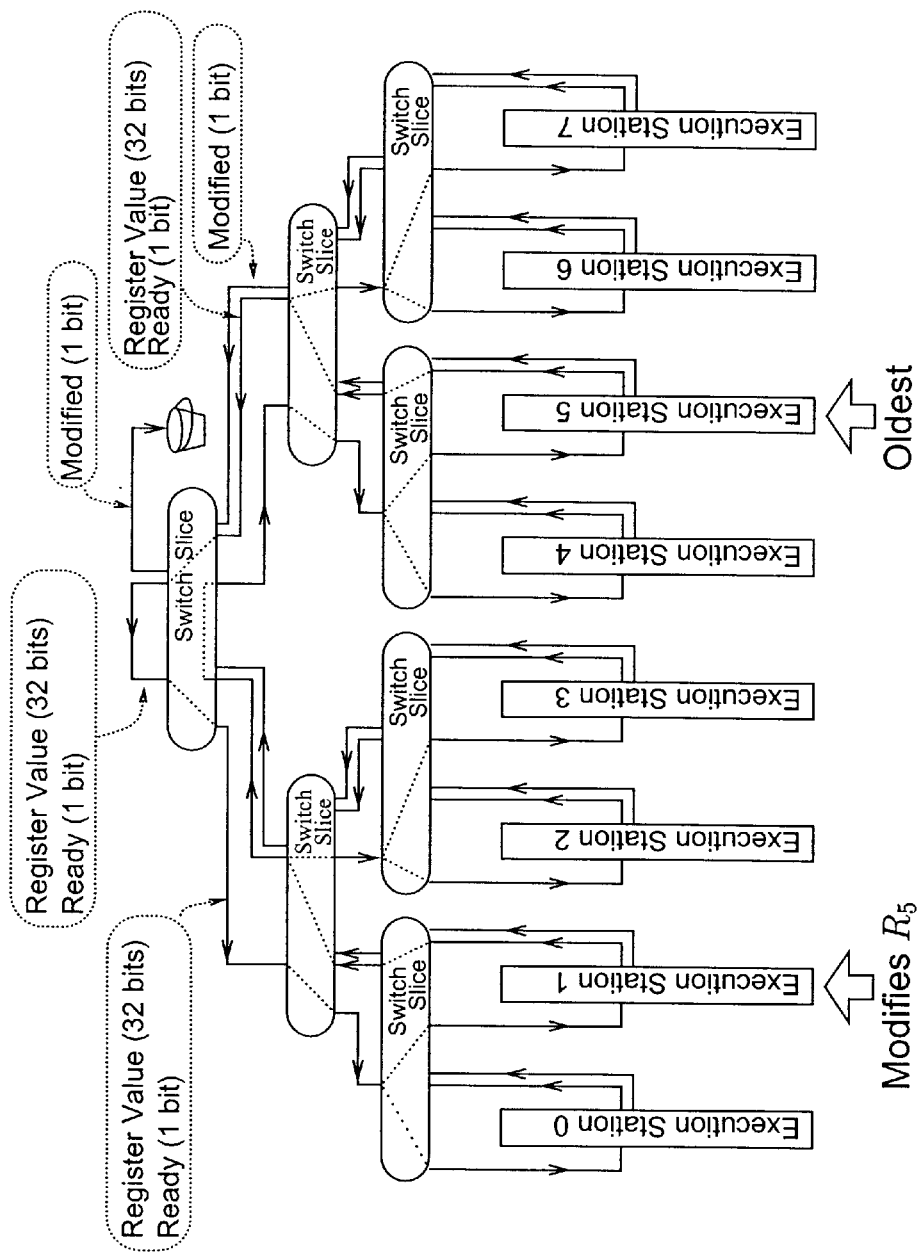
FIG. 49 is a schematic representation of one slice of the logarithmic-depth network.

Since the routing of each of the L registers is independent, it is often easier to consider a single slice of the network, responsible for the routing of one register. Thus the network in FIG. 48 can be broken into L network slices such as the one in FIG. 49. To make the example more interesting, we have increased the number of execution stations in FIG. 49 to eight. Each slice routes the values of one register, say $R_5$, among the eight execution stations. The slice hands each execution station the value of $R_5$ and its ready bit. The execution station hands back to the slice a potentially new value of $R_5$, its ready bit, and an additional "modified" bit telling the slice whether the station modifies $R_5$. The additional modified bit tells the network how to route register values efficiently. For example, if Execution Station 5 holds the oldest instruction and Execution Station 1 modifies $R_5$ then the values of $R_5$ will be routed as indicated in FIG. 49. The value of $R_5$ held by Station 5 appears at the inputs of Stations 6, 7, 0, and 1. The value of $R_5$ produced by Station 1 appears at the inputs of Stations 2–5. Notice that Station 5 which is holding the oldest instruction also set its modified bit to 1, telling the network that it has in effect modified $R_1$. Thus, one slice propagates the value of one register, say $R_5$, from producer instructions to consumer instructions.

Figure 50:
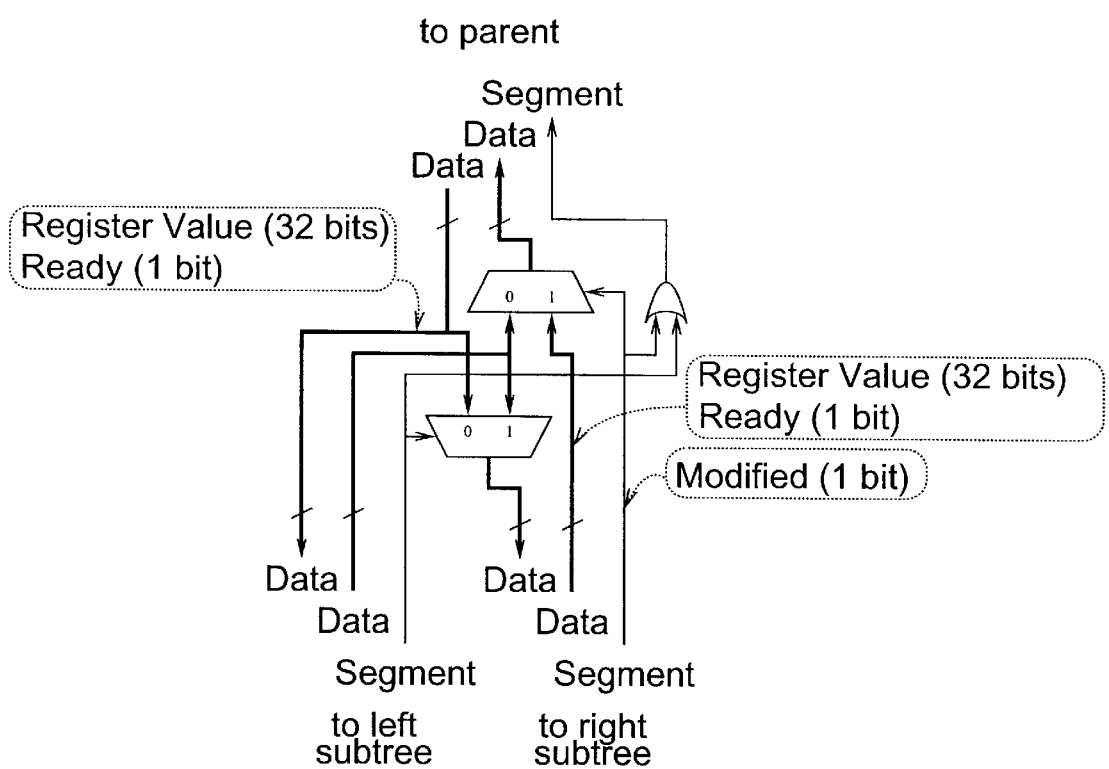
FIG. 50 is a schematic representation of the circuitry inside each switch slice.

FIG. 50 shows the circuit within each switch slice of FIG. 49. The thick lines carry 33 bits (32 for register value and 1 to indicate that the register is ready.) The thin lines carry the "modified" bit up the tree. Note that the critical path through each slice of the network consists of (2 lg n–1) multiplexers, where n is the number of execution stations (assuming that a multiplexer is slower than an OR gate).

The Ultrascalar datapath shown in FIG. 49 routes all available register values to all instructions in O (log n) gate delays, at the end of each clock cycle. Specifically, it takes (2 lg n–1) multiplexer delays to route a register value all the way up and down the prefix tree, where n is the number of execution stations. For example, if the number of outstanding instructions is 32, comparable to today's superscalars, than it takes at most 9 multiplexer delays to route data. Some of this delay can be masked further since the select lines to the multiplexers are available earlier than the values.

Log-Time without Flip Flops

Figure 51:
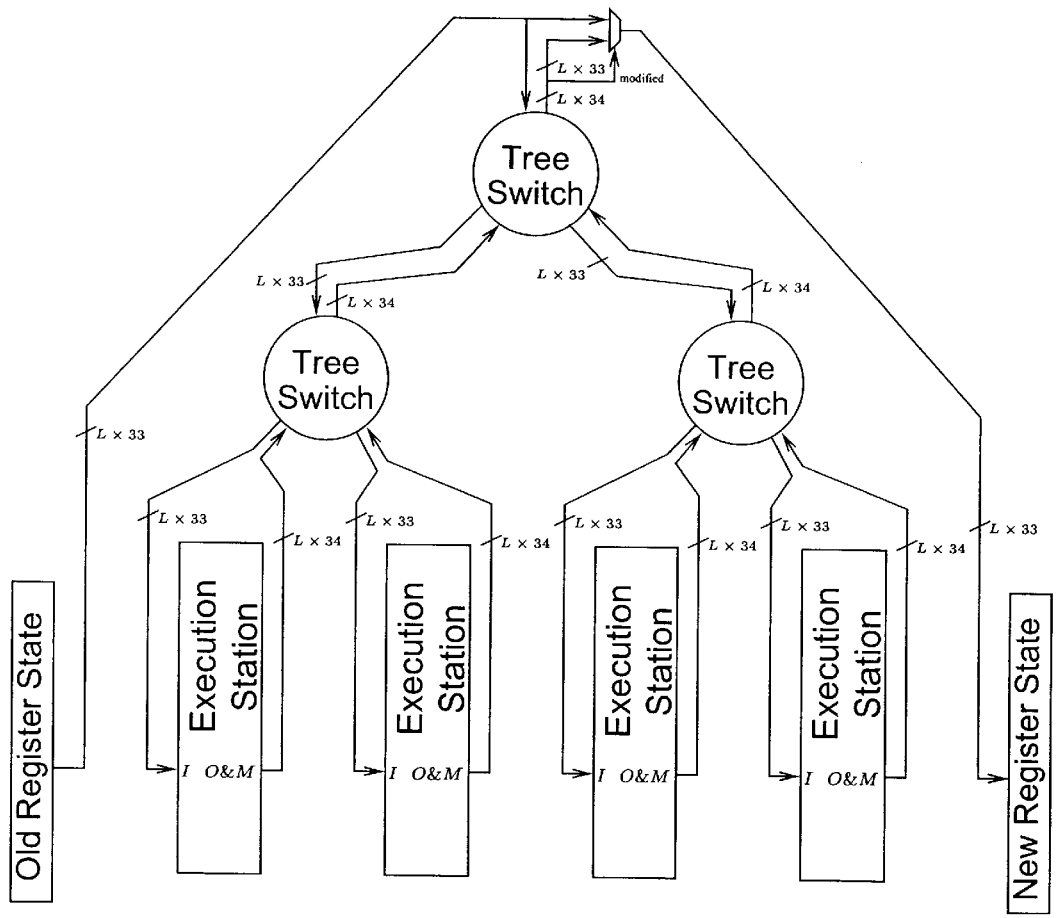
FIG. 51 is a schematic representation of the flip-flop-free datapath converted to an acyclic tree.

In Section 4.3.2 we showed a linear-time datapath without flip flops. The corresponding log-time datapath is shown in FIG. 51. The register state and the execution stations are almost the same as they were for FIG. 44. We have added a parallel prefix tree above the executions stations. The data running down the tree are the L×33 datapath values. The data running up the tree are L×34 bit values, which consist of the datapath values, their ready bits, plus their "modification bits" (described in the next paragraph.) We shall discuss the MUX at the top of the tree after explaining the rest of the circuit.

Figure 52:
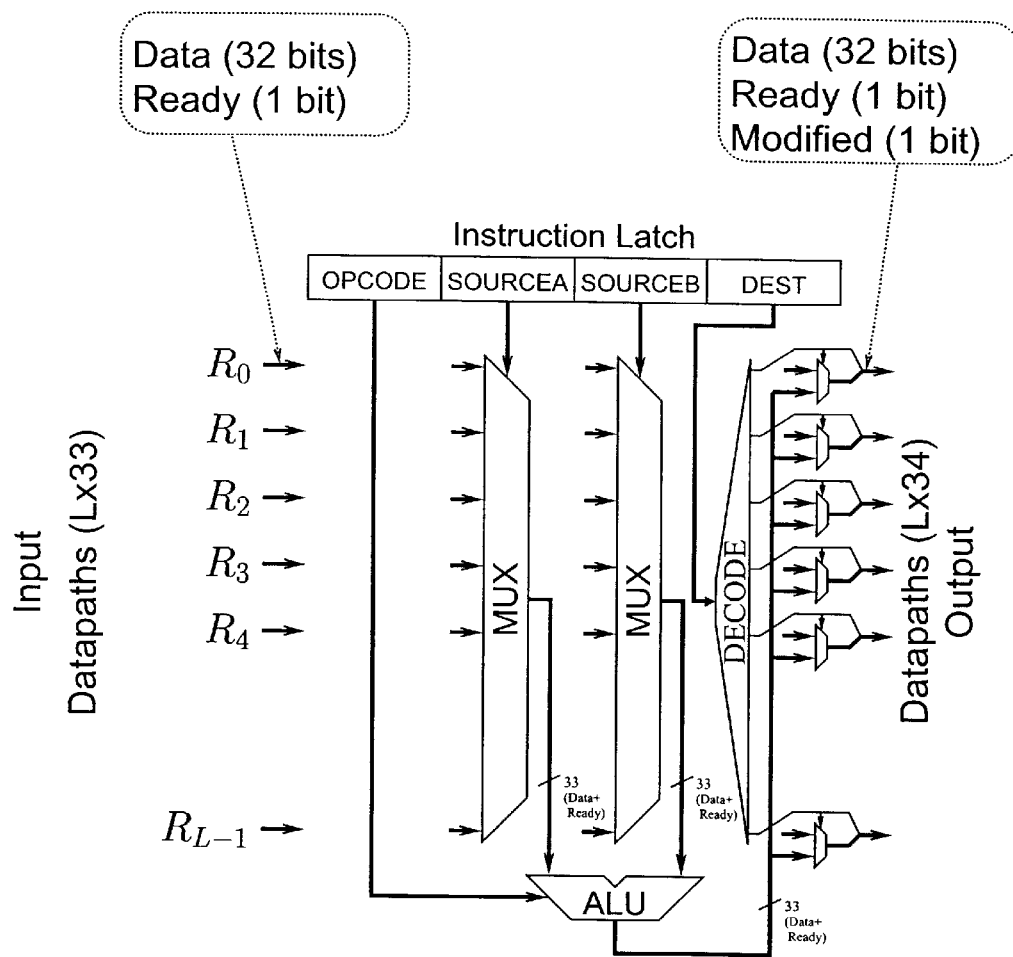
FIG. 52 is a schematic representation of the execution station for an acyclic tree datapath.

The interface to each execution station has two signals. The input datapath signal, labeled I, is the same as in FIG. 45. The output signal, labeled O&M, consists of the output datapath (as in FIG. 45) and an additional bit, called the Modified bit. We have made one change to the execution station of FIG. 44. It now outputs the Modified bits in addition to the registers and the Ready bits. FIG. 52 shows the modified execution station. The modification bits are L bits of information that say which registers have been modified by an instruction. This is simply the output of the decode tree (that is, the destination register represented as a unary number.) The modification bits will be used as segment bits in a segmented parallel-prefix.

As before, we shall need to propagate information about which registers have been modified up the tree in order to short-circuit the long switching delays. The idea is that if a whole subtree contains instructions that do not modify a particular register, then we can route the data around that subtree, avoiding all of its internal switches.

As before, each treefix module in FIG. 51 is divided into slices, one per datapath. That is the ith slice of the tree-switch handles the ith 33-bit datapath (data and ready) and its associated modification bit. There are L slices of a treefix module, one to handle each of the L datapath signals.

At the root of the tree we do something special. It would be correct to simply take the value coming out from the topmost switch in the tree and feed that to the new register state. We can save a little time, however, by using a MUX at the root to choose between the old register state and the out-coming value depending on whether the register was modified by any instruction. This MUX only saves a small amount of time, and is not necessary to achieve log I gate delays. Without the MUX, the old register state will be propagated through the tree to the first execution station, which will then send it up the tree, and since nothing modified these registers, the MUXes up the tree will always select the left value, hence producing a gate delay of log I for any datapath which is not modified by any instruction.

Figure 53:
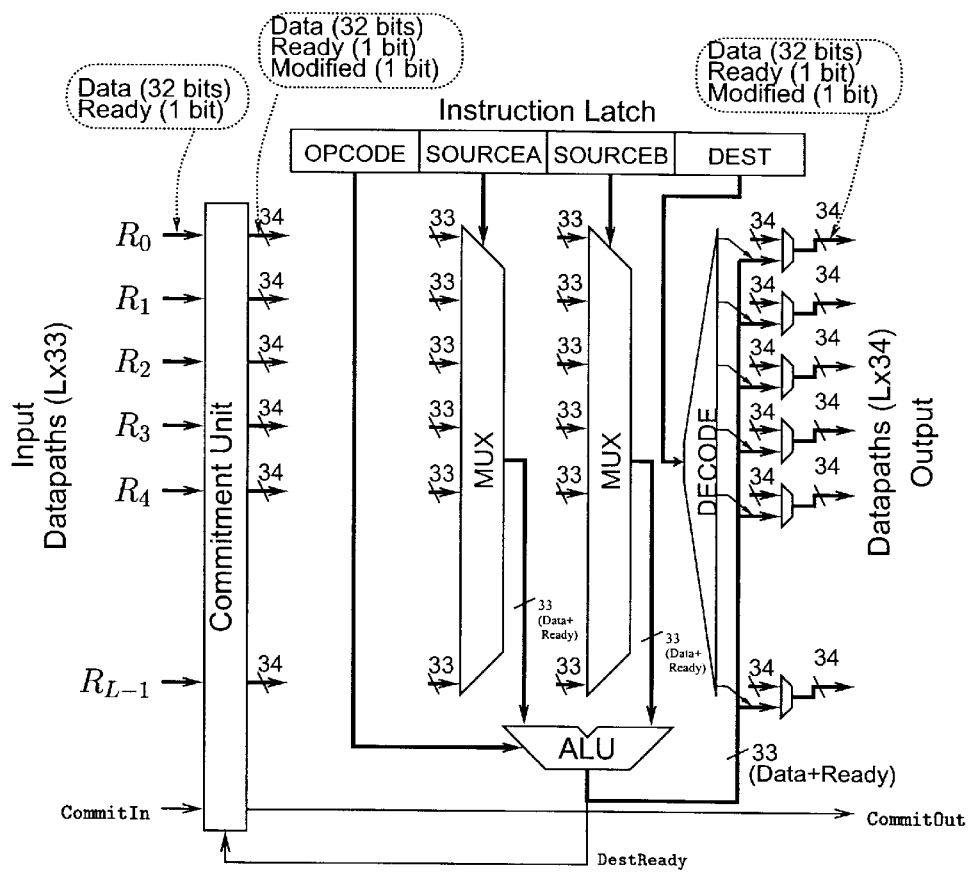
FIG. 53 is a schematic representation of the cyclic execution station.

We can make this system use a CSPP circuit with very little extra work. In this case, we must put the registers back into the execution station, and bypass them unless they are the oldest. The execution station that does this is shown in FIG. 53. The reason we moved the registers into the execution stations is that the cyclic path does not have fixed Old Register State or a New Register State. Thus, the execution stages must be responsible for maintaining register state.

FIG. 53 shows the execution station needed for our cyclic design. Note that we have bundled the modification bits in with the 32-bit data and 1-bit ready bit, and we have added a new 1-bit input called CommitIn and a new 1-bit output called CommitOut and we have added a block called the commitment unit. The commitment unit is responsible for breaking the cycle of the cyclic chain so that at any given time there is one execution station that does not depend on its left neighbor. The commitment unit also uses the "ready" bit from the ALU, which we shall refer to as the DestReady bit. Thus, we have a per-slice segmentation bit which is the "modified" bit, and we have a single segmentation bit used to compute the oldest active execution station.

Note that the L-to-1 MUXes only want 33 bits of the $R_i$ values (the data and ready signals). The DestReady signal is the ready bit out of the ALU. The 2-to-one MUXes on the right-hand edge are switching 34-bit values (the upper 34-bit-value comes from the commitment unit, and the lower 34-bit value is assembled from the 33-bits from the ALU and the one-bit from the destination decoder.)

Figure 54:
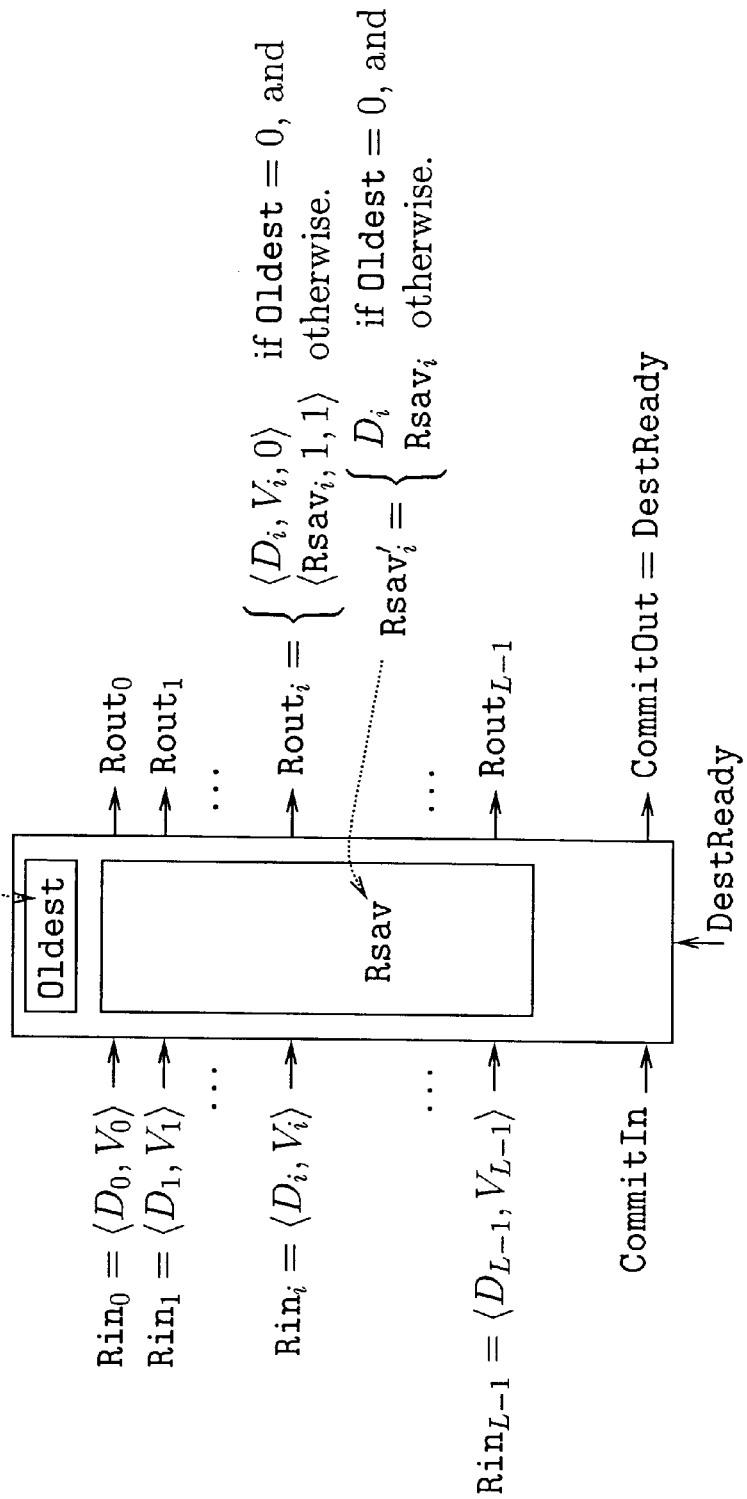
FIG. 54 is a schematic representation of the commitment unit.

To explain the function of the commit bit, we must show how the commitment unit works. The commitment unit, shown in FIG. 54, takes L 33-bit values named $Rin_0, \ldots, Rin_{L-1}$ (each 33-bit value is 32-bits of data and the ready bit), and it takes two bits called CommitIn and DestReady. It produces L 34-bit values named $Rout_0, \ldots, Rout_{L-1}$ and a bit called CommitOut. Each of the 34-bit values (the $Rin_i$'s and $Rout_i$'s) consists of a three-tuple: a 32-bit data value (named $D_i$), a i-bit "ready" value (named $V_i$) and a 1-bit "modified" value (named $M_i$). We also have a 1-bit latch called Oldest, and a collection of L 32-bit latches named Rsav, where $Rsav_i$ is meant to save register i, when this execution station becomes the oldest. The formulae for computing the various values are shown in FIG. 54. The idea is that the CommitOut bit indicates that this execution station is ready to commit (assuming that all previous ones will commit without requiring this one to change.) CommitIn bit indicates that all older execution stations want to commit (for the oldest execution station, the CommitIn bit indicates that all the execution stations are ready to commit.) A conjunction CSPP is used to compute CommitIn, where $x_i$=CommitOut $s_i$=Oldest CommitIn=$y_i$ Our convention for the formula for a latch is as follows: If we have a latch named A then A'=f(A) means that the new value of the latch will be f(A) where the current value of the latch is A. Each "R" input and output consists of a triple (D, V, M) where D is the 32-bit data, V is the ready bit, and M is the modified bit.

Thus, the Oldest bit is true for the execution station that is working on the oldest instruction in the instruction sequence. That execution station's commitment unit provides all the modification bits set to 1, and all the ready bits set to 1, and stores the image of the registers as they would appear just before executing that instruction.

Thus, we have shown a circuit that meets the logarithmic-time switching goal of Equation (1).

Alternative Clocking Methodologies

This scheme will work with many different clocking methodologies. The system above described the latches in the commitment unit using an edge-triggered scheme in order to provide a concrete description of how to implement it. Other clocking schemes can work too. This family of circuits is suitable for self-timed circuitry and other advanced clocking methodologies. Even with globally synchronous clocking, good use can be made of level-sensitive latches with gated clocks instead of D-type flip-flops to allow data to propagate forward through the uncommitted execution stations as fast as possible. One approach is to use level-sensitive latches in which the clock to the Rsav latches is replaced with a simple gated signal. Suppose that we use level-sensitive latches that pass values through when their clock input is low, and latch the value when their clock input is high. If we wire the Oldest signal to control the latches, the right thing will happen. The engineer will need to take care to avoid introducing clocking hazards: The clock signals generally should not be allowed to glitch. Another fruitful approach would be to use a self-timed system, since we already have timing information (the ready bits).

Additional Advantages

There are some power-consumption advantages that can be realized by a tree-structured circuit. The parallel prefix circuit that routes register-values around does not need to send the register values to any subtree that does not actually need the data. Thus the power consumption can be dramatically reduced. In contrast, today's content-associative memory (CAM) designs use power $\Omega$ (I*W) where I is the issue rate and W is the window size. Our design would use power I on average, with peak power determined by how many instructions actually read a particular instruction. The power used to route a particular value around is proportional to how many readers need that value.

To implement this power saving feature, each subtree would also need to compute the set of registers read by instructions in that subtree. Each execution station knows the set of registers it reads, and can provide the bit vector indicating those registers. When constructing a tree out of two subtrees, suppose $U_L$ is the bit indicating that a particular register is read by the left subtree, $M_L$ indicates that the register is modified by the left subtree, $U_R$ indicates that the register is read by the right subtree, and $M_R$ indicates that the register is modified by the right subtree. Then whether the register is read by the composite tree is indicated by $U=U_L \vee (U_R \wedge \neg M_L)$.

If $U_L$ is false, then we need not enable the transistors that send that register to the left subtree (and similarly for the right subtree.)

Memory Operations

For simplicity, we have avoided showing any memory operations (loads or stores) in the example of FIG. 42. Although we will present a more optimized data memory subsystem in Section 4.3.4, it is important to point out that the Ultrascalar datapath can use the same memory subsystem as any superscalar processor. From the viewpoint of the memory, the executions stations are indistinguishable from a traditional instruction window.

An execution station cannot read or write the data cache until its memory dependencies have been met. For example, if there are several load instructions between two store instructions, then the loads can run in parallel. But the loads must often wait for at least some previous store operations to complete to get the right data. Note that if we speculate on the data then the loads need not necessarily wait for the previous stores. Below, we discuss branch speculation, which has similar issues to data speculation. We first present the design for a conservative strategy, which is to wait for all previous store instructions to complete, then we show how to relax this constraint to exploit more parallelism. For the conservative design, we follow our exposition of the datapath: we first show a linear-delay design for the serializing design, and then convert the design to parallel prefix with log-delay. All the solutions described in Section 4.2.5 for a traditional superscalar processor can also be used in the Ultrascalar.

Figure 35:
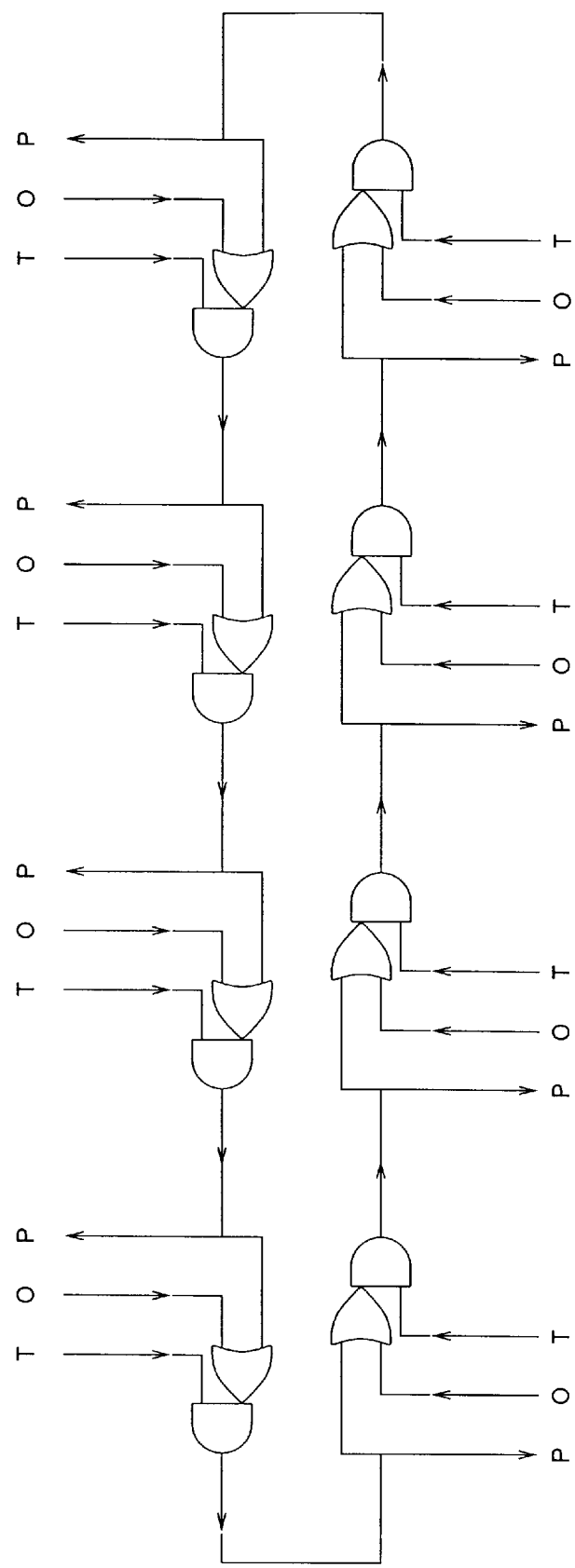
FIG. 35 is a schematic representation of a circuit for computing when all previous stores are completed.
Figure 36:
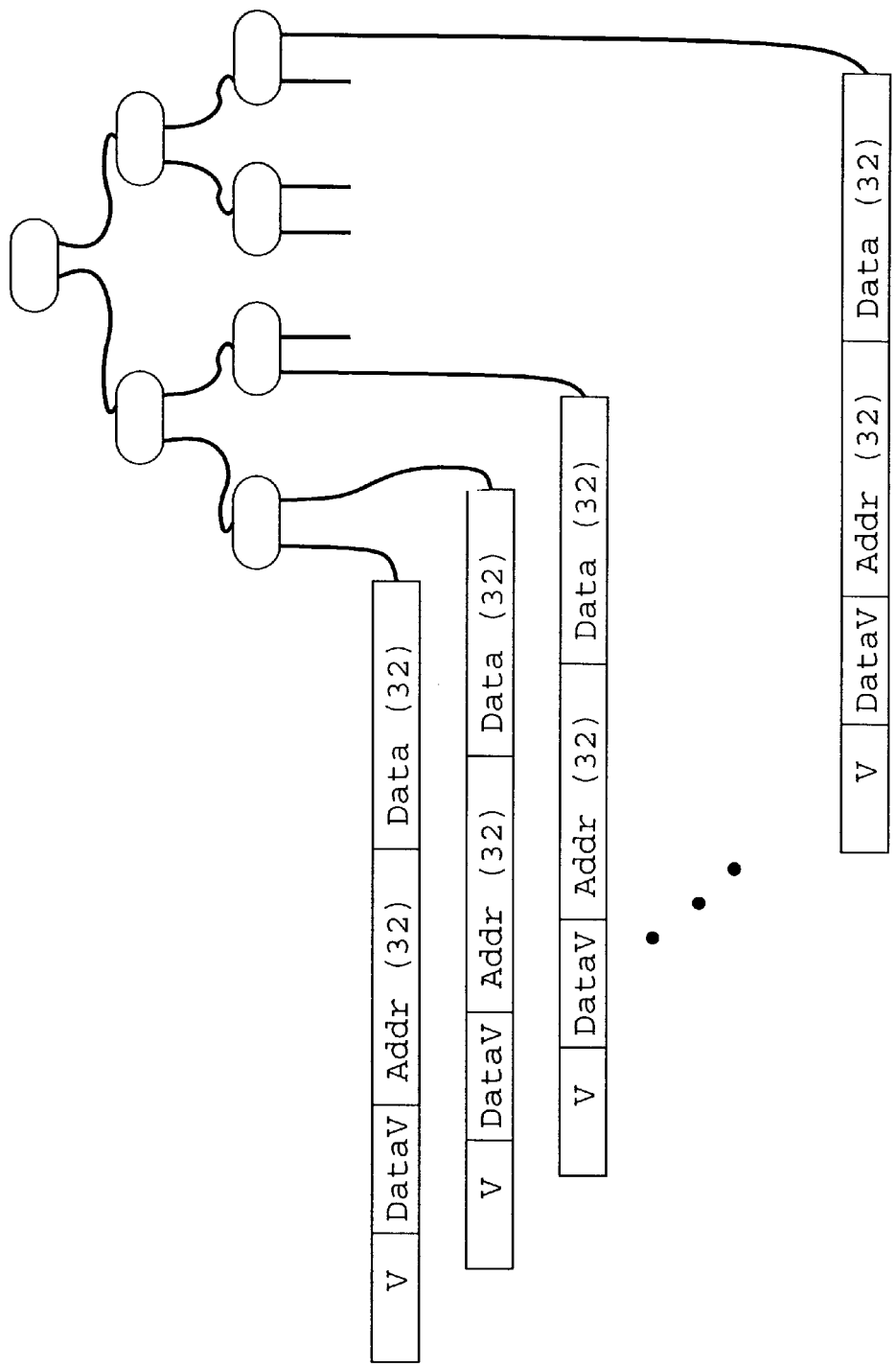
FIG. 36 is a schematic representation of a datapath for memory renaming.

FIG. 35 shows a linear-time circuit that computes when all previous stores have completed. Each execution station provides a signal O which indicates that the station is the oldest unfinished instruction and a signal T which is true if the station's instruction is not a store, or if it is a completed store (i.e., it is not an uncompleted store). Each station receives a signal P indicating that all previous writes have completed. Note that at all times there must be an execution station providing O=1, to break the cycle in the priority chain.

FIG. 17 shows a log-delay circuit that computes when all previous stores have completed. Again, we are using a cyclic segmented parallel-prefix circuit. The associative prefix operator in this case is a⊗b=a∧b.

Now that we have shown how to serialize memory operations without paying very much for computing when the serialization constraint has been satisified. Here we show how to avoid serializing on the completion of memory operations. We observe that in order for a memory operation to execute, it is enough to know that no previous incomplete store is using the same address. Thus, as soon as all previous store memory addresses have resolved, we can determine whether a particular write may proceed. To do this we let the memory network tell each execution station when its memory operation may proceed.

For the network to compute the memory dependencies, each execution station provides an address and an indication of whether its instruction is a load, a store, or neither. (If the execution station does not yet know, then it should be treated as a store.) The network then informs every execution station when all previous stores that use the same memory address are complete. This works by sending the memory addresses up the network. The memory addresses are kept sorted as they go up the network. At each switch, the two sorted sublists are merged together to a big sorted sublist. If there are any duplicates, then the right child is informed of the duplicate (thus inhibiting the right child from running) using a path that is established during the merging. The duplicates are removed. If a switch higher in the tree notices a conflict, and if there were duplicate users of that address, then both must be notified of the conflict.

Thus, we have seen how the Ultrascalar datapath can be implemented with wraparound using a CSPP circuit, or without wraparound using a SPP (acyclic segmented parallel prefix) circuit.

Control Flow

A traditional fetch unit can be used to feed instructions to the Ultrascalar datapath. The fetch unit has a write port into every execution station and writes serially predicted instruction blocks into successive execution stations. The fetch unit stops writing when it reaches the oldest execution station.

Which execution station is the oldest can change on every clock cycle, as instructions finish. We can compute which executions station is the oldest, again using the parallel-prefix circuit of FIG. 17: In this instance of the circuit, the 0 bit is the old "oldest" bit (just as for the store completion tree), the T bit indicates that this particular execution station has completed its processing, and the P bit indicates that all previous execution stations have completed. An execution station knows it is the oldest in the next cycle, if it has not finished its own instruction and its incoming P bit is true.

It is very simple to implement speculative execution in the Ultrascalar datapath. When an execution station discovers that its branch instruction has mispredicted, it notifies the fetch unit. The fetch unit starts sending to that unit again, along the right program path. Since each execution station holds the entire register state of the computation, nothing needs to be done to roll back the computation except cause later executions stations execute the correct instructions. Speculation can also be performed on memory operations (speculating that a later load does not depend on an earlier store) or data values using similar mechanisms.

The Ultrascalar datapath described so far exploits exactly the same instruction-level parallel parallelism as one of today's superscalar processors. The Ultrascalar datapath implements renaming, register forwarding, speculation, and dependency checking without requiring multiported register files or other circuits with superlinear critical-path length. Surprising, parallel-prefix trees can perform all the work done by traditional superscalar circuits, with only a logarithmic number of gate delays. Thus, the datapath scales, providing at least as much ILP as today's superscalar processors.

4.3.4 Scaling the Memory System

The previous section described a processor core that scales well with increasing numbers of outstanding instructions. In order to exploit ILP, the memory bandwidth too must scale, however. In particular, the processor must be able to issue more loads and stores per clock cycle (i.e. sustain a higher data bandwidth) and the fetch unit must supply more instructions along a correctly predicted program path per clock cycle (i.e. sustain a higher effective instruction bandwidth.) Fortunately, much active research is going on in these areas and the Ultrascalar can benefit from its results. In this section, we review some of the recent work on improving memory bandwidth and suggest additional promising approaches.

Of the two bandwidths, data bandwidth is perhaps less troublesome. To accomodate more loads and stores per clock cycle without scaling up the number of data cache read and write ports, we can resort to the well known mechanism of interleaving. This is the mechanism that we are currently implementing in our layout. FIG. 34 illustrates the Ultrascalar's interleaved data memory subsystem. The memory subsystem consists of an on-chip level-one cache and an on-chip butterfly network connecting the cache to the execution stations. Much like the main memory in traditional supercomputers [39], the cache is interleaved among a number of banks. In this example, the number of cache banks is the same as the number of execution stations. The nth cache bank holds every nth cache line.

To illustrate, let us assume that the number of banks and execution stations is sixteen, that the cache is direct mapped with block size of one word and total size of 1 MB, and that the instruction set architecture uses 32-bit byte addresses. A memory access to address A will then be routed to bank A[5-2]. Bank A[5-2] will lookup entry A[19-6] and compare its tag against address bits A[31-20]. Should the comparison fail, the level-one cache will access off-chip memory.

The cache banks are connected to the execution stations via a butterfly network and to off-chip memory directly. The butterfly network allows n load and store requests to proceed in parallel if they form a rotation or other conflict-free routing. For example, a vector fetch loop will run without any conflicts if the address increment equals the cache block size. But in general, multiple memory accesses may compete for the same bank, or they may suffer from contention in the butterfly, thus lowering the memory bandwidth, We believe that the same programming, compiler, and hardware techniques used to alleviate bank conflicts in an interleaved main memory will apply to an interleaved data cache.

Another promising approach to increasing data memory bandwidth is to duplicate the data cache. We could allocate a copy of the cache to different subtrees of the Ultrascalar datapath or, in the extreme, to every execution station. Duplicate caches introduce the problem of maintaining coherence between the caches. These problems can be solved by, for example, using scalable symmetric multi-processor (SMP) cache-coherence protocols.

Increasing the effective fetch bandwidth poses perhaps a greater problem. To fetch at a rate of much more than one basic block, the fetch unit must correctly predict and supply instructions from several non-consecutive blocks in memory. The mechanisms found in the literature fall into two categories. They either precompute a series of predictions and fetch from multiple blocks or they dynamically precompute instruction traces. In the first category, branch address caches [46] produce several basic block addresses, which are fetched through a highly interleaved cache. In the second category, trace caches [38] allow parallel execution of code across several predicted branches by storing the instructions across several branches in one cache line.

We propose a parallelized trace cache for the Ultrascalar processor. The on-chip parallelized trace cache is interleaved word by word across cache banks and connected to the execution station by a butterfly network just like the data cache's. (In fact, we can use the same network and memory modules as we used earlier for the data network.) The nth cache bank holds the nth word of every trace. An instruction within a trace is accessed by specifying the PC of the first instruction in the trace, the offset within the trace, and some recent branch history information.

The execution stations start fetching from a new trace whenever the old trace ends or a branch within the trace mispredicts. Since each execution station fetches its own instruction from the trace cache, it must know the starting PC of the trace and its instruction's offset within that trace. To propagate the starting PC of the trace, we use a cyclic segmented parallel-prefix circuit with associative operator $a \tilde{\times} b = a$. To compute the offset into the trace, we use a cyclic segmented parallel-prefix circuit with associative operator $a \tilde{\times} b = a + b$. The addition inside the parallel-prefix nodes is performed by carry-save adders in order to keep the total gate delay down to O(log n). The execution stations holding the oldest instruction or the beginning address of a trace raise their segment bits and supply their trace offset. All other execution stations supply the constant 1.

In addition to its trace address, an execution station may also need to know the PC of its instruction. This is the case when an execution station detects a mispredicted branch and must generate the initial PC of a new trace. We can store the PC of every instruction within a trace and hand the PC to the execution station together with the instruction. Alternately, we can compute the PC of every execution station's instruction using another parallel prefix tree, just as we did for the trace offset. The only difference is the input to the tree. An execution station executing a relative branch that is predicted taken will send in the offset and a false segment bit. An execution station executing an absolute branch will send in the target address, once known, and a true segment bit.

Traces can be written into the instruction cache by the memory or the execution stations. If the instruction cache misses, then the trace can be created serially by fetching a predicted path from an instri.iction cache, much like in today's superscalars. The execution stations can also generate traces, however. Every time a trace fails to run to completion, a new trace is written into the instruction cache starting with the mispredicted branch. Each execution station writes its instruction into the trace, once its instruction commits. The starting PC of the new trace and the instruction's offset within the trace are computed by yet another prefix tree. This provides a small amount of parallelism for creating trace entries in the cache.

The trace caches in the literature, as well as ours, suffer from several problems. Both branch address caches and trace caches refill serially. We do not know how quickly our parallel trace cache refills in practice. Another concern is the amount of redundant data stored in the cache. Trace caches can keep exponentially many copies of particular instructions in the worst case. We described in Section 4.2.1 a "pointer-jumping trace cache" that can quickly compute a trace while storing each instruction only a logarithmic number of times in the worst case.

Note that all the tricks for improving instruction and data memory access in other processors work for the Ultrascalar processor.

4.3.5 Speculation in the Ultrascalar

Our processor can easily perform speculative execution. Each execution unit can make its best guess about information it needs but does not yet have.

Branch Speculation

For branch speculation, the execution station can speculate on whether a branch is taken, and if it is taken, it may need to speculate on the target address of the branch.

One strategy would be to assume, if nothing else is known, that an instruction is not a branch (or that it is an untaken branch) and to go ahead and compute the program-counters, and fetch the instruction, then set up the datapath circuit, and hope that everything works out. The first execution station that guesses wrong will cause all the subsequent stations to be wrong too. In this situation, the execution stations monitor the program-counter input, and if it changes, that indicates that some previous station has changed its idea, in which case the execution station starts over. When the commit bit finally arrives at the execution station, it needs not worry about previous instructions any more, and the execution station can commit its final values when ready. With speculation, an execution station may need to refill several times before committing, but "rolling back and retrying" is very easy with this datapath.

Which execution station is the oldest can change on every clock cycle, as instructions finish. We can compute which executions station is the oldest, again using the parallel-prefix circuit of FIG. 17: In this instance of the circuit, the O bit is the old "oldest" bit Oust as for the store completion tree), the T bit indicates that this particular execution station has completed its processing, and the bit indicates that all previous execution stations have completed. An execution station knows it is the oldest in the next cycle, if it has not finished its own instruction and its incoming P bit is true.

It is very simple to implement speculative execution in the Ultrascalar datapath. When an execution station discovers that its branch instruction has mispredicted, it notifies the fetch unit. The fetch unit starts sending to that unit again, along the right program path. Since each execution station holds the entire register state of the computation, nothing needs to be done to roll back the computation except cause later executions stations execute the correct instructions. Speculation can also be performed on memory operations (speculating that a later load does not depend on an earlier store) or data values using similar mechanisms.

Data Speculation

It is possible to employ even more speculation. For example, several recent researchers have reported that data speculation schemes often produces the right value. (For example, the value produced by an instruction when it executes is a good predictor of the value that will be produced by that instruction the next time it executes.) The reason this works is that a branch speculation may cause a particular instruction, X, to execute and then produce a value. Later it turns out that the branch speculation was incorrect, and then Instruction X must be executed again. Often Instruction X produces the same value, however. (We have read on Newsgroup comp arch that as many as 30% of all instructions can be predicted for the Intel x86 architecture. Intel calls this value speculation Instruction Reuse. Other studies have been published as well. Processors that employ predicated instructions may gain less advantage from data speculation since the compiler has a chance to make explicit the independence between the branch and the subsequent instruction. Machines with predicated instructions include the HP PA-RISC, the Advanced Risc Machines ARM, and the proposed Intel 1A64 architecture.)

For the Ultrascalar processor there are two issues to address to employ data speculation in the arithmetic datapath:

How to communicate a speculation quickly to the correct execution station.

What the execution station should do with the speculation.

The speculation data must be communicated to the right execution station. This is because it will typically be a different execution station that is assigned to reexecute an instruction. One way to communicate this information is to put the speculative result in the instruction cache. Thus, after executing an instruction, each execution station is responsible for writing its results to the instruction cache. When fetching an instruction, the execution station also gets some information about speculation.

Another strategy would be to use a table that is passed through the parallel prefix table, just like for the memory renaming problem described in Section 4.2.5.

Once the speculation data has been given to the execution unit, the execution unit must use that data appropriately. The main issue on is how to verify that the speculation was correct. Once the execution stations have made their guesses, we want to be able to quickly compute whether those guesses are all correct so that we can commit the youngest possible instruction as soon as possible. To do this, each execution station places its guess on its output signals and the parallel-prefix circuit informs each execution station of its respective inputs. Then the execututìon stations check to see if the outputs are correct. Next we use the commitment unit logic to find the youngest execution station whose predecessors are all either committed or speculated correctly.

4.3.6 Layout

We have so far concentrated on gate delays to understand the performance of the Ultrascalar. To accurately model critical-path delay we must not only consider the number of traversed gates, but also the length of traversed wires. The overall chip area is another important complexity measure as well. The critical-path delay and the area depend on a particular layout. In this section we show the Ultrascalar processor's layout using H-tree layouts for the datapath and for a fat-tree network that accesses an interleaved memory system. We compute the area and the lengths of the longest wires from that layout.

Figure 55:
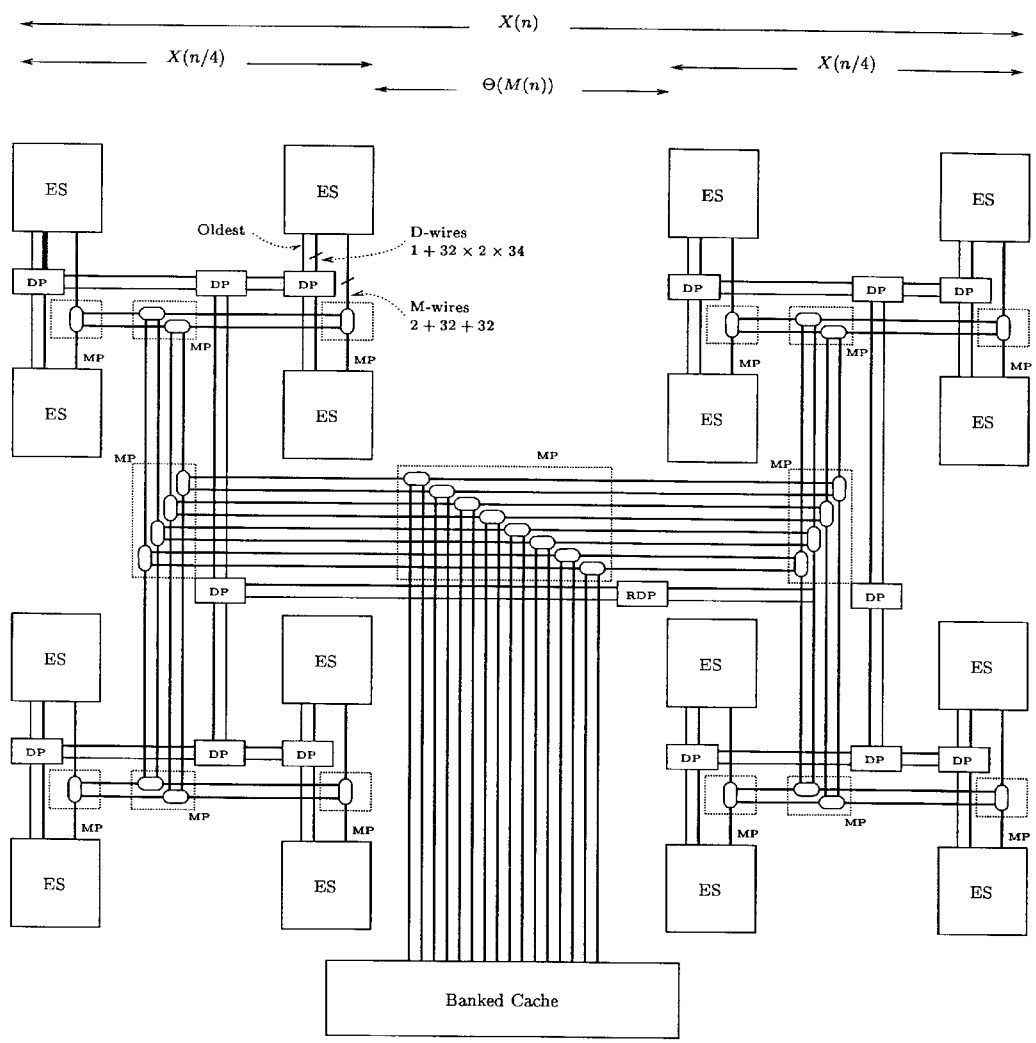
FIG. 55 is a schematic representation of the overall layout of the ultrascalar.

To lay out the Ultrascalar, we observe that all of the Ultrascalar interconnections consist entirely of cyclic segmented parallel prefixes connecting together the execution stations, plus fat-tree networks connecting the execution stations to memory. Both parallel-prefix circuits and fat-tree networks can be layed out using an H-tree layout. FIG. 55 shows the floorplan of an Ultrascalar processor consisting of sixteen execution stations ES connected to interleaved on-chip caches via fully-fattened fat-trees (which are isomorphic to butterfly networks.) The nodes of the prefix trees are marked with DP. The stages of the butterfly are marked with MP (with the nodes of the butterfly inside the MP box.) Whereas the number of wires between any two DP nodes is constant, the number of nodes between two MP stages doubles at each level of the tree. The layout is called an H-tree layout because it consists of recursive H-shaped structures. Note that the four quadrants of the layout forms the tips of the letter "H", with the switches forming the intersections of the horizontal and vertical lines of the "H" and the internode connections forming the lines of the "H". Recursively, the four quadrants form another H-tree. (See [45, Section 3.1 ] for an introduction to layout of H-trees. See [24] for the layout of butterflies and fat-trees.)

Figure 56:
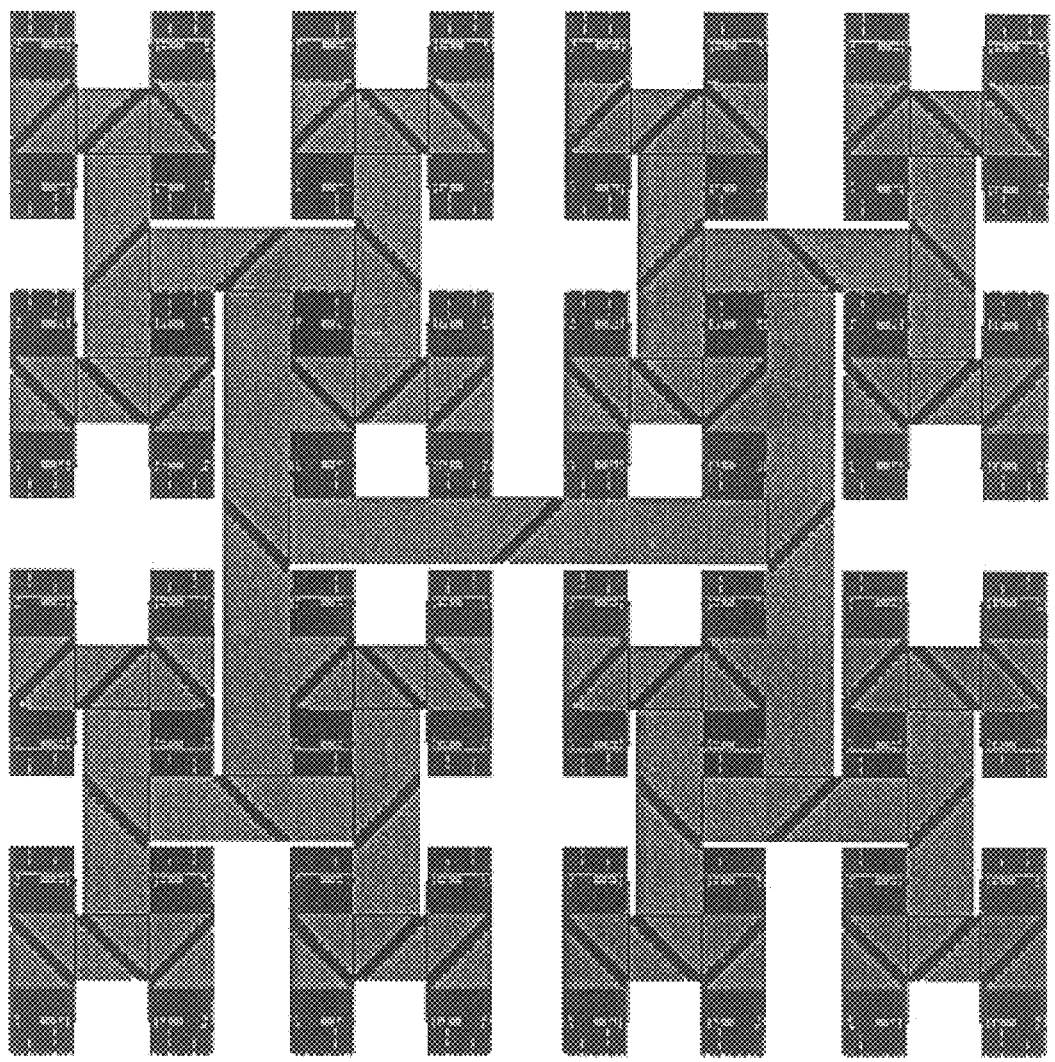
FIG. 56 is a schematic representation of a VLSI layout.

To demonstrate the scaling properties of the Ultrascalar, we are currently designing the processor in VLSI using the Magic design tool [31]. We have a complete processor core corresponding to the DP and ES modules in FIG. 55. Our processor core executes a simple RISC instruction set architecture without floating point instructions. FIG. 56 shows the plot of the second and third metal layers of a 64-station processor core. To speed up our design time, we designed the datapath using CMOS standard cells. As can be seen, the VLSI layout is very regular, with the advantange that it only took about three man-months for an engineer, who had never built a VLSI circuit before, to implement the VLSI layout. We did not worry about the optimal size of our gates or the thickness of our wires since these factors, once optimized, will remain constant for any size implementation. Because of the regularity of the Ultrascalar datapath, the design has so far taken less than four man months to implement including the time to learn the tools.

FIG. 55 shows the overall logic and VLSI floor plan for the Ultrascalar microprocessor with memory bandwidth linear in the window size, and a a simple serializing memory dependency checker. This version provides 0(I) memory bandwidth through the MP modules.

FIG. 56 shows a plot of the VLSI layout of a 64-station Ultrascalar datapath corresponding to the DP and ES modules in FIG. 55. This version has enough bandwidth to support one memory operation per clock cycle.

Area

The datapath's area is determined by the layout, as shown in FIG. 55. We can compute the area of the circuit by observing that it is a recursive structure. To determine the area, we first determine the size of the bounding box for an n-wide Ultrascalar. As can be seen at the top of FIG. 55, the width X(n) of an n-wide Ultrascalar is equal to twice the width of an n/4-wide Ultrascalar plus the width of the wires. If we we provide bandwidth M(n) memory operations per clock cycle to a subtree of size it then there are $\Theta(M(n))$ wires. (The wires for the datapath and other bookkeeping are only O(1).) Thus we have the following recurrence:

$$X(n) = \begin{cases} \Theta(M(n)) + 2X(n/4) & \text{if } n > 1, \\ O(1) & \text{otherwise.} \end{cases}$$

This recurrence has solution $$X(n) = \begin{cases} \Theta(n^{1/2}) & \text{if } M(n) \text{ is } O(n^{1/2-\epsilon}) \text{ for } \epsilon > 0, & \text{[Case 1 (optimal)]} \\ \Theta(n^{1/2}\log n) & \text{if } M(n) \text{ is } \Theta(n^{1/2}), \text{ and} & \text{[Case 2 (near optimal)]} \\ \Theta(M(n)) & \text{if } M(n) \text{ is } \Omega(n^{1/2+\epsilon}) \text{ for } \epsilon > 0. & \text{[Case 3 (optimal)]} \end{cases}$$

(We assume for Case 3 that M meets a certain "regularity" requirement, namely that M (n/4)<M (n)/2 for all sufficiently large n. See [5] for techniques to solve these recurrence relations and for a full discussion of the requirements on M.)

Thus, the area is $$A(n) = (X(n))^2 = \begin{cases} \Theta(n) & \text{for Case 1,} \\ \Theta(n \log^2 n) & \text{for Case 2, and} \\ \Theta((M(n))^2) & \text{for Case 3.} \end{cases}$$

These bounds are optimal for a two-dimensional VLSI technology. In Case 1 the issue width is n, so the chip must hold at least n instructions, and thus the area must be $\Omega(n)$. In Case 2 the area must be $\Omega(n)$ and we have added at worst a $\log^2 n$ blowup. (For Case 2 the bounds are nearly optimal. We will ignore Case 2's slight suboptimality for the rest of this paper.) In Case 3, the memory bandwidth requires that the edge of the chip be at least $\Omega(M(n))$ in order to get the memory bits in and out, giving an area of $\Omega((M(n))^2)$. For a three-dimensional technology, there are analogous layouts with optimal bounds.

Wire Length

Given the size of the bounding box for an n-wide Ultrascalar, we can compute the longest wire length as follows. We observe that the total length of the wires from the root to an execution station is independent of which execution station we consider. Let L(n) be the wire length from the root to the leaves of an n-wide Ultrascalar. The wire length is the sum of the distance from the edge of the Ultrascalar to its internal switch (distance X(n/4)), plus the distance through the switch (the switch is $\Theta(M(n))$ on a side), plus the distance from the root of an n/2-wide Ultrascalar to its leaves (distance L(n/2)).

Thus we have the following recurrence for L(n):

$$L(n) = \begin{cases} X(n/4) + \Theta(M(n)) + L(n/2) & \text{if } n > 1, \\ O(1) & \text{otherwise.} \end{cases}$$

In all three cases, this recurrence has solution $L(n) = \Theta(X(n))$.

That is, the wire lengths are the same as the side lengths of the chip to within a constant factor. We observe that every datapath signal goes up the tree, and then down (it does not go up, then down, then up, then down, for example.) Thus, the longest datapath signal is 2L(n). The memory signals only go up the tree so the longest memory signal is L(n). The same optimality arguments that applied to area above apply to wire length here. (We assume for the optimality argument that any processor must have a path from one end of the processor to the other.)

Note that the switch above a subtree of n execution stations has area at least $O(M(n)^2)$ and so has plenty of area to implement all the switching and computation performed by the network. (For example, a merging network on n values can be embedded in area $\Theta(n^2)$ [43] with gate delay $\Theta(\log n)$ [5]. Such a sorting network can perform the hard work of the memory disambiguation of Section 4.2.5 with an overall gate delay of $\Theta(\log^2 n)$.)

The wire length depends primarily on how much memory bandwidth is needed. If we can reduce the required memory bandwidth, e.g. by using a cache in every execution station running a distributed coherency protocol, then we can reduce the area and the wire length of the processor. A brute-force design would provide memory bandwidth of $\Theta(n)$ for every n instructions, but it is reasonable to think that the required memory bandwidth for a sequence of n instructions may only be $O(n^{1/2})$, reducing the wire lengths from $\Theta(n)$ to $\Theta(n^{1/2} \log n)$. This asymptotic reduction in VLSI chip area underscores the importance of effective caching.

Critical Path Delay

Having analyzed the Ultrascalar's layout, it is now easy to see how its critical-path delays grow with the number of execution stations. (The number of execution stations is the same as the issue width, the fetch width, and the instruction window size of the Ultrascalar processor we have shown so far.) This is because the delay along any path in our implementation is simply linear in the number of gates plus the length of wires along that path. To achieve this linearity, we limit the fan-in and fan-out of each gate and insert repeater gates at constant intervals along wires. Since we stick exclusively to gates with a small, constant fan-in (the number of input wires) and fan-out (the number of output wires), each gate in our design drives a constant number of gate capacitances with a constant gate resistance. By breaking long wires into constant size segments connected by repeater gates, we make the capacitance and resistance of each wire segment also constant. Wire delays, including repeater delays, effectively become some constant fraction of the speed of light. Since the delay of each VLSI component is proportional to its resistance times its capacitance and since the resistances and capacitances of our gates and wire segments do not change with the size of our designs, the total delay along any path grows linearly with the number of gates and wire segments (i.e. wire length) traversed along that path. Specifically, the Ultrascalar's critical path delays due to gates grow logarithmically with the number of execution stations and its critical path delays due to wires grow at most linearly with the number of execution stations, giving $\tau_u = O(\log n + L(n))$, which is optimal.

4.3.7 Practical Performance Issues

Although the Ultrascalar has excellent scaling properties, several further optimizations make the Ultrascalar even more attractive, especially for smaller systems. We have presented a simple microarchitecture that is easy to analyze. We have shown that the microarchitecture scales well, but we have not optimized our microarchitecture for practical window sizes or issue widths. The microarchitecture passes the entire register file to every instruction, which is not strictly needed. In this section, we analyze the performance implications of this extra work and outline microarchitectures that avoid the extra work while still maintaining the Ultrascalar's scaling properties.

This table lists area and critical path wire delays for different size Ultrascalars. We computed these data by scaling our layout to a 0.35 micron technology. We assumed a signal velocity of 1 7.5 mm/ns achieved with optimal repeater placement as described in in [6]. (Our wire delay estimates are pessimistic by a small constant factor because the Ultrascalar datapath is laid out in the metal-3 and metal-2 layers, whereas the delay calculations in [6] are for the metal-I layer.) Note also that [26] also describes the insertion of repeaters.

| Number of Execution Stations | Area | Critical-Path Wire Delay |
| --- | --- | --- |
| 64 | 10.5 cm × 7.6 cm | 12.4 ns |
| 32 | 8.1 cm × 4.9 cm | 8.9 ns |
| 16 | 4.2 cm × 3.8 cm | 5.8 ns |
| 4 | 1.6 cm × 1.4 cm | 1.9 ns |

Shown are the area and critical path wire delays for different size Ultrascalars in a 0.35 micron technology. (This layout provides for 1 memory operation per clock cycle.) In TI's proposed 0.07 micron technology [42] the wire lengths and delays would presumably be reduced by about a factor of 5.

The Ultrascalar's wire delays and area stem mostly from its wide datapath. Although a typical RISC instruction only reads two registers and writes one, the Ultrascalar passes the entire register file to and from every instruction. Passing the entire register file does not compromise the Ultrascalar's scaling properties since a register file contains a constant number of registers, but it does introduce large constants hiding in the Θ.

One way to reduce the constants is by combining the best properties of the superscalar processor with the Ultrascalar. Although, so far, we have described each execution station as holding a single instruction, there is no reason why an execution station cannot hold and execute a sequence of instructions instead. The sequence of instructions within an execution station can be executed using, for example, a traditional superscalar processor core. Since, for small enough window size, a superscalar processor has smaller critical path delay and smaller area than an Ultrascalar processor, placing superscalar processor cores at the leaves of the Ultrascalar datapath can shorten the overall critical path delay and reduce area. At the same time, the Ultrascalar datapath can provide time- and area-efficient routing among the many superscalar cores.

The hybrid microarchitecture just described bears resemblance to clustering [8, 32, 10]. Clustering avoids some of the circuit delays associated with large superscalar instruction windows by assigning ALUs and outstanding instructions to one of several smaller clusters with a smaller window. Instructions that execute in the same cluster can communicate quickly, but when dependent instructions execute in different clusters, an extra clock delay is introduced to resolve the dependency. The reported schemes are limited to two clusters. Decoded and renamed instructions are assigned to one of the two clusters using simple heuristics. It is not clear how well these heuristics will scale to large numbers of clusters. In addition, other slow components of the superscalar processor, such as the renaming logic, are not addressed by clustering. Like clustering, our hybrid microarchitecture also separates outstanding instructions into clusters. The heuristic used to assign instructions to clusters is their proximity within the dynamic instruction sequence. Thus, instructions that are near each other in the serial execution order are likely to be in the same superscalar core or the same subtree. Instructions that are far from each other communicate via the Ultrascalar's logarithmic depth network. The Ultrascalar placement heuristic is probably not as good as the clustering heuristic when there are two clusters or two execution stations. It is not clear how to build larger clusters, however, whereas the hybrid Ultrascalar does scale up.

The second enhancement that can reduce the Ultrascalar's wide datapath is tagging. Fundamentally, there is no reason why the Ultrascalar needs to pass the entire register file to and from every execution station. Much like the counterflow pipeline [41], the Ultrascalar datapath can pass each execution station only two arguments tagged with their register numbers and accept one result tagged with its register number. The Ultrascalar datapath can merge these incremental register file updates as they propagate through the tree. The resulting tree can be laid out as a tree that fattens as it ascends towards the root for the lower 1g L levels of the tree, where L is the number of logical registers.

An additional way to mitigate the wire delays introduced by the Ultrascalar's wide datapath, is through the design's timing discipline. For example, we can improve the average-case routing delay by pipelining the datapath network of FIG. 49. We can separate every subtree containing k execution stations from the rest of the datapath network by registers. The instructions within a subtree can then route in the same clock cycle in which they compute. Instructions in two separate subtrees communicate using an additional clock cycle. Since in a tree, most connections are local, the slowdown may not be very great in the typical case. (Note that the CM-5 control network uses a pipelined parallel-prefix tree [21].) The Ultrascalar also appears lends itself well to an asynchronous self-timed logic methodology.

Aside from the Ultrascalar's wide datapath, another issue of practical concern is the relatively large number of ALUs. The Ultrascalar assigns an ALU to every instruction. We believe that the large number of ALUs will not be a problem in the future, because in a billion-transistor chip, a full ALU will probably require only about 0.1% of the chip area. (Our standard-cell ALU uses only about 13,000 transistors, but it includes no floating point support.) Even if ALUs become a serious bottleneck, the ALUs can be shared. A cyclic segmented parallel-prefix tree can schedule an ALU among m execution stations with only Θ(log m) gate delays, and with relatively small area. (Palacharla et al [32] also show how to schedule ALUs with only Θ(log m),gate delays. But their scheduler does not wrap around. It statically assigns the highest priority to the left-most request. It also uses relatively larger area than is required by a parallel prefix tree.)

4.3.8 Optimized Ultrascalar Datapath

This section describes an optimized ultrascalar datapath that reduces the area, and consequently the wire lengths, by reducing the width of the datapath at lower levels of the tree. Fundamentally, there is no reason why the Ultrascalar datapath needs to pass the entire register file to and from every execution station. The optimized ultrascalar datapath passes to each execution station only c, arguments and accepts only $c_2$ results where $c_1$ and $c_2$ are, respectively, the maximum numbers of arguments and results for any instruction in the instruction set. The datapath merges incremental register file updates as they propagate through the tree. The resulting tree forms a fat tree, for the first several levels of the tree.

EXAMPLE

Before describing the optimized datapath in detail, we outline the ideas behind the optimized datapath and show an example. The datapath passes to each execution station only its arguments and accepts only its result. Register results are filtered by two separate filters as they propagate from individual execution stations to the root of the datapath tree. One filter propagates only the most recent committed value of every register and updates the committed register file at the root of the tree. The other filter propagates the most recently modified value of every register and its ready bit partly or all the way up through internal switches of the datapath tree. To read an argument register, an execution station searches for the register's most recently modified value through some of the internal switches on its way to the root of the datapath tree. If it fails to find a modified value within the tree, it reads the register's committed value from the committed register file at the root of the tree.

Figure 57:
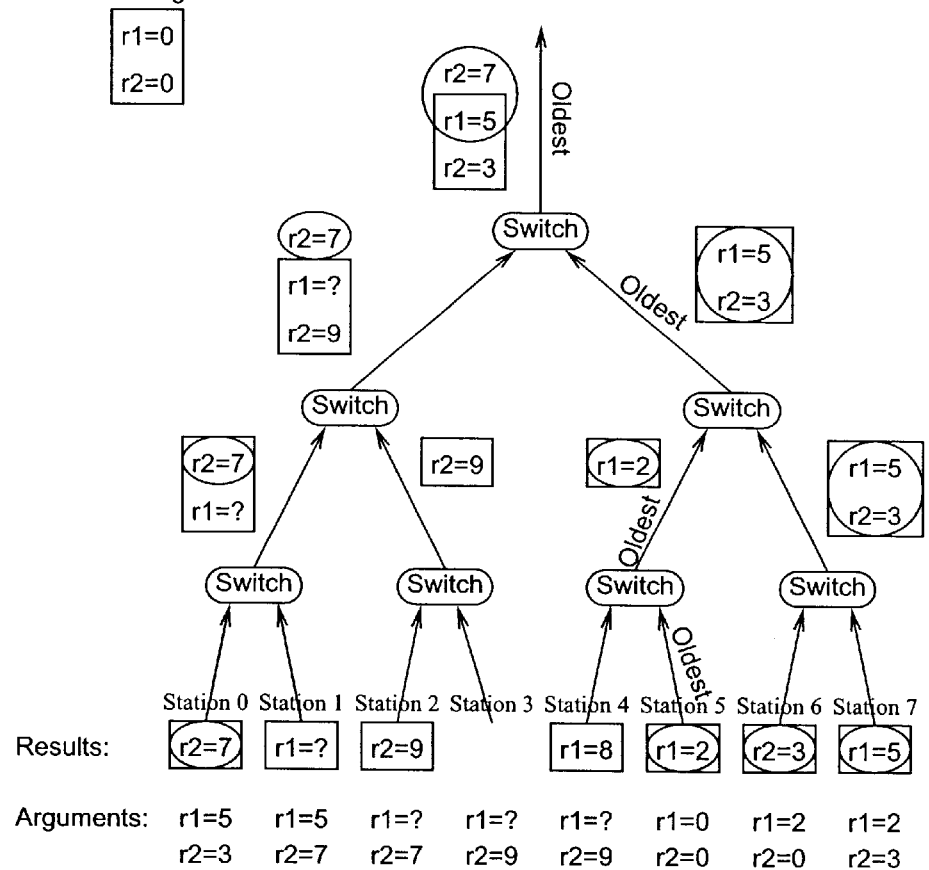
FIG. 57 is a schematic representation of the optimized datapath.

FIG. 57 illustrates the optimized Ultrascalar datapath. The figure shows an optimized datapath connecting eight execution stations. Station 5 holds the oldest instruction. The register results computed by each station are shown. Station 1 has not yet computed its result (that is, its ready bit is low), as indicated by a question mark, and Station 3 does not modify any register. The results of Stations 5, 6, 7, and 0 have been circled to indicate that these results are being committed. Through the datapath tree, we show the register values propagated by the two filters. The first filter propagates the most recent committed value of each register, shown circled, to the root. The second filter propagates the most recent value of each register, shown boxed, partly up the tree.

To find the value of an argument register, an execution station initiates a search through some of the boxed values along its path up the tree. The search terminates when it finds the first match. Typically, a search entering a switch from the right checks the boxed values of its left sibling. A search entering a switch from the left procedes directly up to the next switch. This is how Station 2 finds that its argument R2=7. An exception to the rule occurs once a search joins the oldest station's path from the right. In that case, the search must read from the committed register file. This is how Station 6 finds R2=0 for instance. Should a station's search reach the root of the tree, it may search through the boxed values at the root if the station is left of the oldest station. This is how Station 1 finds R1=5. Any search that still does not succeed reads from the committed register file. This is how Stations 0 through 4 could read R3=0, for example.

Distinguishing Right from Left

We start our description of the optimized datapath logic by describing how values propagating up the datapath tree compute their position with respect to the oldest station. The optimized datapath distinguishes between younger values originating to the left of the oldest station and older values originating at and to the right of the oldest station. To make that distinction, the datapath assigns one of three types to every value propagating up the tree:

Dominant (D): The value is known to have originated to the left of the oldest station.

Recessive (R): The value is known to have originated at or to the right of the oldest station.

Neutral (N): The position of the value's origin relative to the oldest station is not yet known.

Figure 58:
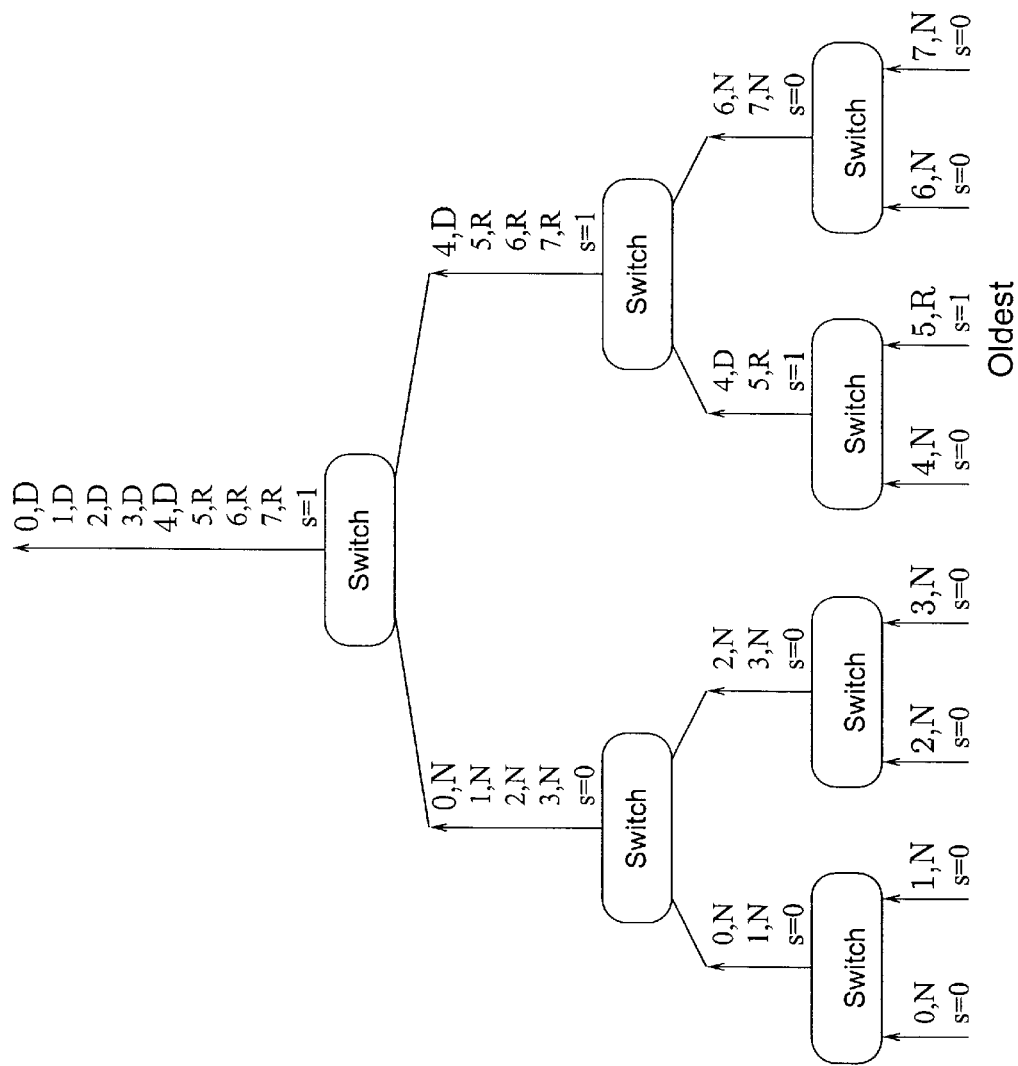
FIG. 58 is a schematic representation of circuitry that computes the types of values propagating up the tree.
Figure 59:
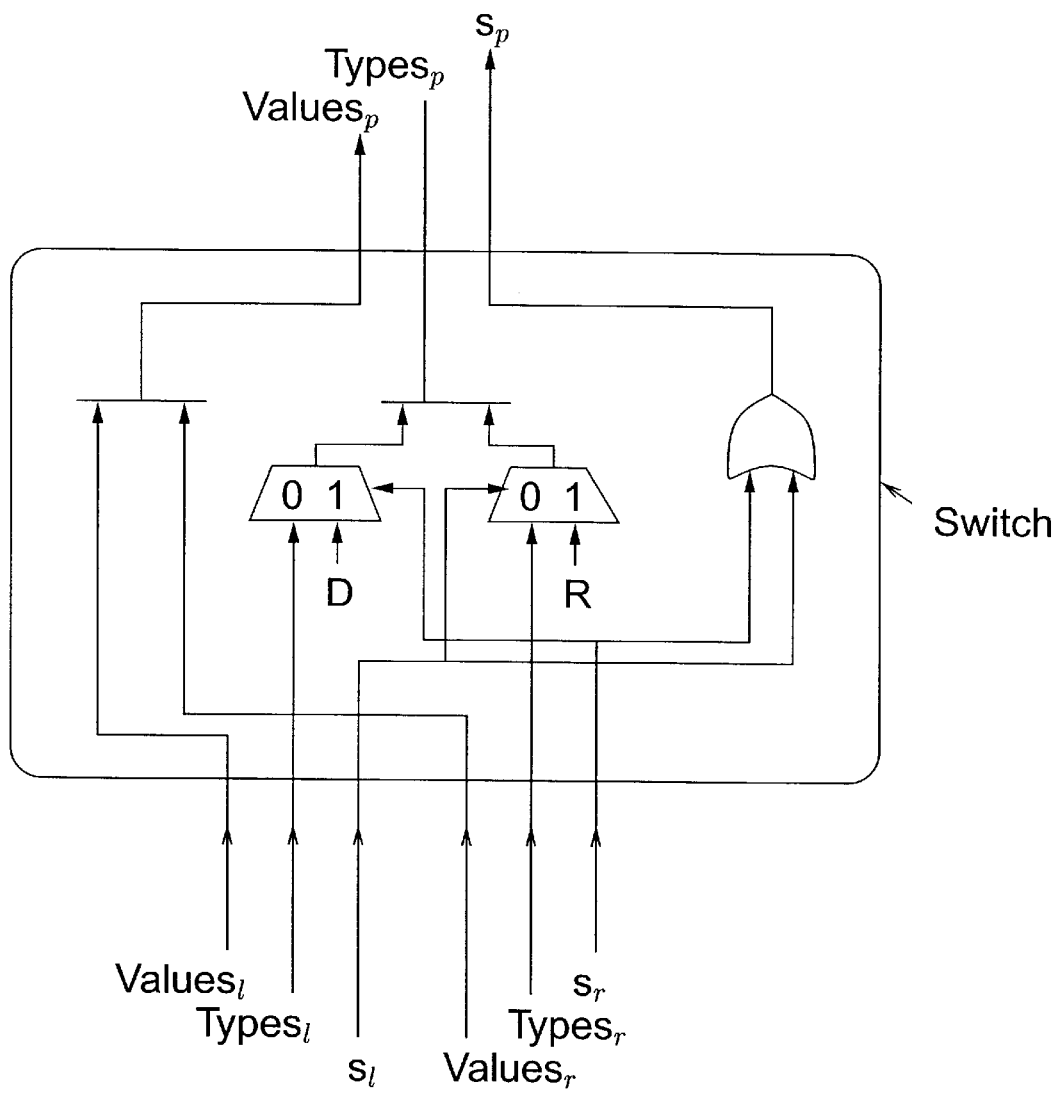
FIG. 59 is a schematic representation of one switch of FIG. 58.

FIG. 58 shows the logic that computes the types of values as they propagate up an 8-station optimized datapath. The values, in this example, are the indexes of the execution stations. That is, Station 0 is sending up the value 0; Station 1 is sending up the value 1 etc. In the optimized datapath which we will describe shortly, the values propagating up the datapath will consist of register bindings and register read requests. To compute the type of every value, the optimized datapath propagates segment bits up the tree, just like the unoptimized datapath did. The oldest station sets its segment bit high, all other stations set their segment bit low. At each node of the tree, the left and right segment bits are or-ed together to produce the parent segment bit. As values propagate up the tree, their types change from N to D or from N to R when they encounter a sibling with a high segment bit. The logic within each switch of the tree is illustrated in FIG. 59. The switch maintains a one-to-one correspondence between values and types. That is, the first value in $Values_p$ has the type specified by the first type in $Types_p$, the second value in $Values_p$ has the type specified by the second type in $Types_p$ etc. (For the rest of Section 4.3.8, all circuits will maintain this one-to-one correspondence between values and types.) All the values at the top of the tree have resolved their origin relative to the oldest station. They have all been typed dominant or recessive.

Computing the Committed Register File

A major difference between the unoptimized and the optimized datapath is that the optimized datapath maintains the committed register file at the root of the datapath tree, instead of at its leaves. Recall that, in the unoptimized datapath, the oldest execution station held onto the state of the logical register file before the current sequence of outstanding instructions has executed. The oldest execution station sent up the Ultrascalar datapath the values for all L logical registers. Since any execution station could become the oldest, every execution station in the unoptimized datapath had to be able to send L values up the tree. In order to limit the number of values sent up to just the result(s), the optimized datapath maintains a committed register file at the root of the tree. On every clock cycle, execution stations that commit inform the optimized datapath of their committed result(s). The optimized datapath propagates the most recent committed result for each register to the root of the datapath tree and updates the committed register file. (The commit logic described in Section 4.2.10 informs each execution station on every clock cycle whether its instruction has committed.)

Figure 60:
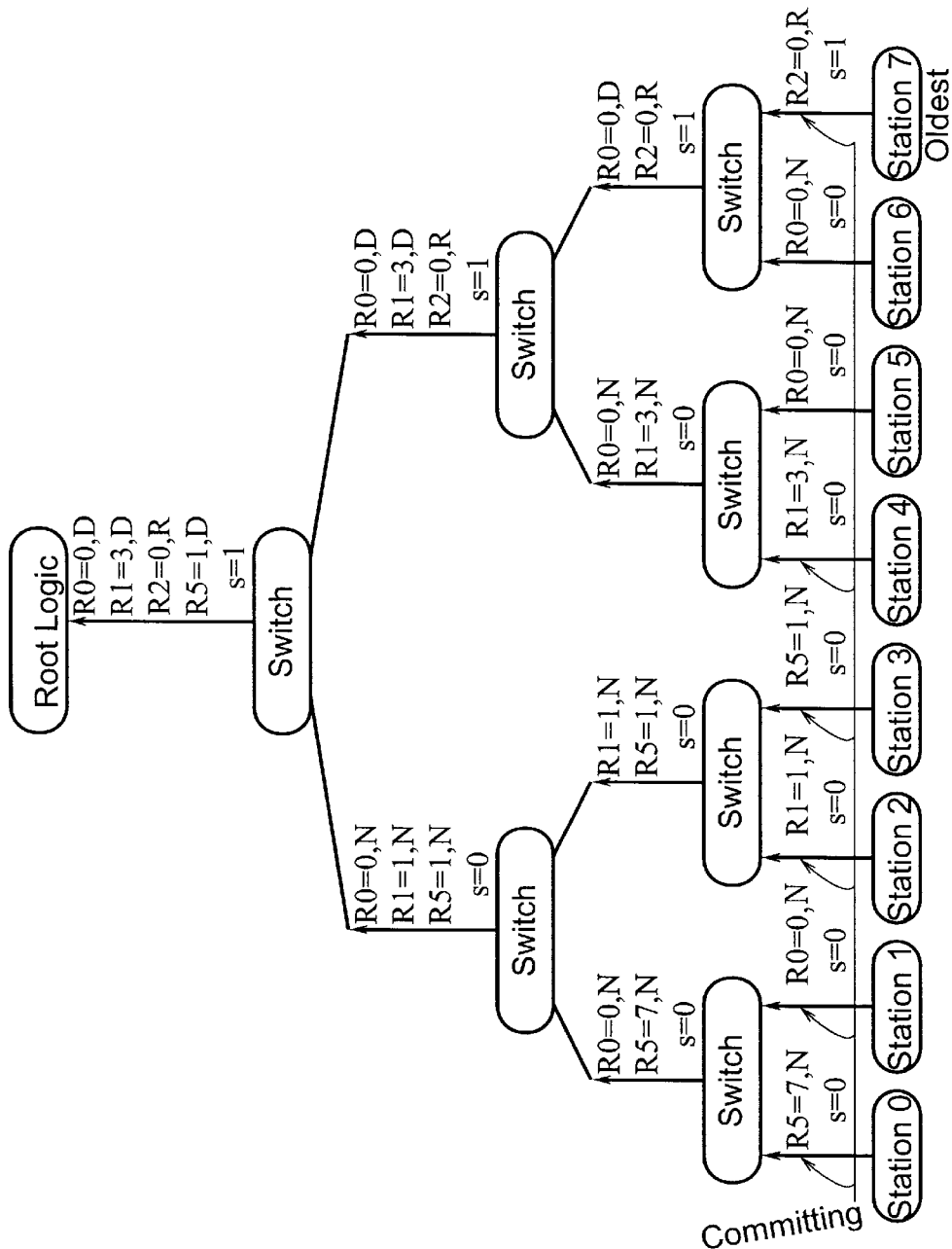
FIG. 60 is a schematic representation of the circuitry that updates the committed register file.

The rest of this section describes the logic that filters committed register values as they propagate up the tree. FIG. 60 illustrates the circuitry for the case of an 8-station datapath. The circuitry consists of a unidirectional tree. At the leaves of the tree are the individual execution stations. Each station passes up the tree its type, its segment bit, and its committed register binding. The committed register binding consists of a register number and a committed register value. For simplicity of explanation, we will assume from now on an instruction set architecture where register R0 is hardwired to contain a zero. Execution stations that do not commit a register value send up a committed binding for register R0. (This assumption is not essential, and many alternatives are obvious. For example, if no "zero" register exists, one can effectively be introduced to the system. Or we could, for example, assign a valid bit to every binding.) The commit logic described in Section 4.2.6 informs each execution station on every clock cycle whether its instruction has committed. As they propagate up the tree, the committed bindings are filtered so that, for every logical register, only the most recent committed binding reaches the root. In FIG. 60, Execution Station 7, the rightmost execution station, is the oldest. Execution Stations 7, 0, 1, 2, 3, and 4 are committing. Note that the execution stations committing on any given clock cycle form a contiguous sequence. Execution stations 5 and 6, which are not committing, supply a committed binding for register R0. Similarly, Execution Station 1 which is committing but does not modify any register also supplies a committed binding for register R0. FIG. 60 shows the committed bindings as they propagate up the tree. Each tree switch in FIG. 60 passes up the tree only the most recent committed binding for each register.

Figure 61:
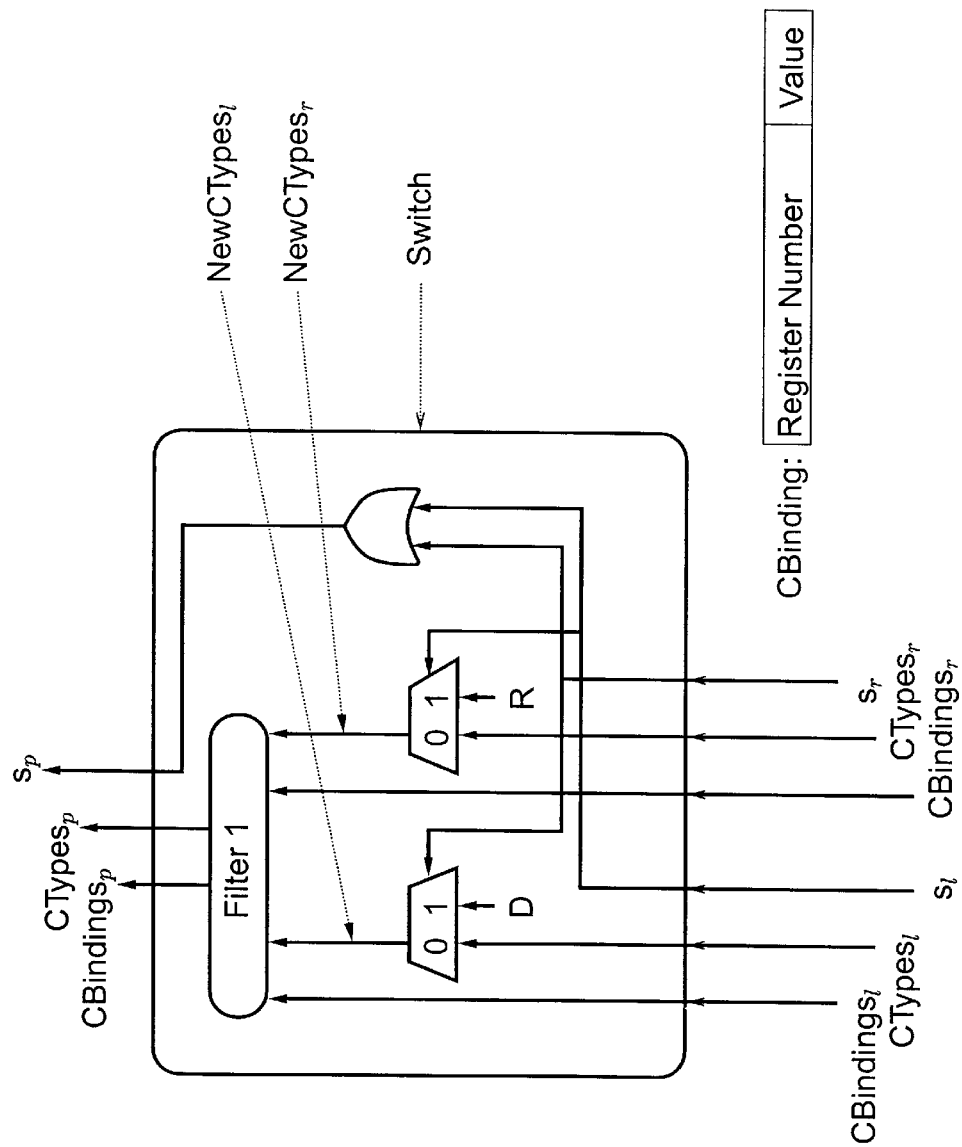
FIG. 61 is a schematic representation of one module of FIG. 60.

FIG. 61 shows one switch within the tree of FIG. 60. All the switches are identical. The switch takes as its input a set of k committed bindings from the left subtree, $CBindings_l$;

a set of k types corresponding to the left bindings, $CTypes_l$; a segment bit from the left subtree, $s_l$; a set of k committed bindings from the right subtree, $CBindings_r$, a set of k types corresponding to the right bindings, $CTypes_r$; and a segment bit from the right subtree, $S_r$. The switch maintains a one-to-one correspondence between bindings and types. That is, the first binding in $Bindings_l$ has the type specified by the first type in $Types_l$; the second binding has the type specified by the second type etc. The switch generates as its output a set of 2k bindings, $CBindings_p$, their 2k types, $CTypes_p$, and a segment bit, $s_p$. Each binding consists of a register number and a register value. The switch computes the parent segment bit and the new types of all the bindings as described in Section 4.3.8. Finally, the witch filters the left and right bindings so as to pass up the tree only the most recent committed binding for every register. The circuit labeled "Filter 1" in FIG. 61 shows one switch within the tree of FIG. 60. All the switches are identical. The switch takes as its input a set of k committed bindings from the left subtree, $CBindings_l$; a set of k types corresponding to the left bindings, $CTypes_l$; a segment bit from the left subtree, $s_l$; a set of k committed bindings from the right subtree, $CBindings_r$, a set of k types corresponding to the right bindings, $CTypes_r$; and a segment bit from the right subtree, $S_r$. The switch maintains a one-to-one correspondence between bindings and types. That is, the first binding in $Bindings_l$ has the type specified by the first type in $Types_l$; the second binding has the type specified by the second type etc. The switch generates as its output a set of 2k bindings, $CBindings_p$; their 2k types, $CTypes_p$; and a segment bit, $s_p$. Each binding consists of a register number and a register value. The switch computes the parent segment bit and the new types of all the left and right bindings as described in Section 4.3.8. Finally, the switch filters the left and right bindings so as to pass up the tree only the most recent committed binding for every register. The circuit labeled "Filter 1" in FIG. 61 performs that filtering. Any less recent binding is invalidated by setting its register number to R0. Specifically, if neither $CBinding_l$ nor $CBindings_r$ contains a binding for a given register, the switch does not pass a binding up the tree for that register. If only $Bindings_l$ or $Bindings_r$ contains a binding for a given register, the switch passes that binding up the tree. If $Bindings_l$ and $Bindings_r$ both contain a binding for a given register, the switch passes the more recent binding up the tree. For every register, the decision as to which binding to propagate up the the tree (if any) can be computed based on the bindings' newly computed types, $NewCTypes_l$ and $NewCTypes_r$. The following truth table computes that decision. The symbol "-" indicates that there is no binding for that register in that set of bindings. The symbol "X" stands for "don't care". The switch will never encounter an input leading to a "don't care" output because of the way that types are computed.

| Left Binding's Type in NewCTypes_l {D,R,N,-} | Right Binding's Type in NewCTypes_r {D,R,N,-} | Binding to Propagate Up {Left,Right,-} |
|---|---|---|
| D | D | Right |
| D | R | Left |
| D | N | X |
| D | — | Left |
| R | D | X |
| R | R | Right |
| R | N | X |
| R | — | Left |

| Left Binding's Type in NewCTypes_l {D,R,N,-} | Right Binding's Type in NewCTypes_r {D,R,N,-} | Binding to Propagate Up {Left,Right,-} |
|---|---|---|
| N | D | X |
| N | R | X |
| N | N | Right |
| N | — | Left |
| — | D | Right |
| — | R | Right |
| — | N | Right |
| — | — | — |

Propagating Most Recent Register Values

Figure 62:
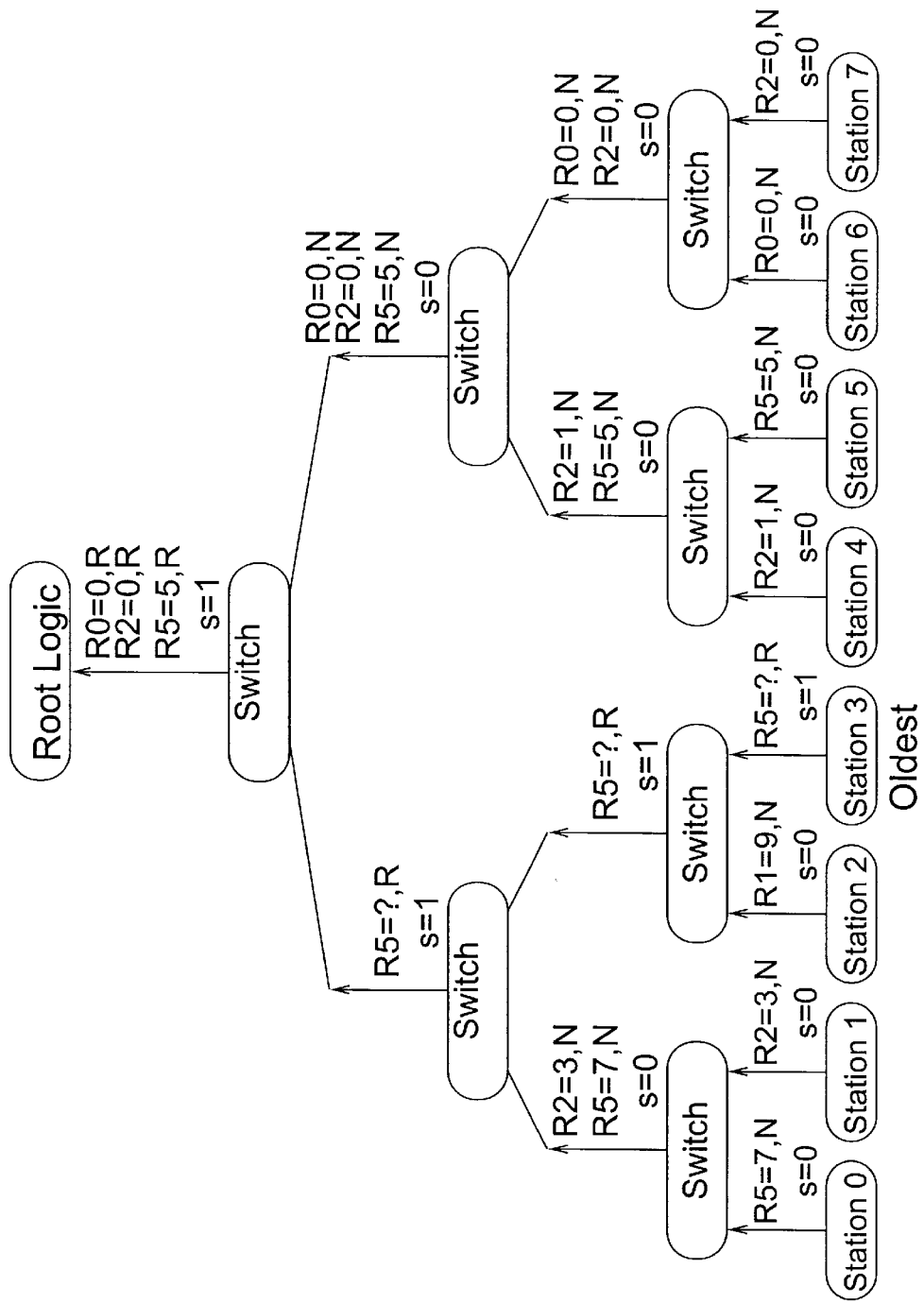
FIG. 62 is a schematic representation of the circuitry that propagates register bindings up.

In addition to propagating the most recent committed register bindings to the root, the optimized datapath must propagate all new register bindings from producer instructions to consumer instructions. This section describes the circuitry that propagates the most recent value of every register either partly or all the way up the tree where it can be read by stations searching for their arguments. The propagated values were shown boxed in the example of FIG. 57. FIG. 62 illustrates the circuitry required for this upward propagation of register bindings. The circuitry in FIG. 62 consists of a unidirectional tree. At the leaves of the tree, each execution station sends up a register binding specifying its result register number, the result value, and a ready bit specifying whether the result has been computed. Execution stations that do not modify a register send up a register binding for register R0. In addition to a register binding, each execution station also sends up its type and a segment bit that is high if and only if the station is the oldest. In FIG. 62, Execution Station 3 is the oldest. Register values that have not yet been computed are indicated by a question mark. Note that Execution Station 3 has not yet computed the value of its result register R5 and Execution Station 6 does not modify a register. Each switch within the tree of FIG. 62 propagates up the right-most neutral or recessive binding for every register. Dominant bindings do not propagate further up the tree.

Figure 63:
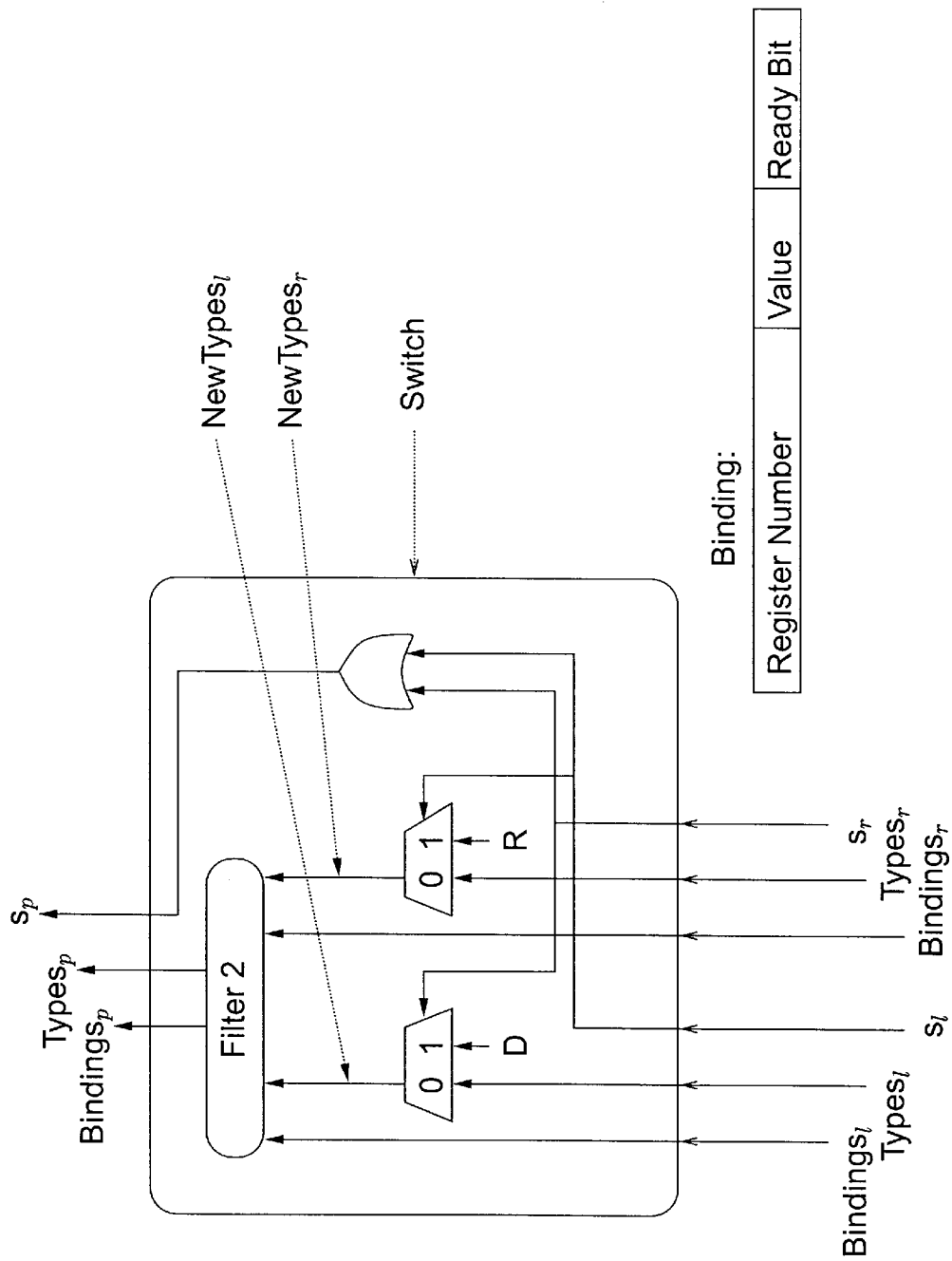
FIG. 63 is a schematic representation of one module of FIG. 62.

FIG. 63 shows one switch of the tree in FIG. 62. All the switches are identical. The switch takes as its input a set of k bindings from the left subtree, $Bindings_l$; a set of k types corresponding to the left bindings, $Types_l$; a segment bit from the left subtree, $s_l$; a set of k bindings from the right subtree, $Bindings_r$; a set of k types corresponding to the right bindings, $Types_r$; and a segment bit from the right subtree, $s_r$. The switch maintains a one-to-one correspondence between bindings and types. That is, the first binding in $Bindings_l$ has the type specified by the first type in $Types_l$; the second binding has the type specified by the second type etc. The switch generates as its output a set of 2k bindings, $Bindings_p$; their corresponding 2k types, $Types_p$; and a segment bit, $s_p$. Each binding consists of a register number, a register value, and a ready bit. The switch computes the parent segment bit and the new types of all the bindings as described in Section 4.3.8. Finally, the switch passes up the tree the rightmost recessive or neutral binding for every register. The decision as to which binding is the rightmost recessive or neutral one is computed by the circuit labeled "Filter2" based on the bindings' newly computed types, $NewTypes_l$ and $NewTypes_r$. The following truth table computes which binding to propagate up for a given register. Bindings that do not propagate up set their register number to R0. Again, the symbol "-" indicates that there is no binding for that register in that set of bindings and the symbol "X" stands for "don't care".

| Left Binding's Type in NewTypes$_l$ $\{D,R,N,-\}$ | Right Binding's Type in NewTypes$_r$ $\{D,R,N,-\}$ | Binding to Propagate $\{Left,Right,-\}$ |
|---|---|---|
| — | D | — |
| — | R | Right |
| — | N | Right |
| D | — | — |
| D | D | — |
| D | R | Right |
| D | N | X |
| D | — | — |
| R | D | X |
| R | R | Right |
| R | N | X |
| R | — | Left |
| N | D | X |
| N | R | X |
| N | N | Right |
| N | — | Left |

One way to implement the filters, Filter 1 and Filter 2, is by maintaining the sets of bindings and their corresponding types sorted by their register number. The filter first merges all the bindings in Bindings$_l$ and Bindings$_r$, and their newly computed types according to their register number and their left or right set subscript (l: 0, r: 1). The subscript is used as the least significant bit of the comparison. Once the typed bindings, Bindings$_l$ and Bindings$_r$, are merged, if two adjacent entries are to the same register, an implementation of the truth table chooses which, if any, of the two entries to propagate. Discarded entries are invalidated by setting their register number to R0. All the entries are then propagated without a collision through a butterfly network according to their register number so as to move all the discarded (R0) entries to the top. Thus the bindings and their types leaving each switch are again sorted by the register number.

Searching for Arguments

Figure 64:
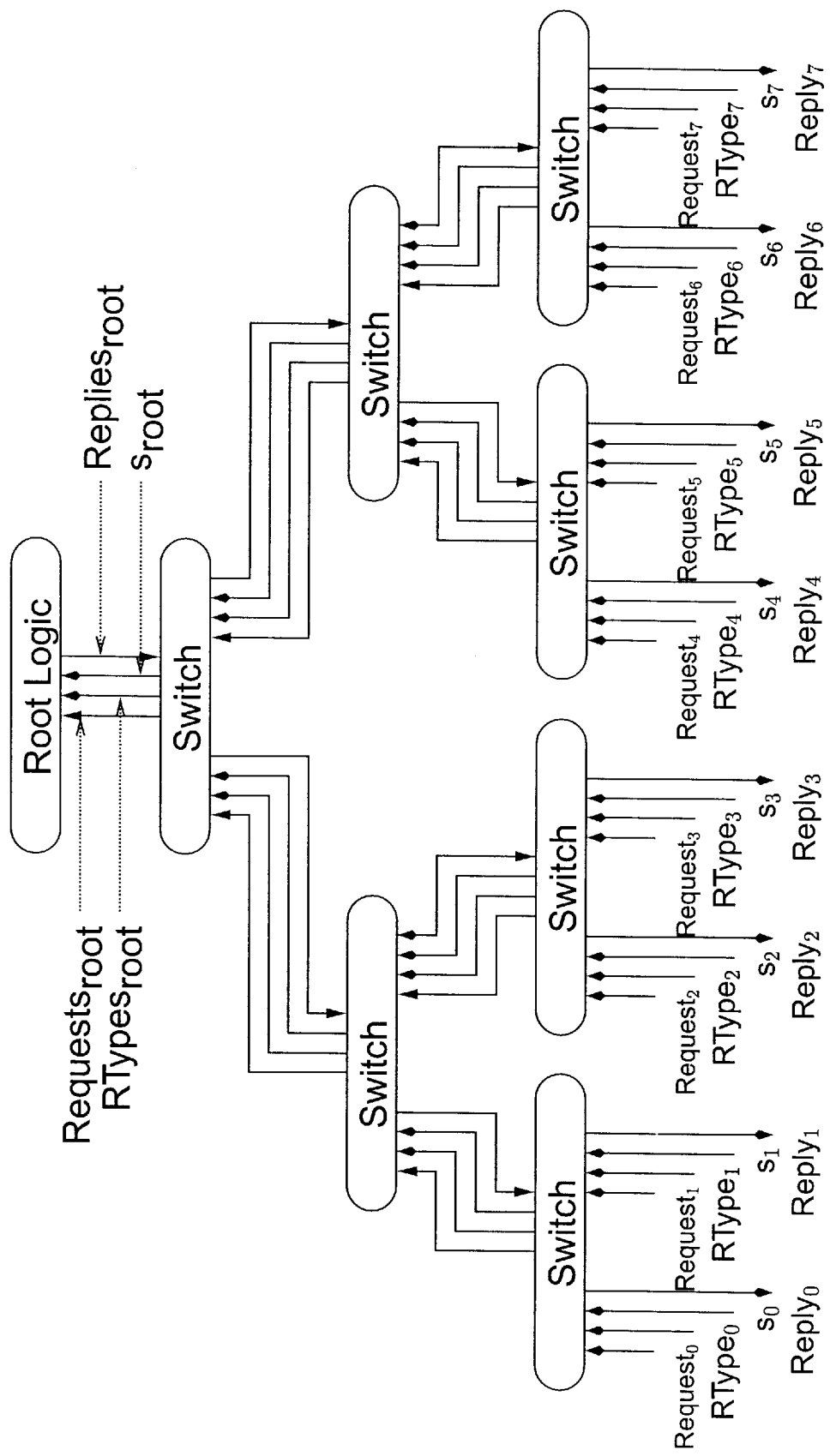
FIG. 64 is a schematic representation of the circuitry that propagates register bindings.

We have broken down the circuitry that propagates register bindings from producer instructions to consumer instructions into two components. The first component, described in the previous section, selectively passes register bindings up the tree, taking into account the binding's position with respect to the oldest instruction. This section describes the second component which passes register read requests up through successive parent nodes. This component compares some of the requests from the right subtree against the register bindings propagated up from the left subtree. When it finds the requested register binding, it returns the binding's value and ready status to the consumer instruction by retracing the request's path back to the leaf node. Requests that propagate all the way to the root are handled by the root. FIG. 64 shows the circuitry. For simplicity, the circuitry assumes that every instruction in the instruction set architecture reads at most one register. As can be seen, the circuitry can be expanded to incorporate instructions that read at most n registers. Each execution station now sends up a register read request, its type, and a segment bit; and receives back a register read reply. A register read request consists simply of a register number. A register read reply consists of a register value and a ready bit indicating whether the value has already been computed.

Figure 65:
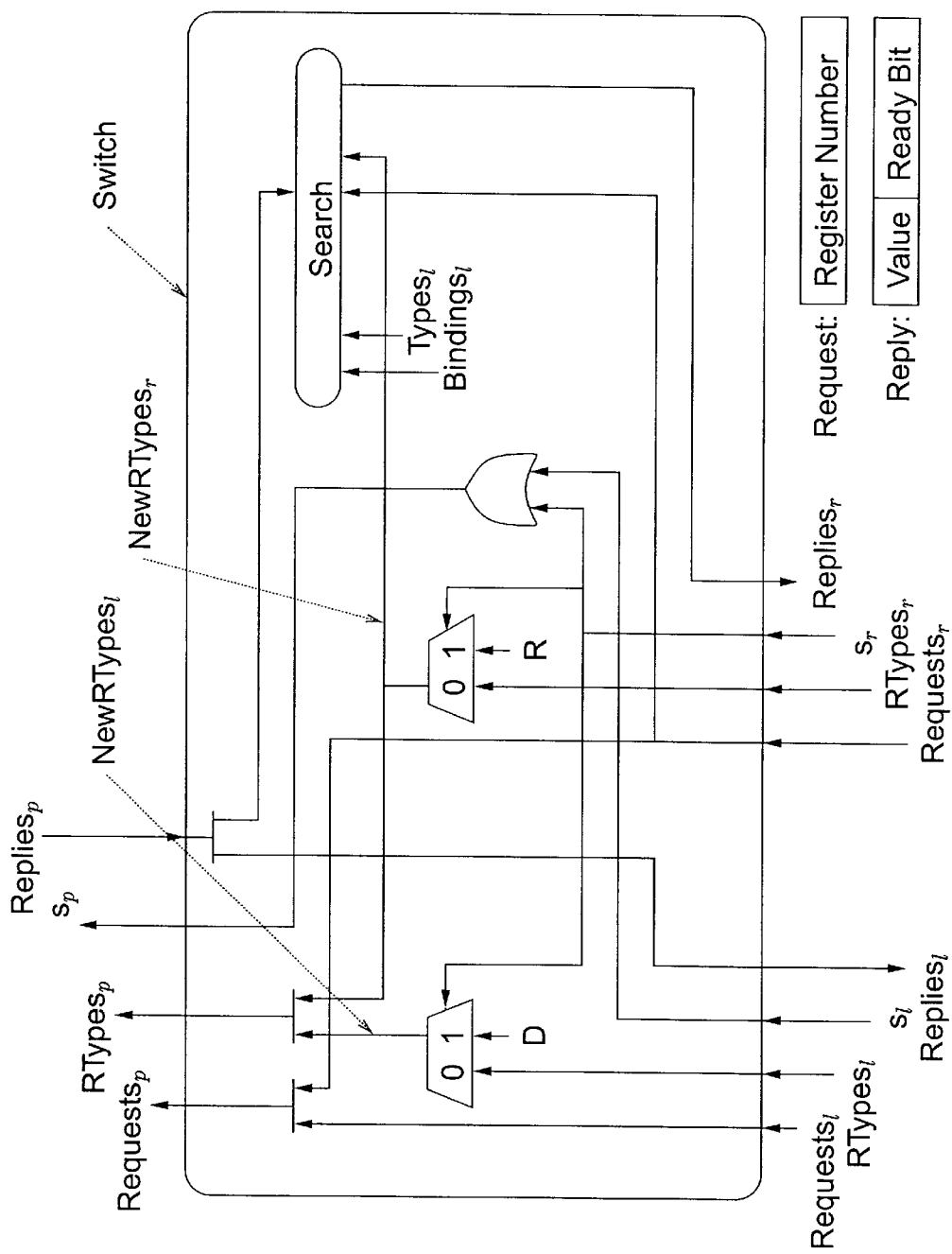
FIG. 65 is a schematic representation of one module of FIG. 64.

FIG. 65 shows one switch of the tree in FIG. 64. All the switches are the same. The switch takes as its input a set of k requests from the left subtree, Requests$_l$; a set of k types corresponding to the left requests, RTypes$_l$; a segment bit from the left subtree, s$_l$; a set of k requests from the right subtree, Requests$_r$; a set of k types corresponding to the right requests, RTypes$_r$; a segment bit from the right subtree, s$_r$; and a set of 2k replies from the parent, Replies$_p$. The switch generates as its output a set of k replies to the left subtree, Replies$_l$; a set of k replies to the right subtree, Replies$_r$; a set of 2k requests to the parent, Requests$_p$; a set of 2k types corresponding to the parent requests, RTypesp; and a segment bit to the parent, s$_p$. The switch also interacts with the switch from FIG. 63 that is in the same position in the tree. Specifically, the switch in FIG. 65 reads the signals NewTypes$_l$ and Bindings$_l$ from the switch in FIG. 63. Request types and segment bits are computed as described in Section 4.3.8. What remains is to show how Requests$_p$ and Replies$_l$ and Replies$_r$, are computed. For the ith request in Requests$_l$, the switch:

passes the request up the tree as the ith request in Requests$_p$, and sets the ith reply in Replies$_l$ equal to the ith reply in Replies$_p$.

For the ith request in Requests$_r$, the switch:

passes the request up the tree as the i+kth request in Requests$_p$, and checks if there exists a binding in Bindings$_l$ with the same register number that originated on the same side of the oldest station as the request. If so, the switch sets the ith reply in Replies$_r$ equal to the value and the valid bit specified by that binding. If not, the switch sets the ith reply in Replies$_r$ equal to the i+kth reply in Replies$_p$. This task is performed by the circuit labeled "Search".

To compute whether or not the left binding and the right request for a given register originated on the same side of the oldest station, the Search circuit draws on the left bindings' and the right requests' new types, NewTypes$_l$ and NewRTypes$_r$, respectively. If the types are the same, then the left binding and the right request originated on the same side of the oldest station. Here is the truth table that computes whether the left binding and the right request originated on the same side of the oldest station. Again, the symbol "X" stands for "don't care".

| Left Binding's Type in NewTypes$_l$ $\{D,R,N,\}$ | Right Binding's Type in NewTypes$_r$ $\{D,R,N,\}$ | Originated on the same side? $\{Yes,No\}$ |
|---|---|---|
| D | D | Yes |
| D | R | No |
| D | N | X |
| R | D | X |
| R | R | Yes |
| R | N | X |
| N | D | X |
| N | R | X |
| N | N | Yes |

If no older register binding exists for a requested register to the left of the request, the request will propagate all the way to the root of the tree without being replied to. In that case, the request will be replied to by the circuit labeled "Root Logic" in FIG. 64. The Root Logic circuit ties together the three components of the optimized datapath from FIG. 60, figrefod-propagate-up, and FIG. 64. The Root Logic maintains the committed register file and replies to register read requests. The Root Logic operates on the inputs: CBindings$_{root}$, Bindings$_{root}$, Types$_{root}$, Requests$_{root}$, and RTypes$_{root}$. (The inputs CTypes$_{root}$ and s$_{root}$ are not used.) The Root Logic's only output is Replies$_{root}$. On the rising clock edge, the Root Logic writes the Cbindings$_{root}$ that propagated up the tree dunng the previous clock cycle into the committed register file. During each clock cycle, the Root Logic computes the ith reply in Replies$_{root}$ to the ith request in Requests$_{root}$ as follows.

If the request's type in RTypes$_{root}$ is dominant, then the root logic checks if there exists a binding in in Bindings$_{root}$ with the same register number as the request. If so, the root logic sets the reply equal to the value and the valid bit specified by that binding. If not, the Root Logic reads the value of the register specified by the request from the committed register file; sets the reply's value to the read value and sets the reply's valid bit to high.

If the request's type in RTypes$_{root}$ is recessive, then all older bindings have already been checked. The Root Logic reads the value of the register specified by the request from the committed register file; sets the reply's value to the read value; and sets the reply's valid bit to high.

The optimized datapath consists of the circuitry that updates the committed register file on every clock cycle (FIG. 60) plus the circuitry that propagates register bindings from producer instructions or from the committed register file to consumer instructions (FIG. 62 and FIG. 64). Note that the tree circuits in FIG. 60 and FIG. 62 can share wires. This is because each tree has enough bandwidth for both. The example in FIG. 57 indicated this sharing by overlapping the boxed and circled bindings. The implementation choices for circuits Filter1, Filter2, and Search determine whether sharing of wires and logic is desirable. For example, some implementations of these circuits may maintain bindings and requests in serial order by simply appending them at each switch. The circuits may attach a bit to each binding to indicate whether the binding is being committed and a bit to indicate whether the binding is still propagating up. Such implementations need only to propagate up the tree one set of bindings and one set of types.

The optimized datapath and the memory renaming datapath of Section 4.2.5 solve very similar problems. Most of the techniques used for one can be used for the other.

4.3.9 Summary

Other recent work has addressed the scalability of superscalar processor microarchitecture. In addition to the work we pointed out earlier, several additional approaches to scaling today's uniprocessors have been proposed. These rely on course-grained instruction-level parallelism. Multi-Scalar processors [40] take course-grained threads that must be executed serially, and speculatively execute them, noticing after the fact when a data dependency has been violated. MultiScalar processors do not address the problem of exploiting fine-grained ILP. DataScalar processsors [3] execute instructions redundantly, and require an efficient broadcast mechanism, which appears to limit its scalability.

One often-heard slogan states that "the computer is the network" (or vice versa.) To scale to greater and greater issue widths the processor too must become an efficient network. We have presented a processor implementation that dramatically differs from today's designs, scaling efficiently, and with low design effort, to large issue widths by converting the processor's datapath into several logarithmic-depth networks. Although the Ultrascalar's implementation differs dramatically from today's processors, the Ultrascalar exploits the same parallelism as more traditional processors, by providing out-of-order issue, register renaming, and speculation. To exploit even more parallelism, we have proposed optimizations to the data and instruction memories. Furthermore several optimizations to the Ultrascalar datapath are possible to reduce the constants.

The Ultrascalar processor demonstrates that VLSI algorithms and analysis are an important tool for processor architects.

4.4 REFERENCES

[1] Pritpal S. Ahuja, Douglas W. Clark, and Anne Rogers. The performance impact of incomplete bypassing in processor pipelines. In *Proceedings of the 28th Annual International Symposium on Microarchitecture* (MICRO 28), pages 36–45, Ann Arbor, Mich., Nov. 29–Dec. 1, 1995. IEEE Computer Society TC-MICRO and ACM SIGMICRO.

[2] Guy E. Blelloch. Scans as primitive parallel operations. *IEEE Trans. on Computers*, 38(11): 1526–1535, November 1989.

[3] Doug Burger, Stefanos Kaxiras, and James R Goodman. DataScalar architectures. *In Proceedings of the 24th Annual International Symposium on Computer Architecture* (ISCA '97), Denver, Colo., Jun. 2–4, 1997. ACM SIGARCH and IEEE Computer Society TCCA. /ftp.cs.wisc.edu/galileo/papers/ISCA97AS.PS.

[4] David Park Christman. Programming the connection machine. Master's thesis, Massachusetts Institute of Technology, Department of Electrical Engineering and Computer Science, January 1983. Also available as Xerox PARC Technical Report ISL-84-3, April, 1984.

[5] Thomas H. Cormen, Charles E. Leiserson, and Ronald L. Rivest. Introduction to Algorithms. The MIT Electrical Engineering and Computer Science Series. MIT Press, Cambridge, Mass., 1990.

[6] William J. Dally and John W. Pulton. *Digital Systems Engineering*. Cambridge University Press, 1998.

[7] David C. Douglas, Mahesh N. Ganmukhi, Jeffrey V. Hill, W. Daniel Hillis, Bradley C. Kuszmaul, Charles li. Leiserson, David S. Wells, Monica C. Wong, Shaw-Wen Yang,. and Robert C. Zak. Parallel computer system. U.S. Pat. No. 5,333,268, issued Jul. 26, 1994.

[8] James A. Farrell and Timothy C. Fischer. Issue logic for a 600-MHz out-of-order execution microprocessor. *IEEE Journal of Solid-State Circuits*. 33(5):707–712. May 1998.

[9] John G. Favor, Amos Ben-Meir, and Jeffrey E. Trull. Scan chain for rapidly identifying first or second objects of selected types in a sequential list. U.S. Pat. No. 5,745,724, Apr. 28, 1998.

[10] Bruce A. Gieseke et al. A 600MHz superscalar RISC microprocessor with out-of-order execution. In *IEEE International Solid-State Circuits Conference Digest of Technical Papers* (ISSCC'97), pages 176–177, February 1997.

[11] Allan Gottlieb, Ralph Grishman, Clyde P. Kruskal, Kevin P. McAuliffe, Larry Rudolph, and Marc Snir. The NYU Ultracomputer—designing a MIMD, shared-memory parallel machine. *IEEE Transactions on Computers*, C-32(2): 175–159, February 1983.

[12] Shantanu R. Gupta and James S. Griffith. Entry allocation appartus and method of same. U.S. Pat. No. 5,560, 025, Sep. 24, 1996.

[13] Hsieh T. Hao, Huei Ling, Howard E. Sachar, Jeffrey Weiss, and Yannis J. Yamour. (k)-instructions-at-a-time pipelined processor for parallel execution of inherently sequential instructions. U.S. Pat. No. 4,594,655, Jun. 10, 1986.

[14] John L. Hennessy and David A. Patterson. *Computer Architecture A Quantitative Approach*. Morgan Kaufmann, 1990.

[15] W. Daniel Hillis. U.S. Pat. No. 5,212,773, 1993.

[16] W Daniel Hillis, David C. Douglas, Charles E. Leiserson, Bradley C. Kuszmaul, Mahesh N. Ganmukhi, Jeffrey V. Hill, and Monica C. Wong-Chan. Parallel computer system with physically separate tree networks for data and control messages. U.S. Pat. No. 5,590,283, issued Dec. 31, 1996.

[17] Bradley C. Kuszmaul. Fast, deterministic routing, on hypercubes, using small buffers. *IEEE Transactions on Computers*, 39(11): 1390–1393, November 1990.

[18] Bradley C. Kuszmaul, Charles E. Leiserson, Shaw-Wen Yang, Carl R Feynman, W. Daniel Hillis, David Wells, and Cynthia I. Spiller. Parallel computer system including arrangement for quickly draining messages from message router. U.S. Pat. No. 5,390,298, issued Feb. 14, 1995.

[19] Monica S. Lam and Robert P. Wilson. Limits of control flow on parallelism. In *The 19$^{th}$ Annual International Symposium on computer Architecture* (ISCA '92), pages 46–57, Gold Coast, Australia, May 1992. ACM SIGARCH Computer Architecture News, Volume 20, Number 2.

[20] F. Thompson Leighton. *Introduction to Parallel Algorithms and Architectures. Arrays, Trees, Hypercubes.* Morgan Kaufmann, San Mateo, Calif., 1992.

[21] C. E. Leiserson, Z. S. Abuhamdeh, D. C. Douglas, C. R Feynman, M. N. Ganmukhi, J. V. Hill, W. D. Hillis, B. C. Kuszmaul, M. A. St. Pierre, D. S. Wells, M. C. Wong, S.-W. Yang, and R Zak. The network architecture of the Connection Machine CM-S. *Journal of Parallel and Distributed Computing*, 33(2):145–158, 1996. theory.lcs.mit.edu/pub/bradley/jpdc96.ps.Z.

[22] C. E. Leiserson and B. M. Maggs. Communication-efficient parallel algorithms for distributed random-access machines. *Algorithmica*, 3:53–77, 1988.

[23] Charles E. Leiserson. *Area-Efficient VLSI Computation.* The MIT Press, 1982. ACM Doctoral Dissertation Award 1982.

[24] Charles E. Leiserson. Fat-trees: Universal networks for hardware-efficient supercomputing. *IEEE Transactions on Computers*, C-34(10):892–901, October 1985.

[25] Charles E. Leiserson, Zahi S. Abuhamdeh, David C. Douglas, Carl R Feynman, Mahesh N. Ganmukhi, Jeffrey V. Hill, W. Daniel Hillis, Bradley C. Kuszmaul, Margaret A. St. Pierre, David S. Wells, Monica C. Wong, Shaw-Wen Yang, and Robert Zak. The network architecture of the Connection Machine CM-S. In *4th Annual Symposium on Parallel Algorithms and Architectures (SPAA '92)*, pages 272–285, June 1992. theory.lcs.mit.edu/pub/cel/spaa92.ps.Z.

[26] J. Lillis, C.-K. Cheng, and T.-T. Y. Lin. Optimal wire sizing and buffer insertion for low power and a generalized delay model. *IEEE Journal of Solid-State Circuits*, 33(3):437–447, March 1996.

[27] Robert W. Martell and Glenn J. Hinton. Method and apparatus for scheduling the dispatch of instructions from a reservation station. U.S. Pat. No. 5,519,864, May 21, 1996.

[28] Mamanta Misra, editor. *IBM RISC System/6000 Technology.* IBM, 11400 Burnet Road, Austin, Tex. 78758-3493, 1 edition, 1990. This book can be obtained from IBM sales representatives.

[29] Richar R. Oehler and Michael W. Blasgen. Thm risc system/6000: Architecture and performance. *IEEE MICRO*, pages 14–17, June 1991.

[30] Kunle Olukotun, Basem A. Nayfeh, Lance Hammond, Ken Wilson, and Kunynng Chang. The case for a single-chip multiprocessor. In *The Seventh International Symposium on Architectural Support for Programming Languages and Operating Systems (ASPLOS VII)*, pages 2–11, Cambridge, Mass., Oct. 1–5, 1996. ACM Press. www-hydra.stanford.edu/Papers/ASPLOS_VII.ps.

[31] J. K. Ousterhout, G. T. Hamachi, R. N. Mayo, W. S. Scott, and G. S. Taylor. Magic: A VLSI layout system. In *ACM IEEE 21st Design Automation Conference*, pages 152–159, Los Angeles, Calif., USA, June 1984. IEEE Computer Society Press.

[32] Subbarao Palacharla, Norman P. Jouppi, and J. E. Smith. Complexity-effective superscalar processors. *In Proceedings of the 24th Annual International Symposium on Computer Architecture (ISCA '97)*, pages 206–218, Denver, Colo., Jun. 24, 1997. ACM SIGARCH and IEEE Computer Society TCCA. www.ece.wisc.edu/jes/papers/isca.ss.ps. See also [$^{32}$].

[33] Subbarao Palacharla, Norman P. Jouppi, and James E. Smith. Quantifying the complexity of superscalar processors. Technical Report CS-TR-96-1328, University of Wisconsin, Madison, Nov. 19, 1996. ftp.cs.wisc.edu/sohi/complexity.report.ps.z.

[34] Yale N. Patt, Sanjay J. Patel, Marius Evers, Daniel H. Friendly, and Jared Stark. One billion transistors, one uniprocessor, one chip. Computer, 30(9):51–57, September 1997. www.computer.org/computer! co 1997/r905labs.htm.

[35] Sanjay Jeram Patel, Marius Evers, and Yale N. Patt. Improving trace cache effectiveness with branch prootion and trace packing. In Proceedings of the 25$^{th}$ Annual International Symposium on Computer Architecture, pages 262–271, Barcelona, Spain, Jun. 27–Jul. 1, 1998. IEEE Computer Society TCCA and ACM SIGARCH, IEEE Computer Society, Los Alamitos, Calif., published as Computer Architecture News, 26(3), June 1998. www.eecs.umich.edu/HPS/pub/promotion isca25.ps.

[36] Valeri Popescu, Merle A. Schultz, Gary A. Gibson, John E. Spracklen, and Bruce D. Lightner. Processor architecture providing speculative, out of order execution of instructions. U.S. Pat. No. 5,708,841, Jul. 13, 1998.

[37] Abbiram G. Ranade. Multiprocessor/memory interconnection network wherein messages sent through the network to the same memory are combined. U.S. Pat. No. 4,920,484, Apr. 24, 1990.

[38] Eric Rotenberg, Steve Bennett, and James E. Smith. Trace cache: A low latency approach to high bandwidth instruction fetching. In *Proceedings of the 29th Annual International Symposium on Microarchitecture (MICRO 29)*, pages 24–34, Paris, France, Dec. 2–4, 1996. IEEE Computer Society TC-MICRO and ACM SIGMICRO. www.cs.wiSc.edupericro/TC.micro29.ps.

[39] Richard M. Russell, The CRAY-i computer system. *Communications of the ACM*, 21(1):63–72, January 1978.

[40] Gurindar S. Sohi, Scott E. Breach, and T. N. Vijaykumar. Multiscalar processors. *In Proceedings of the 22nd Annual International Symposium on Computer Architecture (ISCA '95)*, pages 414–425, Santa Margherita Ligure, Italy, Jun. 22–24, 1995. ACM SIGARCH and IEEE Computer Society TCCA. Computer Architecture News, 23(2), May 1994.

[41] Robert F. Sproull, Ivan E. Sutherland, and Charles E. Molnar. The counterflow pipeline processor architecture. *IEEE Design & Test of Computers*, 11(3):48–59, Fall 1994.

[42] TI prepares to build chips based on smallest announced transistors. www.ti.com/corp/docs/pressrel/1998/c98048.htm, [26] August 1998.

[43] Clark D. Thompson. The VLSI complexity of sorting. *IEEE Transactions on Computers*, C-32:1171–1184, December 1983.

[44] RM. Tomasulo. An efficient algorithm for exploiting multiple arithmetic units. *IBM Journal of Research and Development,* 11(1):25–33, January 1967.

[45] J. D. Ullman. *Computational Aspects of VLSI.* Principles of Computer Science Series. Computer Science Press, 1984.

[46] T.-Y. Yeh, D. T. Marr, and Y. N. Patt. Increasing the instruction fetch rate via multiple branch prediction and a branch address cache. *In Conference Proceedings,* 1993 *International Conference on Supercomputing,* pages 67–76, Tokyo, Japan, Jul. 20–22, 1993. ACM SIGARCIL

What is claimed is:

1. A circuit comprising:
   a plurality of multiple input multiplexers and multiple input function generators connected in series,
   each multiplexer having one input that is an identity function and an output that is selected by a segment bit, and
   each function generator having one input that is output of the preceding multiplexer and an output that is an input to the next multiplexer, and
   the output of the last function generator is connected as an input to the first multiplexer.

2. A circuit comprising:
   a plurality of modules connected in a tree structure, each module comprising:
     at least first and second function generators, first and second multiplexers and an OR gate,
     a first input and a first output connecting the module to an output and an input, respectively, of a module closer to the root of the tree structure,
     a second input and a second output connecting the module to an output and an input, respectively, of a module farther from the root of the tree structure and a third input and a third output connecting the module to an output and an input, respectively, of another module farther from the root of the tree structure,
     a fourth and a fifth input providing segment bits to the module from modules farther from the root and a fourth output providing a segment bit to a module closer to the root,
     said first and second inputs of each module being connected as inputs to the first function generator of that module and said second and third inputs being connected as inputs to the second function generator of that module,
     the first multiplexer having a first input that is an output of the first function generator and a second input that is the second input to that module and the second multiplexer having a first input that is an output of the second function generator and a second input that is the third input to that module, the first and second multiplexers having outputs that are selected by segment bits on the fourth and fifth inputs, the first output of each module being derived from the second multiplexer and one of the second and third outputs being derived from the first multiplexer, and
     the OR gate generating a logical OR of the fourth and fifth inputs and providing it to the fourth output, and
   the first output of at least one module closest to the root of the tree structure being connected to the first input of a module closest to the root of the tree structure.

3. A prefix computation circuit comprising:
   a plurality of input terminals to receive input data,
   a circuit configuration to perform prefix computation based on said input data, and
   a plurality of output terminals to provide output data based on said prefix computation,
   wherein the prefix computation is cyclic and segmented.

4. The circuit of claim 3 wherein the prefix computation is performed serially.

5. The circuit of claim 3 wherein the prefix computation is performed in parallel.

6. The circuit of claim 3 wherein there are N input terminals.

7. A prefix computation circuit comprising:
   a plurality of N input terminals to receive input data,
   a circuit configuration to perform prefix computation based on said input data, and
   a plurality of output terminals to provide output data based on said prefix computation,
   wherein the prefix computation is cyclic and segmented, and
   wherein the longest path through the circuit configuration is O (log N) circuit elements.

8. A prefix computation circuit comprising:
   a plurality of input terminals to receive input data,
   a circuit configuration to perform prefix computation based on said input data, and
   a plurality of output terminals to provide output data based on said prefix computation,
   wherein the prefix computation is cyclic and segmented, and
   wherein the circuit configuration computes a cyclic segmented prefix using a plurality of modules in which at least one module is connected to each of a plurality of other modules via a child connection comprising an output connected to an input of a child module, a first input connected to a first output of the same child module, and a second input connected to a second output of the same child module, and the child connections are ordered so that each child connection has a predecessor child connection whereby if the second input from a child connection's predecessor is true, then the output of the child connection is an identity value, and if the second input from a child connection's predecessor is false, then the output of the child connection is the same value as a combination, by an associative function, of the first input of the predecessor child connection and the output of the predecessor child connection.

9. A circuit comprising:
   a plurality of child modules and
   at least one cyclic prefix module, having a plurality of child connections, each child connection comprising:
     an output connected to an input of a child module,
     a first input connected to a first output of the same child module, and
     a second input connected to a second output of the same child module, the child connections being ordered so that each child connection has a predecessor child connection;
   the cyclic prefix module further comprising a circuit which computes a cyclic segmented prefix, whereby if the second input from a child connection's predecessor is true, then the output of the child connection is an identity value, and if the second input from a child connection's predecessor is false, then the output of the child connection is the same value as a combination, by an associative function, of the first input of the predecessor child connection and the output of the predecessor child connection.

10. A circuit, as claimed in claim 9, in which there are N child modules and the cyclic prefix module comprises a circuit in which the longest path through the circuit is O(log N) circuit elements.

11. A circuit, as claimed in claim 9, wherein each child module comprises an input which encodes an input value, a first output which encodes an output value and a second output which encodes a boolean value.

12. A circuit, as claimed in claim 9, wherein each of the child connections is identified by a different number from 1 to N, and for each leaf connection numbered I, if I is less than N the child connection is called the predecessor of child connection number I+1, and if I equals N the child connection is called the predecessor of child connection number 1.

13. A circuit as claimed in claim 9, in which one of the at least one cyclic prefix modules has a root connection, the root connection comprising an output, and an input, the root output of the module connected to the root input of the module, whereby the module performs a segmented parallel prefix computation, in which if the second input of child connection N is true, then the root output is the identity value, and if the second input of child connection N is false, then the root output is the same value as a combination, by the associative function, of the first input of child connection N with the first input of child connection 1, and the output of child connection 1 is the same value as the root input, and for each child connection other than child connection 1, if the second input from the child connection's predecessor is true, then the output of the child connection is the identity value, and if the second input from the child connection's predecessor is false, then the output of the child connection is the same value as a combination, by the associative function, of the output of the child connection's predecessor and the input of the child connection's predecessor.

14. A circuit, as claimed in claim 13, organized as a tree-structured circuit in which the longest path through the circuit is O(log N) circuit elements.

15. A circuit comprising:
a plurality of leaf modules, each leaf module comprising:
an input which encodes an input value,
a first output which encodes an output value, and
a second output which encodes a boolean value;
a cyclic prefix module, having a plurality of leaf connections, each leaf connection comprising:
an output connected to the input of a leaf module,
a first input connected to the first output of the same leaf module, and
a second input connected to the second output of the same leaf module, there being a total of N leaf connections,
each leaf connection being identified by a different number from 1 to N and for each leaf connection numbered I, if I is less than N the leaf connection being called the predecessor of leaf connection number I+1, and if I equals N the leaf connection being called the predecessor of leaf connection number 1;
the cyclic prefix module further comprising a circuit which computes a cyclic segmented prefix, whereby if the second input from a leaf connection's predecessor is true, then the output of the leaf connection is an identity value, and if the second input from a leaf connection's predecessor is false, then the output of the leaf connection is the same value as a combination, by an associative function, of the first input of the leaf connection's predecessor and the output of the leaf connection's predecessor.

16. A circuit, as claimed in claim 15, organized as a tree-structured circuit in which the longest path through the circuit is O(log N) circuit elements.

17. A circuit as claimed in claim 15, in which one of the cyclic prefix modules has a root connection, the root connection comprising an output and an input, the root output of the module connected to the root input of the module, whereby the module performs a segmented parallel prefix computation, in which if the second input of child connection N is true, then the root output is the identity value, and if the second input of child connection N is false, then the root output is the same value as a combination, by the associative function, of the first input of child connection N with the first input of child connection 1, and the output of child connection 1 is the same value as the root input, and for each child connection other than child connection 1, if the second input from the child connection's predecessor is true, then the output of the child connection is the identity value, and if the second input from the child connection's predecessor is false, then the output of the child connection is the same value as a combination, by the associative function, of the output of the child connection's predecessor and the input of the child connection's predecessor.

18. A circuit, as claimed in claim 17, organized as a tree-structured circuit in which the longest path through the circuit is O(log N) circuit elements.

* * * * *